(12) United States Patent
Cabaniss et al.

(10) Patent No.: US 11,142,131 B2
(45) Date of Patent: Oct. 12, 2021

(54) MODULAR ROOF RACK SYSTEM

(71) Applicant: Bestop Aluminess, LLC, Santee, CA (US)

(72) Inventors: Kyle Cabaniss, Santee, CA (US); David Hoskins, Santee, CA (US)

(73) Assignee: BESTOP ALUMINESS, LLC, Chicago, IL (US)

(*) Notice: Subject to any disclaimer, the term of this patent is extended or adjusted under 35 U.S.C. 154(b) by 0 days.

(21) Appl. No.: 15/930,264

(22) Filed: May 12, 2020

(65) Prior Publication Data

US 2020/0361393 A1 Nov. 19, 2020

Related U.S. Application Data

(60) Provisional application No. 62/848,437, filed on May 15, 2019.

(51) Int. Cl.
*B60R 9/045* (2006.01)

(52) U.S. Cl.
CPC .................................. *B60R 9/045* (2013.01)

(58) Field of Classification Search
CPC ........... B60R 9/045; B60R 9/058; B60R 9/00; B60R 9/042; B60R 9/04; B60R 9/048; B60J 7/11

See application file for complete search history.

(56) References Cited

U.S. PATENT DOCUMENTS

| | | | |
|---|---|---|---|
| 4,113,303 A * | 9/1978 | Yench | B60J 7/11 296/217 |
| 4,785,980 A | 11/1988 | Redick | |
| 4,957,228 A | 9/1990 | Balka | |
| 5,314,101 A | 5/1994 | White | |
| 5,620,123 A | 4/1997 | Brisbois | |
| 5,725,273 A * | 3/1998 | Vernon | B60J 7/11 224/315 |
| 5,738,405 A * | 4/1998 | Richters | B60J 1/085 296/146.15 |
| 6,114,954 A * | 9/2000 | Palett | B60R 9/00 224/321 |
| 6,425,508 B1 | 7/2002 | Cole et al. | |
| 6,568,748 B2 * | 5/2003 | Yoon | B60R 9/04 224/314 |
| 6,712,247 B1 * | 3/2004 | Fox | B60R 9/042 224/310 |
| 7,048,490 B2 | 5/2006 | Henderson | |
| 8,016,172 B1 | 9/2011 | Mefford | |

(Continued)

FOREIGN PATENT DOCUMENTS

| | | |
|---|---|---|
| DE | 199003526 U1 | 3/1991 |
| DE | 4039723 A1 | 6/1992 |

(Continued)

*Primary Examiner* — Brian D Nash
(74) *Attorney, Agent, or Firm* — Procopio, Cory, Hargreaves & Savitch LLP

(57) ABSTRACT

A modular rack system for mounting on the roof of a vehicle. In an embodiment, the modular rack system comprises a plurality of panels and a plurality of rails. The panels are configured to be joined in the same plane to form a platform with a flat top surface. The rails are configured to be joined together to form a modular frame surrounding the platform and extending above the top surface of the platform.

19 Claims, 41 Drawing Sheets

(56) References Cited

U.S. PATENT DOCUMENTS

| | | | |
|---|---|---|---|
| 8,408,623 B1* | 4/2013 | McAuliff | B60J 7/11 296/24.33 |
| 9,174,585 B2 | 11/2015 | Noonan | |
| 9,346,342 B1* | 5/2016 | Bowles | B60J 7/1291 |
| 9,506,292 B2 | 11/2016 | Levi | |
| 9,676,343 B2 | 6/2017 | Badillo | |
| 9,834,151 B2 | 12/2017 | Henry | |
| 10,030,446 B2 | 7/2018 | Badillo | |
| 10,035,408 B2 | 7/2018 | Crismon et al. | |
| 2001/0040394 A1* | 11/2001 | DeGaillard | B60J 7/04 296/220.01 |
| 2002/0158491 A1* | 10/2002 | Patelczyk | B60J 7/047 296/220.01 |
| 2003/0029894 A1* | 2/2003 | Crane | B60R 9/00 224/319 |
| 2005/0092796 A1 | 5/2005 | Essig | |
| 2007/0001486 A1* | 1/2007 | Dowdey | B60J 7/11 296/218 |
| 2007/0035161 A1* | 2/2007 | Huisingh | B60R 7/04 296/215 |
| 2007/0164587 A1* | 7/2007 | Brockhoff | B60J 7/11 296/218 |
| 2008/0169322 A1* | 7/2008 | McMillan | B60R 9/055 224/328 |
| 2009/0273209 A1* | 11/2009 | Joab | B60J 1/1884 296/215 |
| 2011/0290307 A1* | 12/2011 | Workman | H02S 40/34 136/251 |
| 2012/0080901 A1* | 4/2012 | Izydorek | B60R 9/055 296/37.6 |
| 2014/0246885 A1* | 9/2014 | Inzerillo | B60J 7/02 296/218 |
| 2015/0224860 A1* | 8/2015 | Bowles | B60J 7/0435 296/218 |
| 2016/0046241 A1* | 2/2016 | Crismon | B60J 7/102 224/326 |
| 2016/0159290 A1 | 6/2016 | Tamaddon-Dallal et al. | |
| 2016/0263976 A1* | 9/2016 | Bowles | B60J 7/11 |
| 2017/0120835 A1 | 5/2017 | Dejong et al. | |
| 2018/0086279 A1* | 3/2018 | Anton | B60R 9/00 |
| 2018/0257467 A1* | 9/2018 | Rodriguez | B60J 7/106 |
| 2018/0273116 A1* | 9/2018 | Collyer | B60J 7/194 |
| 2019/0181796 A1* | 6/2019 | Kim | H02S 20/30 |
| 2019/0283681 A1* | 9/2019 | Forgette | B60R 9/048 |
| 2019/0283682 A1* | 9/2019 | Marchlewski | B60R 9/058 |
| 2019/0308673 A1* | 10/2019 | Mar | B62D 25/06 |
| 2019/0329638 A1* | 10/2019 | Willard | B60J 7/194 |
| 2020/0164730 A1* | 5/2020 | Willard | B60J 7/19 |
| 2020/0361393 A1* | 11/2020 | Cabaniss | B60R 9/045 |
| 2020/0380896 A1* | 12/2020 | Alex | G06F 3/1423 |

FOREIGN PATENT DOCUMENTS

| | | |
|---|---|---|
| DE | 4134715 C1 | 4/1993 |
| DE | 4224583 A1 | 1/1994 |
| JP | 11235951 A | 8/1999 |

\* cited by examiner

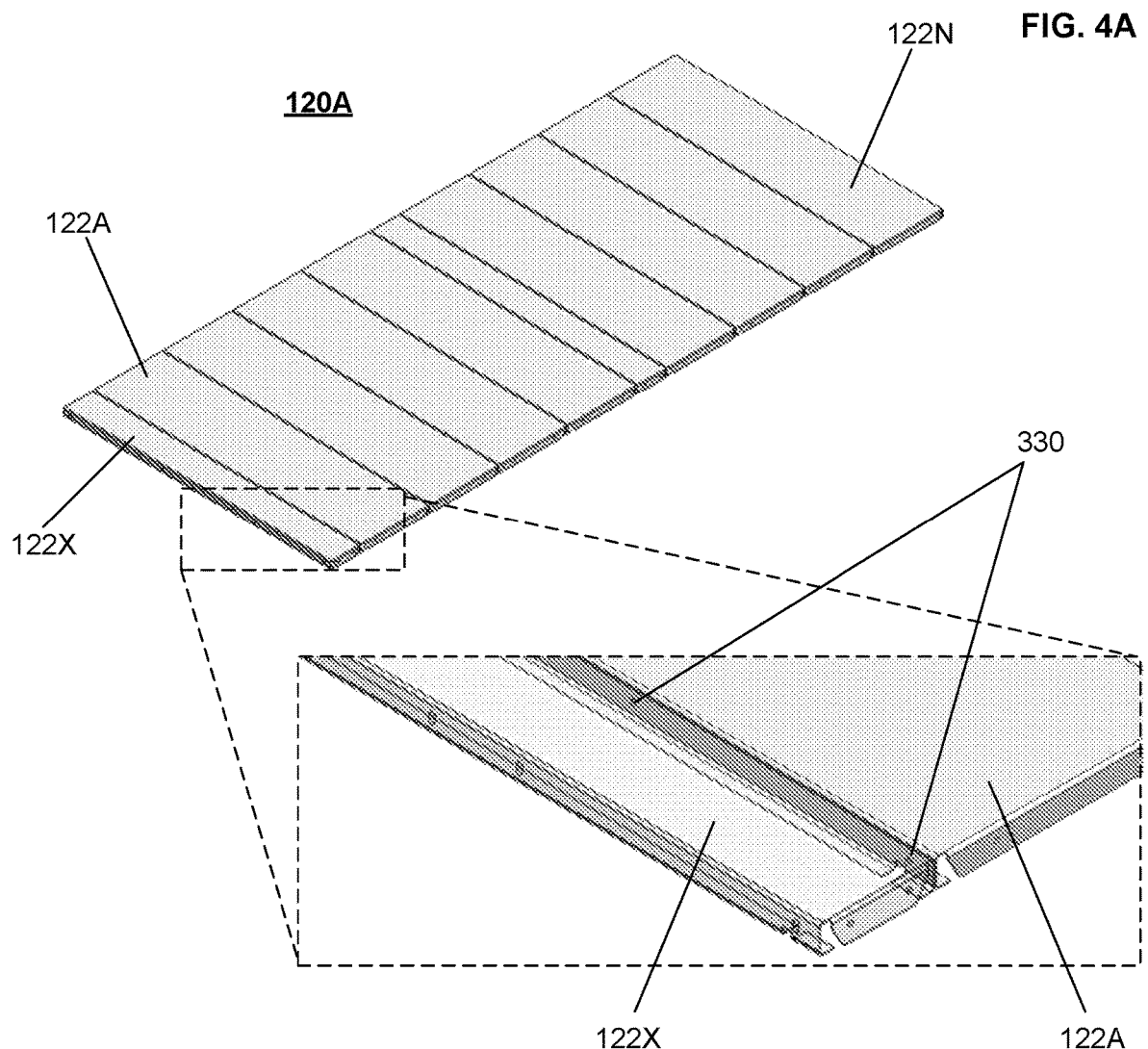
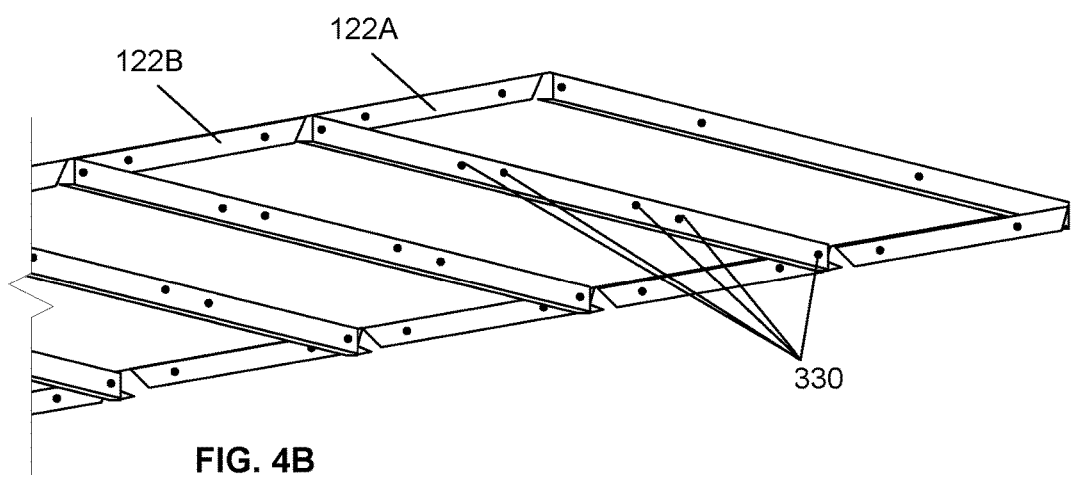

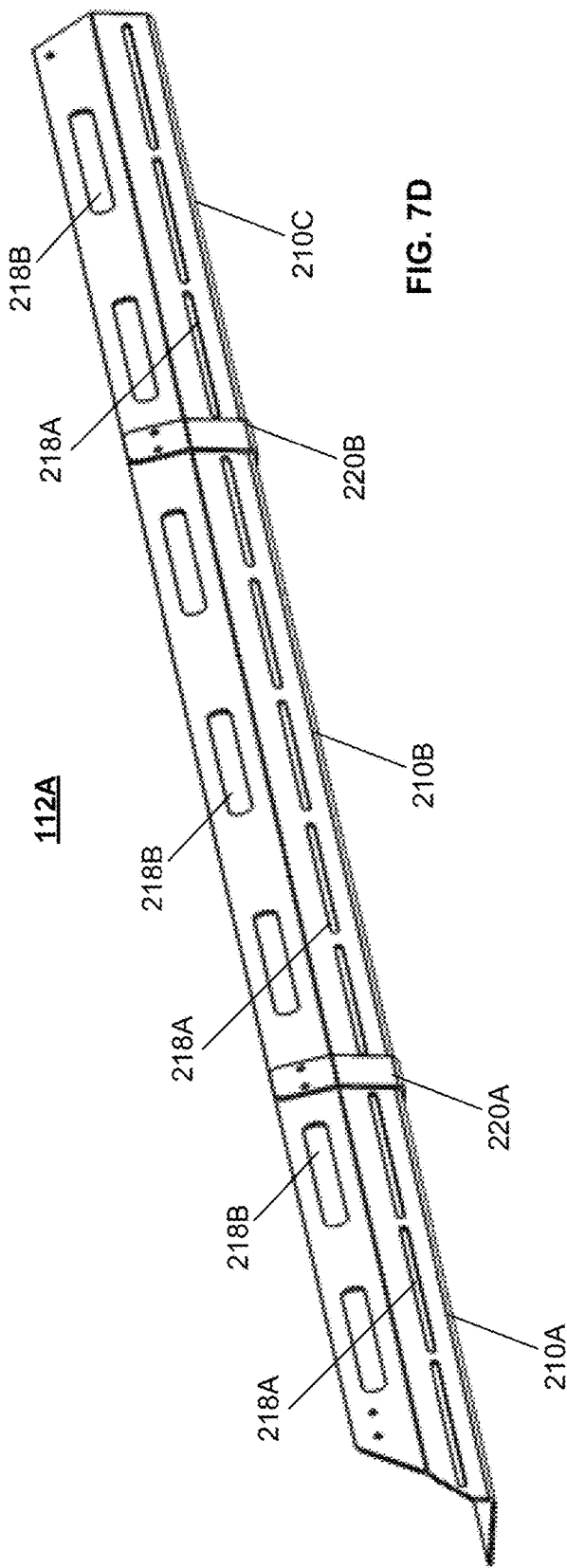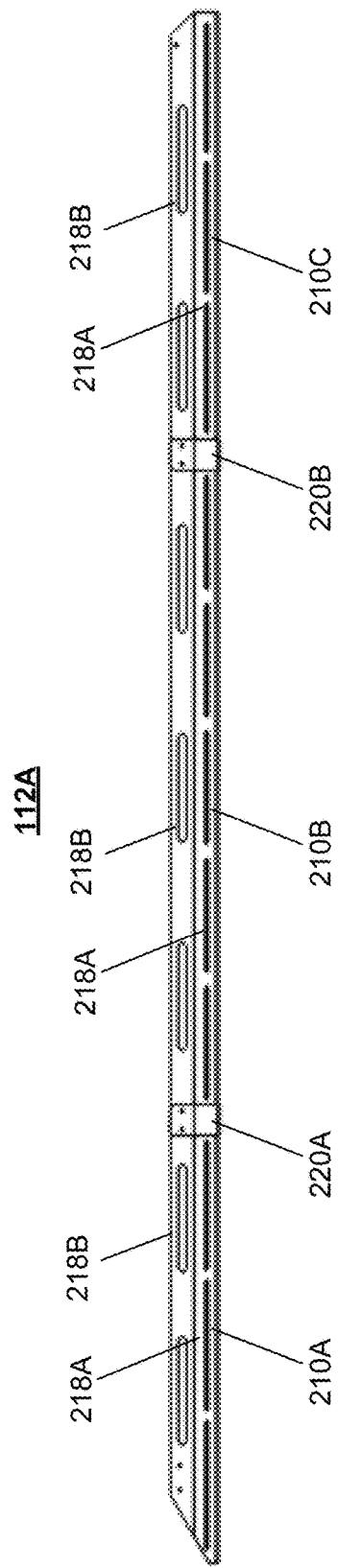

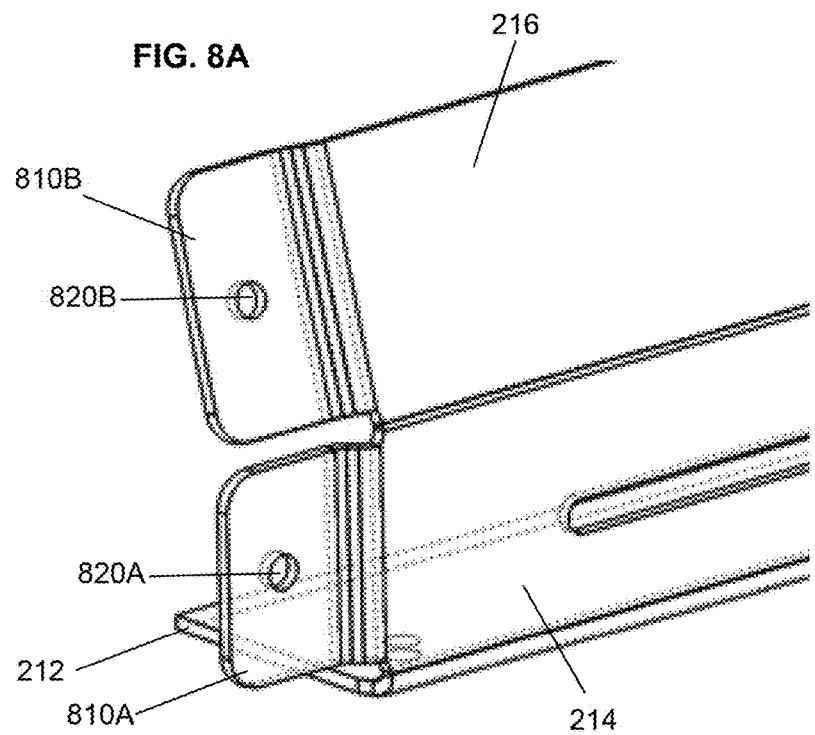
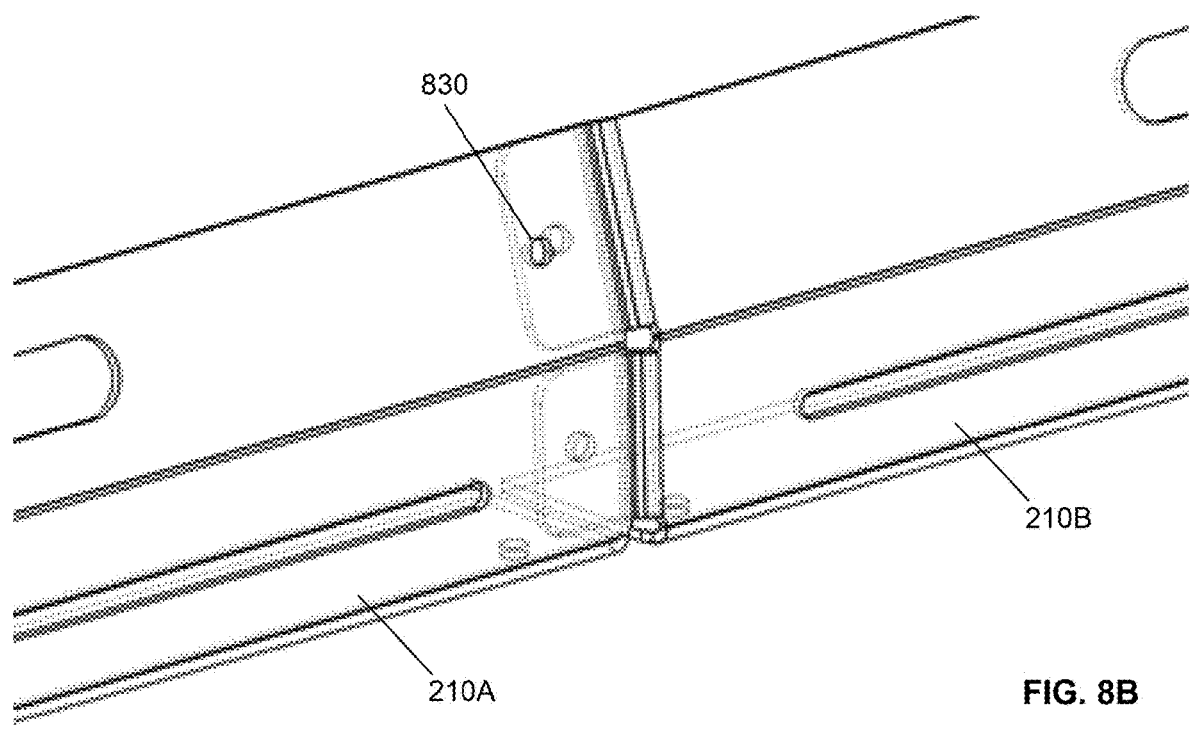

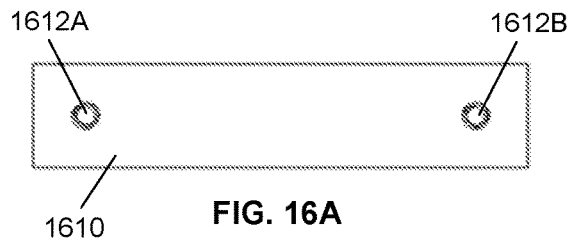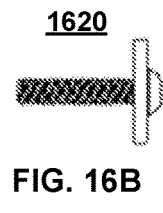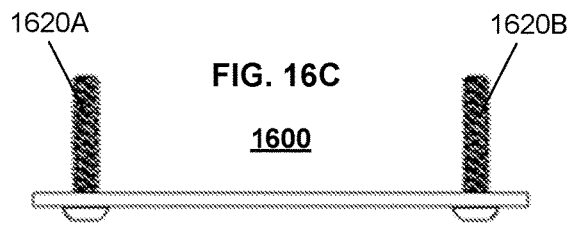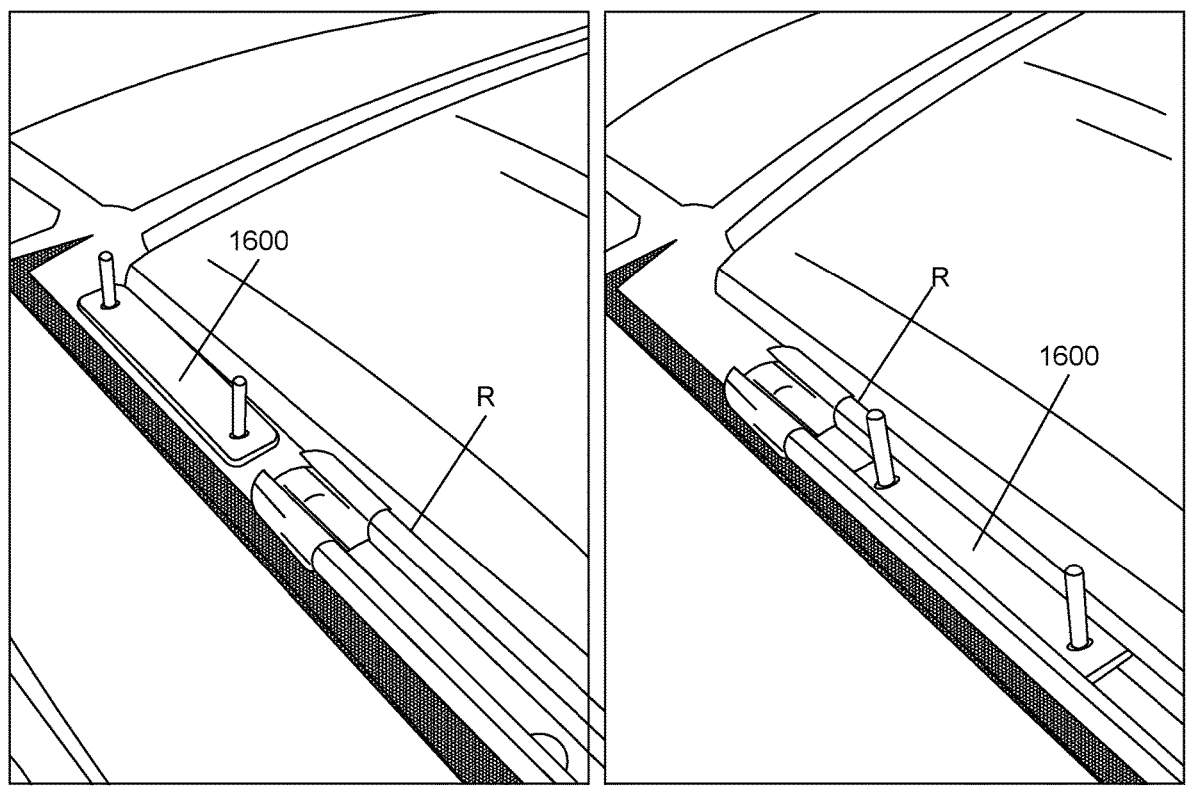
FIG. 16A
FIG. 16B
FIG. 16C
FIG. 16D
FIG. 16E FIG. 18A
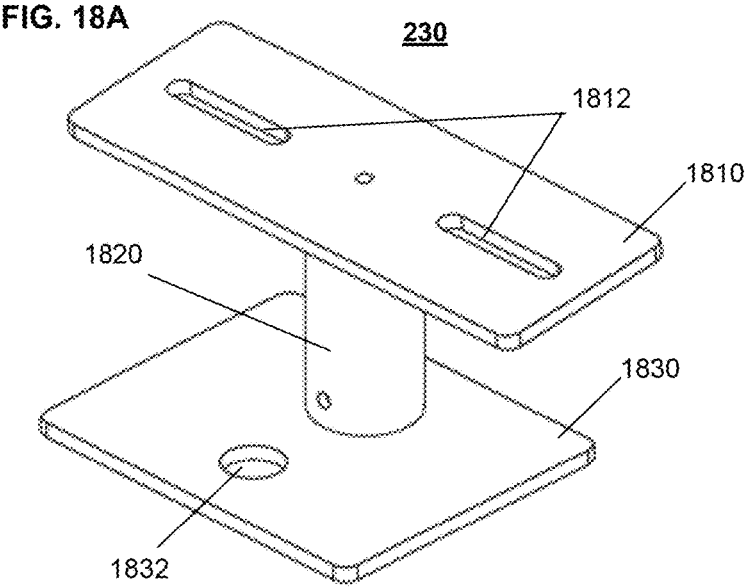
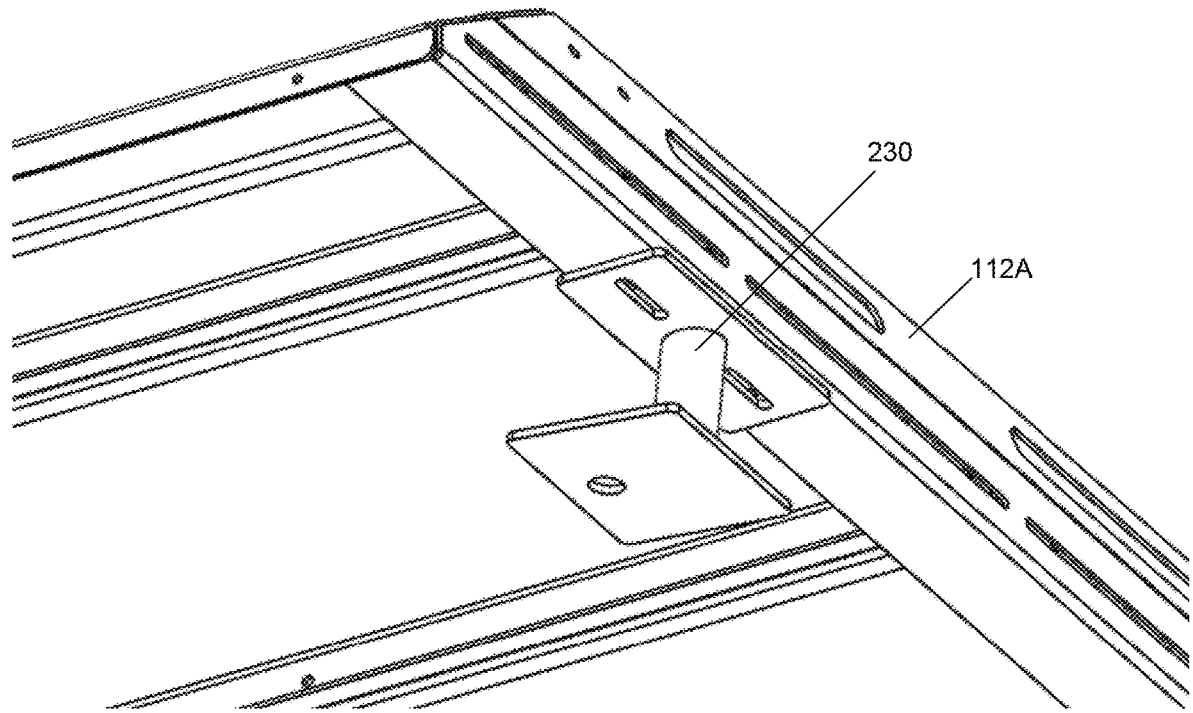
FIG. 18B

FIG. 19A
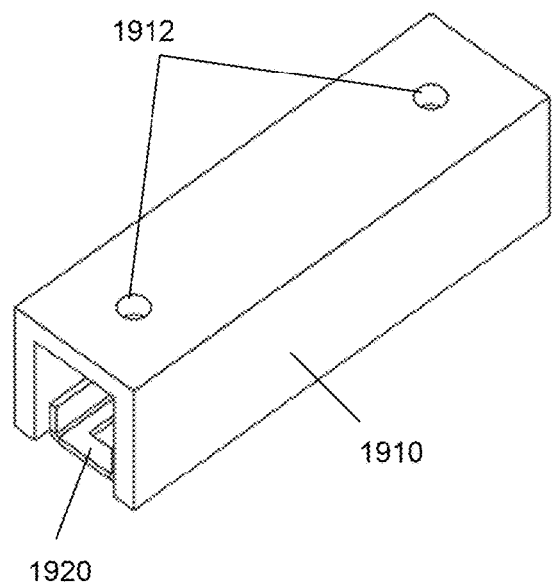
FIG. 19B
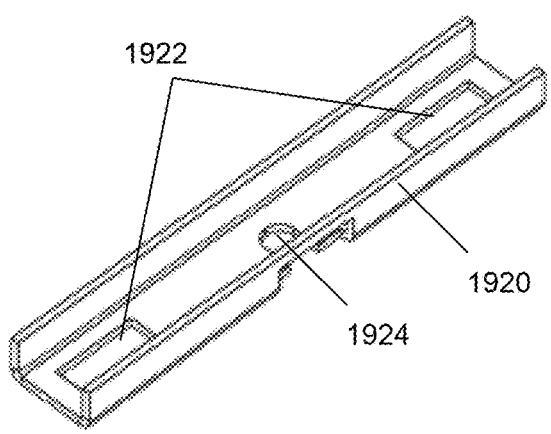
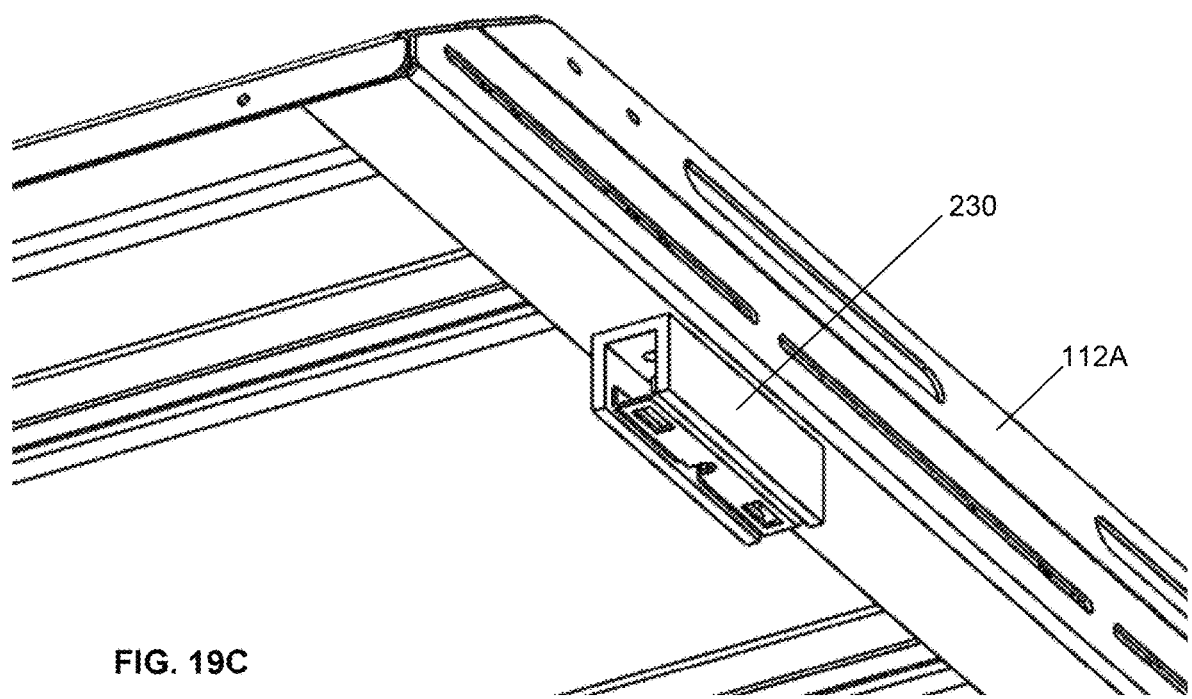
FIG. 19C

FIG. 19D
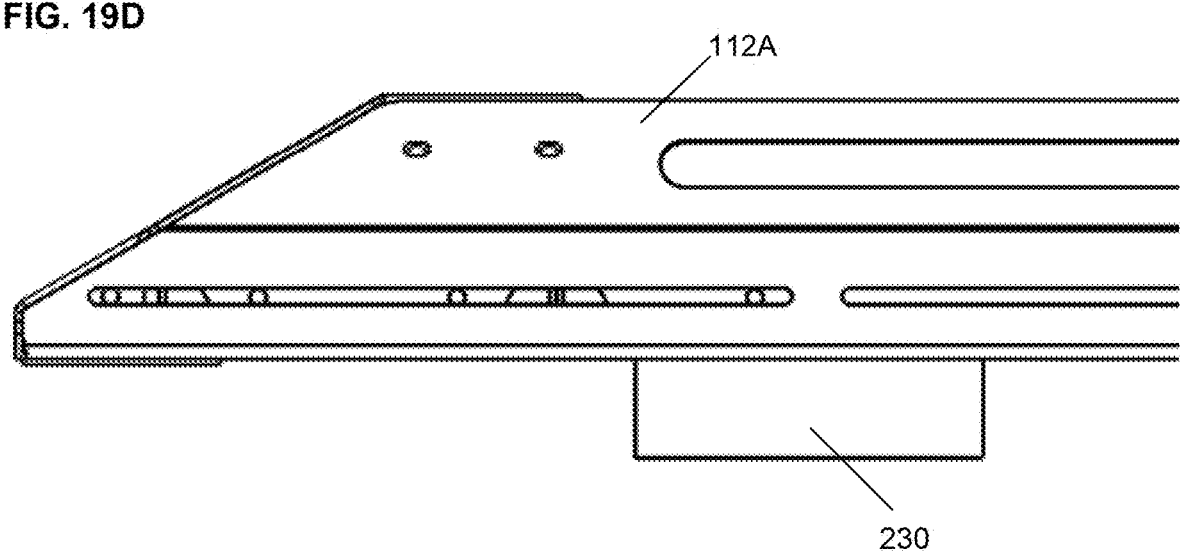
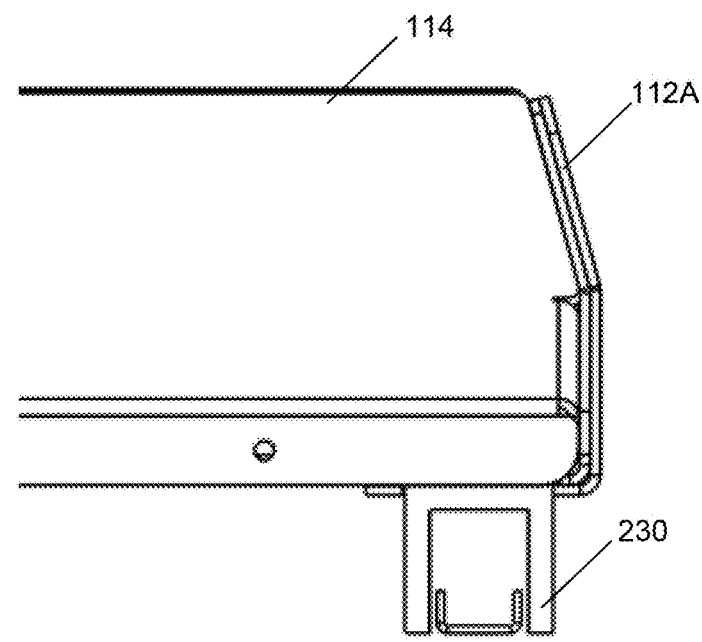
FIG. 19E

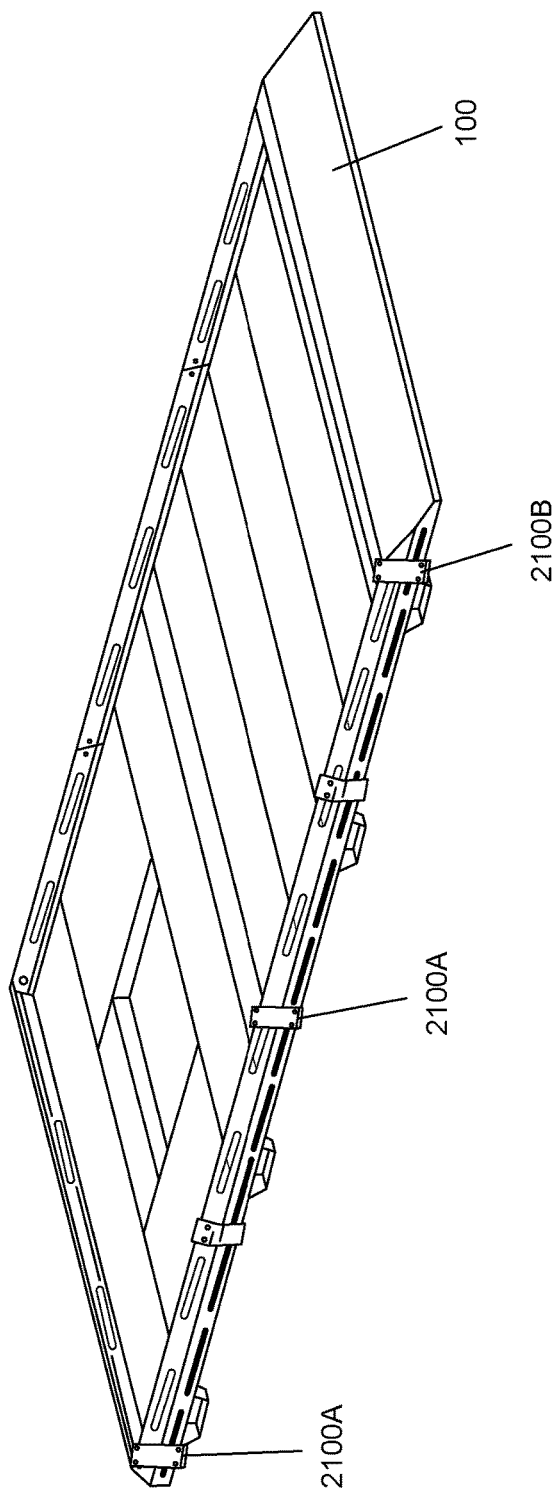
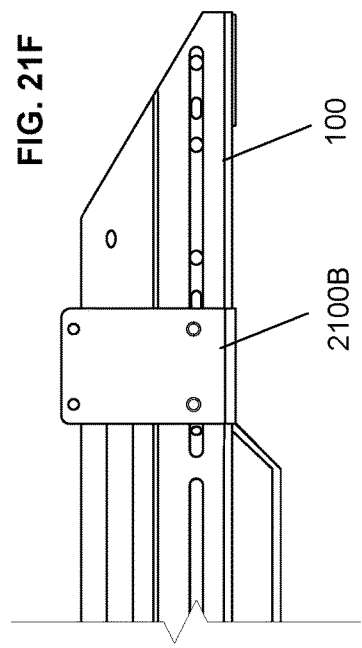
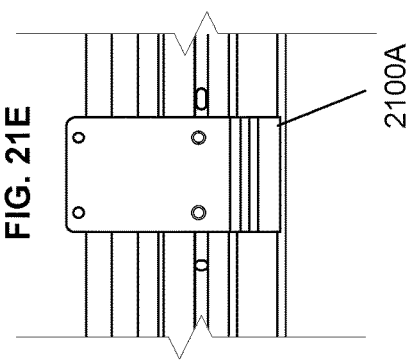
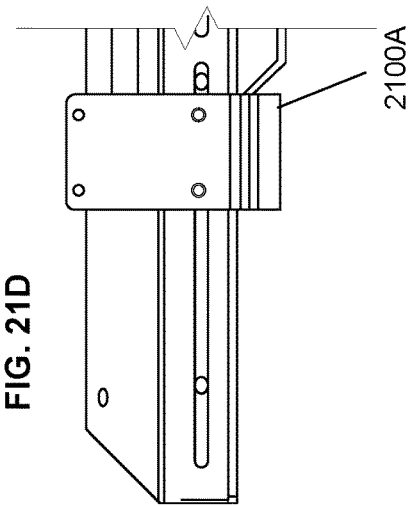

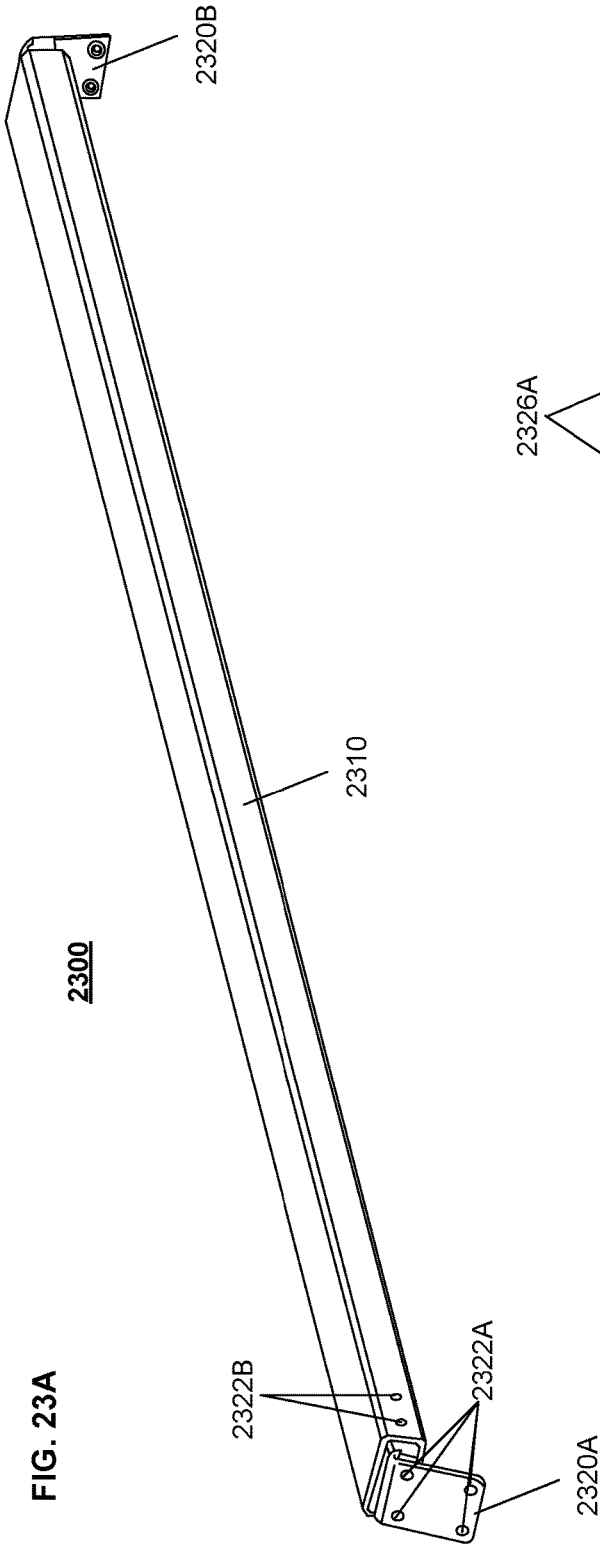
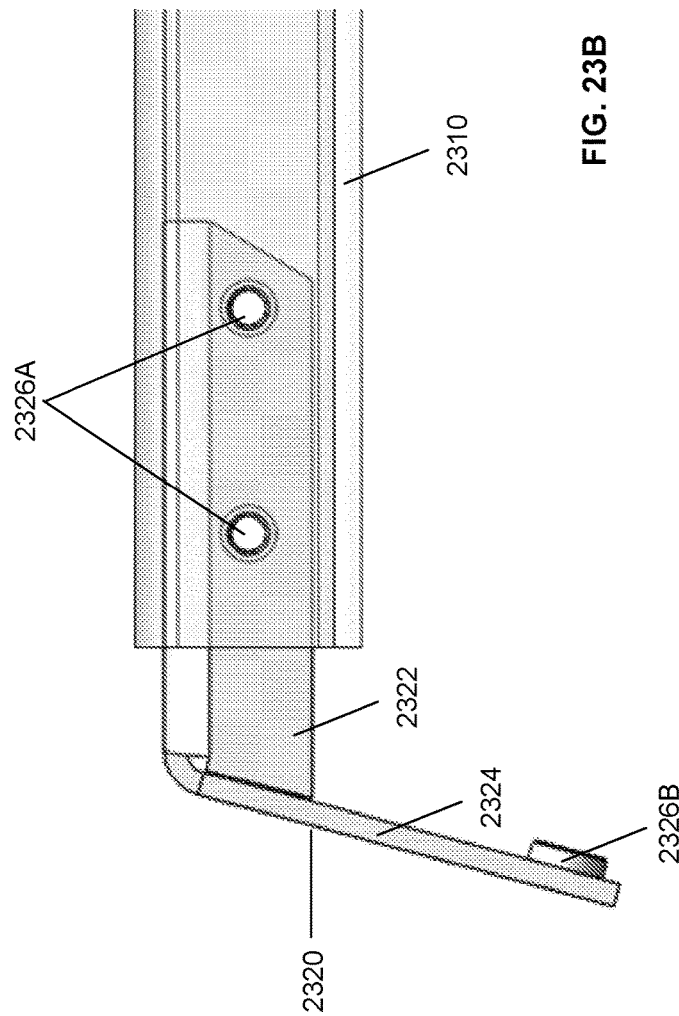
FIG. 23A
FIG. 23B

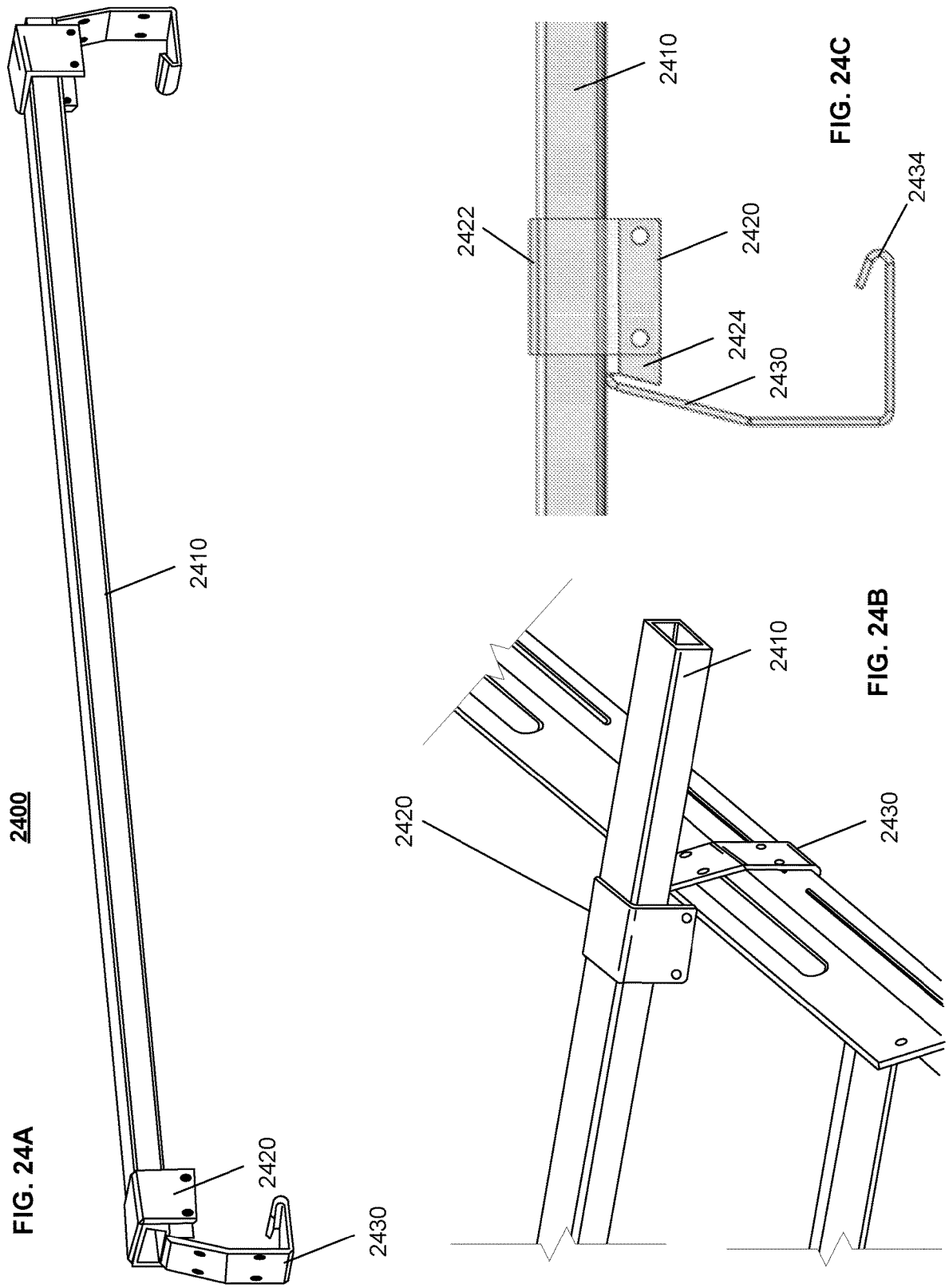

MODULAR ROOF RACK SYSTEM

CROSS-REFERENCE TO RELATED APPLICATIONS

This application claims priority to U.S. Provisional Patent App. No. 62/848,437, filed on May 15, 2019, which is hereby incorporated herein by reference as if set forth in its entirety.

BACKGROUND

Technical Field

This disclosure generally relates to cargo capacity, and, more particularly, to a modular roof rack system for vehicles.

Description of Related Art

Vehicles, such as vans, sport utility vehicles (SUVs), and other recreational and utility vehicles, provide versatility in a variety of applications. These applications can range from recreational activities (e.g., weekend trips) to use as a dwelling for extended periods of time, and are often associated with transporting cargo and/or accessories. For example, a person might use a roof rack to secure miscellaneous tools and equipment.

SUMMARY

Accordingly, a modular roof rack system is disclosed herein. In an embodiment, the modular roof rack system comprises: a plurality of panels configured to be joined together in a same plane to form a platform with a flat top surface; and a plurality of rails configured to be joined together to form a modular frame surrounding the platform and extending above the top surface of the platform.

The platform may comprise at least one opening through the platform and configured to accommodate a feature extending up from the roof of the vehicle. The platform may comprise a panel having the at least one opening in it. Alternatively or additionally, the at least one opening may be formed as a space between two separate ones of the plurality of panels, including as a space in a middle of four separate ones of the plurality of panels. At least a portion of the platform may be continuous from a first side of the platform to a second side of the platform that is opposite the first side, and at least a portion of the platform may be continuous from a third side of the platform to a fourth side of the platform that is opposite the third side. The plurality of panels may comprise a first panel having a first shape, and a second panel having a second shape that is different than the first shape.

The plurality of rails may comprise a front rail, a rear rail, and two side rails extending between the front rail and the rear rail. Each of the two side rails may comprise a plurality of modular segments configured to be joined together linearly to form the respective side rail. The front rail may comprise an angled air dam. A portion of each of the two side rails that extends above the top surface of the platform may be angled inwards towards a center of the modular frame. Each portion of each of the two side rails that extends above the top surface of the platform may comprise a plurality of longitudinal slots. The modular rack system may further comprise a light bar configured to be attached to a front surface of the front rail, wherein, when the modular rack system is mounted on the roof of the vehicle, the light bar extends below the plane of the platform.

The modular rack system may further comprise: a plurality of studded inserts, wherein each of the plurality of studded inserts is configured to slide into a rail on the roof of the vehicle; and a plurality of mounting brackets, wherein each of the plurality of mounting brackets is configured to be attached to a bottom surface of either of the two side rails, such that the mounting bracket extends downward from the side rail to which it is attached, and wherein each of the plurality of mounting brackets is configured to attach to one of the plurality of studded inserts. The platform may be configured to be joined to the modular frame and not to the roof of the vehicle, so as to only be fixed to the roof of the vehicle indirectly via attachment to the modular frame.

Each of the plurality of panels may comprise a top portion and four side portions extending orthogonally downward from the top portion. Each of the four side portions of each of the plurality of panels may comprise one or more apertures configured to align with one or more corresponding apertures in either another one of the plurality of panels or one of the plurality of rails. Each of at least two of the four side portions may be tapered, such that a width of the side portion closer to the top portion is greater than a width of the side portion farther from the top portion.

The modular frame may comprise a plurality of apertures configured to align with a plurality of apertures in one or more accessories configured to be attached to the modular frame. The modular rack system may further comprise the one or more accessories, wherein the one or more accessories comprise one or more of an awning mount, a boat roller, or a crossbar.

BRIEF DESCRIPTION OF THE DRAWINGS

The details of embodiments of the present disclosure, both as to their structure and operation, can be gleaned in part by study of the accompanying drawings, in which like references refer to like parts, and in which:

FIGS. 4A-4E illustrate a manner in which panels may be joined together, according to an embodiment;

FIGS. 7A-7E illustrate a manner in which segments of a rail may be joined together, according to an embodiment;

FIGS. 8A and 8B illustrate a manner in which segments of a rail may be joined together, according to an alternative embodiment;

FIGS. 16A-16E illustrate a studded insert to be installed within rails on the roof of vehicle, according to an embodiment;

FIGS. 18A-18D illustrate a mounting bracket, according to an alternative embodiment;

FIGS. 19A-19E illustrate a mounting bracket, according to an alternative embodiment;

FIGS. 21A-21F illustrate awning brackets used to form an awning mount on a modular rack system, according to an embodiment;

FIGS. 23A and 23B illustrate a crossbar that may be mounted to a modular rack system, according to an embodiment;

FIGS. 24A-24C illustrate a crossbar that may be mounted to a modular rack system, according to an alternative embodiment.

DETAILED DESCRIPTION

Embodiments are disclosed of a modular rack system that is designed for use with a vehicle (e.g., a van, such as the Mercedes Sprinter™, a minivan, an SUV, a recreational vehicle (RV), etc.). The modular rack system can be an after-market system that is installed after the vehicle has been purchased from a manufacturer or dealer. The modular rack system may be configured to attach to a roof of the vehicle to provide a platform, for example, for equipment and/or accessories. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In an embodiment, the modular rack system comprises panels and rails. The panels can be interchanged to form openings to accommodate pre-installed accessories, such as roof vents. Each panel may connect with surrounding panels and be secured through fasteners, such as nuts and bolts, screws, or interlocking connections, to form a flat substantially continuous platform. Panels can be added to or removed from the modular rack system to create different panel configurations that accommodate various vehicle sizes (e.g., varying wheelbases, body lengths, roof types, etc.) and may comprise openings to accommodate features on the roof of the vehicle (e.g., vents for attic fans and/or air-conditioning units, etc.). Furthermore, the rails can be lengthened or shortened to accommodate the different panel configurations by adding or removing rail portions or by swapping in or out rail portions of different lengths. In addition, accessories may be installed on the rails.

1. Overview of Modular Rack System

Figure 1A:
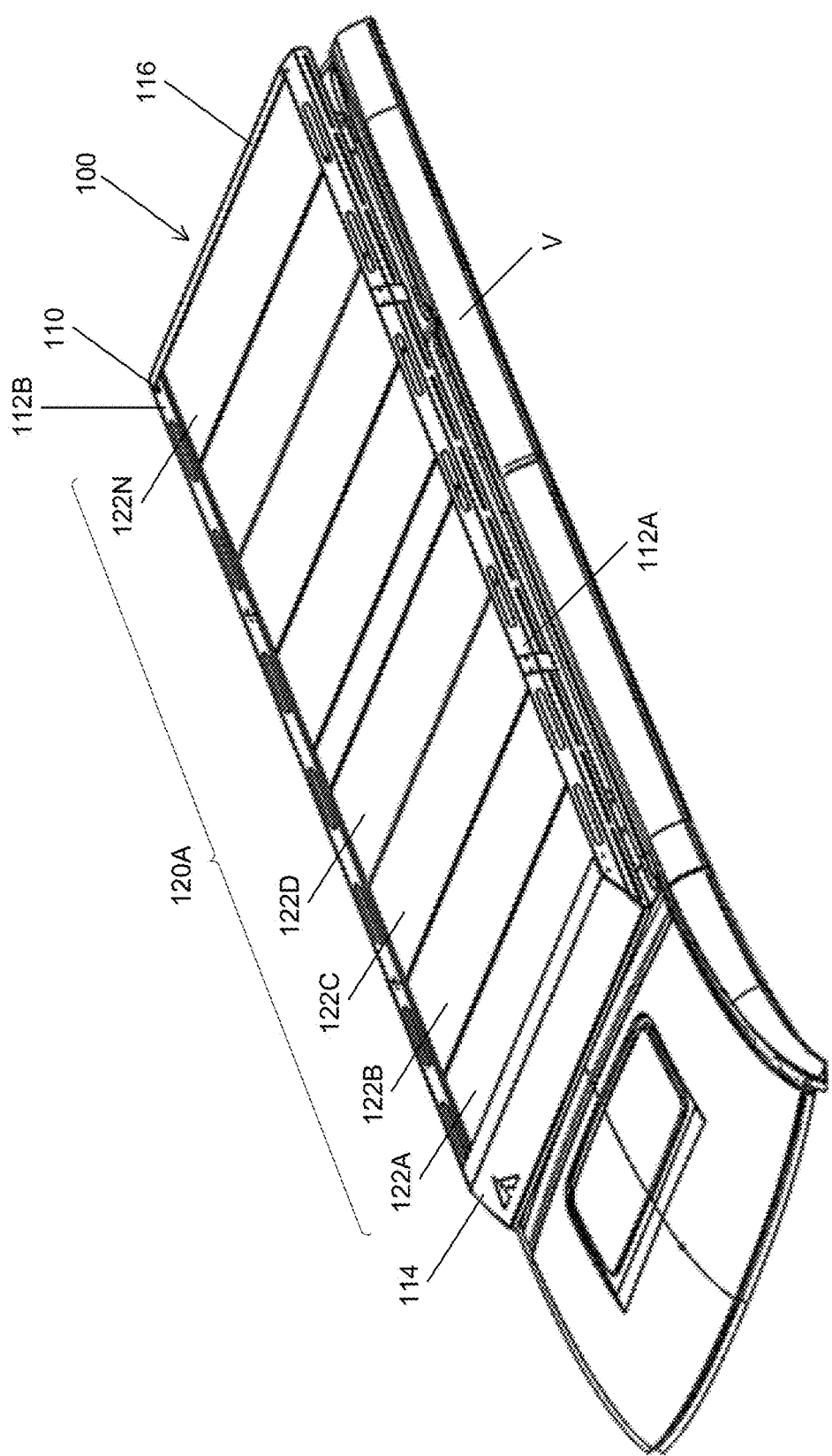
FIG. 1A-1D illustrate top perspective views of different configurations of a modular rack system, according to an embodiment.

FIG. 1A illustrates a modular rack system 100, attached to a vehicle V, according to an embodiment. Modular rack system 100 can be mounted on the roof of vehicle V. As illustrated, modular rack system 100 comprises a modular frame 110 and a platform 120 comprising a plurality of connected panels 122.

Modular frame 110 may comprise first and second side rails 112A and 112B, a front rail 114, and a rear rail 116. In an embodiment, each rail 112, 114, and 116 comprises one or more modular segments. In the event that a rail 112, 114, or 116 comprises multiple modular segments, the modular segments may be arranged linearly, and adjacent modular segments may be connected by rail brackets. First side rail 112A and second side rail 112B may be mirror images of each other. Thus, any features described with respect to one side rail 112 may also apply to the other side rail 112.

Modular rack system 100 may be affixed to the roof of vehicle V via mounting brackets that couple modular frame 110 to vehicle V. For example, one or more, and preferably two or more, mounting brackets may be connected between each of side rails 112 and vehicle V to affix each side rail 112 to vehicle V. The mounting brackets may be connected to slidable inserts within a rail on the roof of vehicle V so that the length of side rails 112 can be easily adjusted (e.g., by adding, removing, or replacing modular segments of side rails 112), for example, to accommodate the particular wheel base of vehicle V, as described in greater detail elsewhere herein. Alternatively or additionally, one or more mounting brackets may be connected between front rail 114 and vehicle V and/or between rear rail 116 and vehicle V.

In an embodiment, a plurality of panels 122 are positioned and connected together to form a flat continuous platform 120 within modular frame 110. In the illustrated example of FIG. 1A, each panel 122 extends from first side rail 112A to second side rail 112B. In addition, a front panel 122A is positioned adjacent to front rail 114, and a rear panel 122N is positioned adjacent to rear rail 116. Modular frame 110 may be bolted to and around the platform, formed by panels 122, to provide stability to the panel platform and attachment to the roof of vehicle V. A portion of modular frame 110 may extend above the plane of platform 120 to prevent cargo from sliding off of platform 120. In an embodiment, the top and bottom surfaces of each panel 122 are generally rectangular in shape.

Figure 1B:
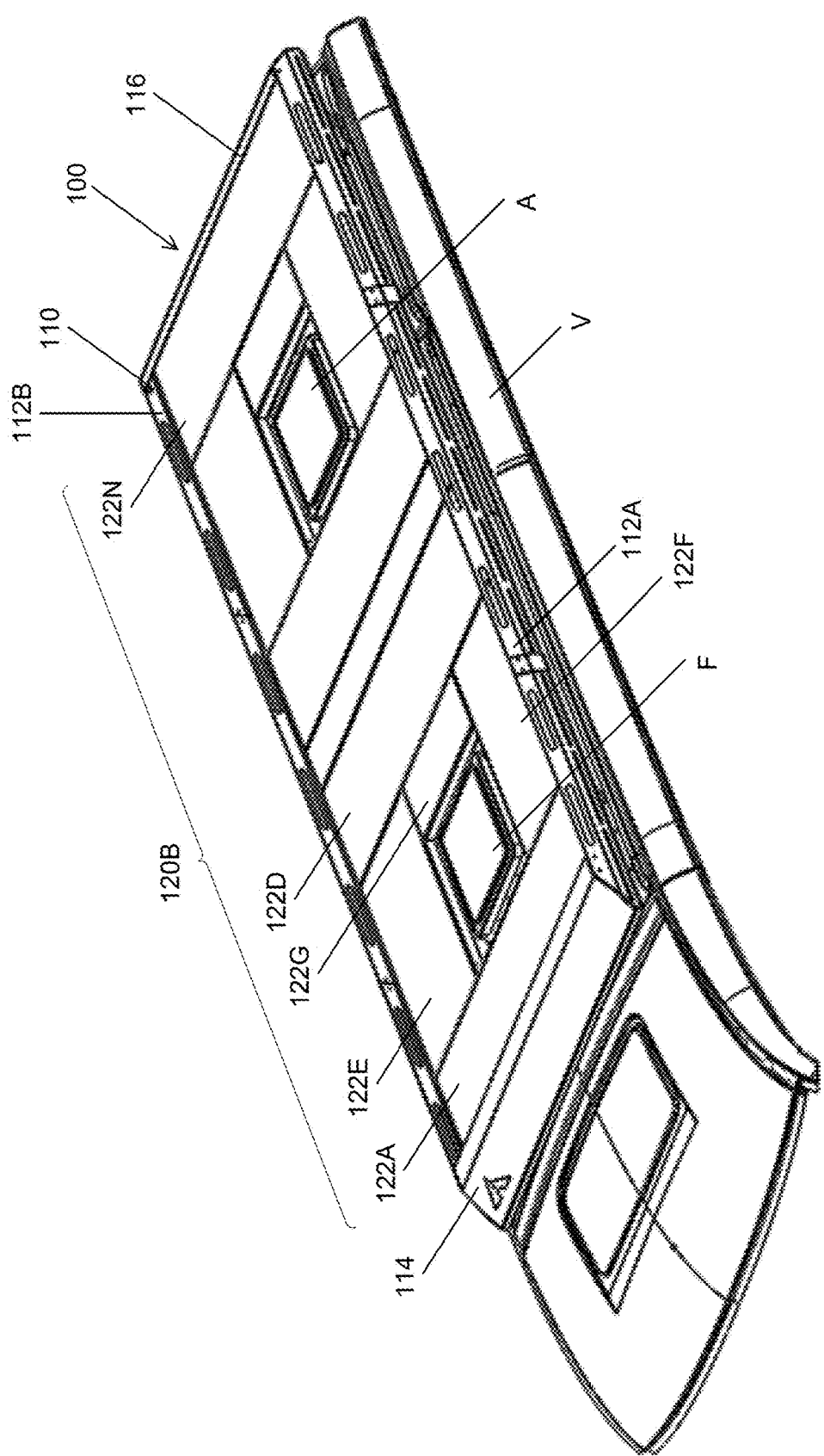

FIG. 1B illustrates modular rack system 100, attached to the roof of vehicle V, with an alternative layout or configuration to the one illustrated in FIG. 1A, according to an embodiment. As demonstrated by this alternative configuration, panels 122 may be interchanged to form openings to accommodate roof features F, such as vents, that extend above the top surface of the roof of vehicle V. Panels 122 may have different shapes and sizes, including a medium panel, a small panel, a standard panel, and a narrow panel. The standard and narrow panels can span from first side rail 112A to second side rail 112B. The medium panels can span between two different standard panels, two narrow panels, or one narrow panel and one standard panel. The small panels can extend between two medium panels and may connect with a standard panel. In the illustrated example, panels 122B and 122C in FIG. 1A have been removed, and, in their place, panels 122E, 122F, 122G have been installed to provide an opening through which feature F (e.g., a vent for an air-conditioning system or other system) may protrude. A similar change has been made to panels near the rear of modular rack system 100. Thus, in this configuration, platform 120 has two openings surrounding features F that protrude from the roof of vehicle V.

Figure 1C:
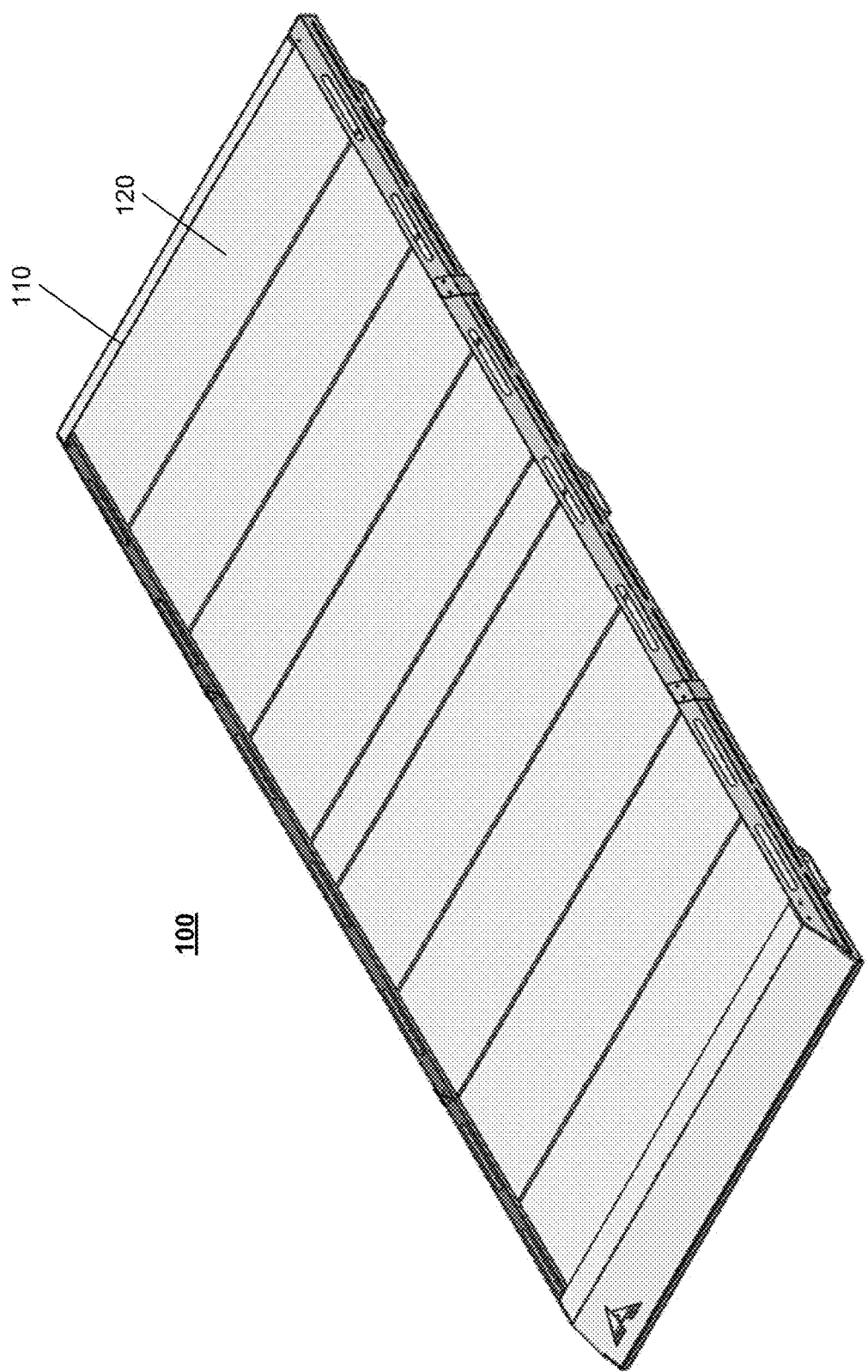
Figure 1D:
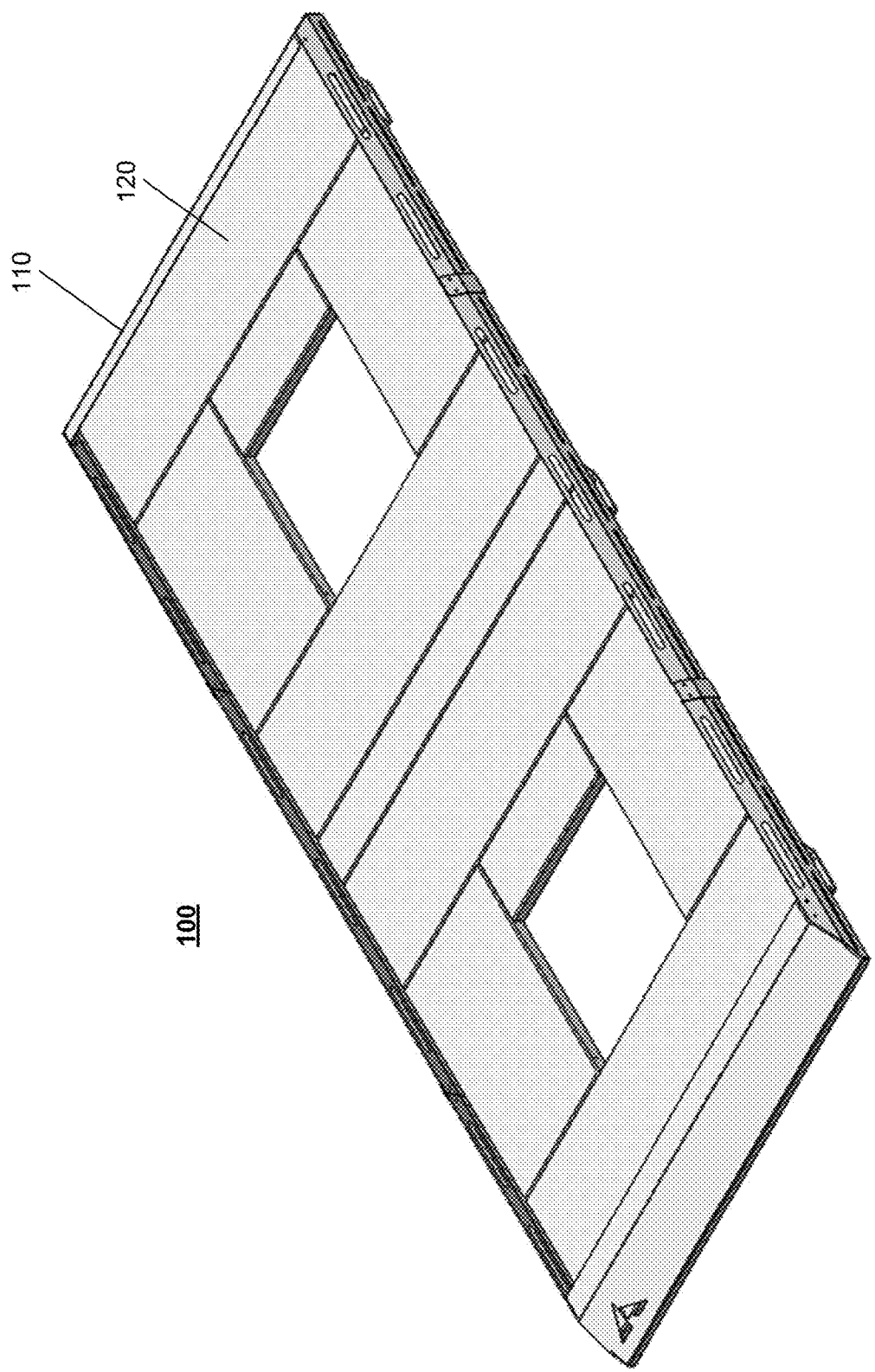

FIGS. 1C and 1D illustrate the modular rack systems 100, from FIGS. 1A and 1B, respectively, in isolation, according to an embodiment. The illustrated configurations may be suitable for a vehicle V with a wheelbase of 144". As depicted in FIG. 1D, platform 120 has two openings to accommodate features installed on the roof of vehicle V.

Figure 2A:
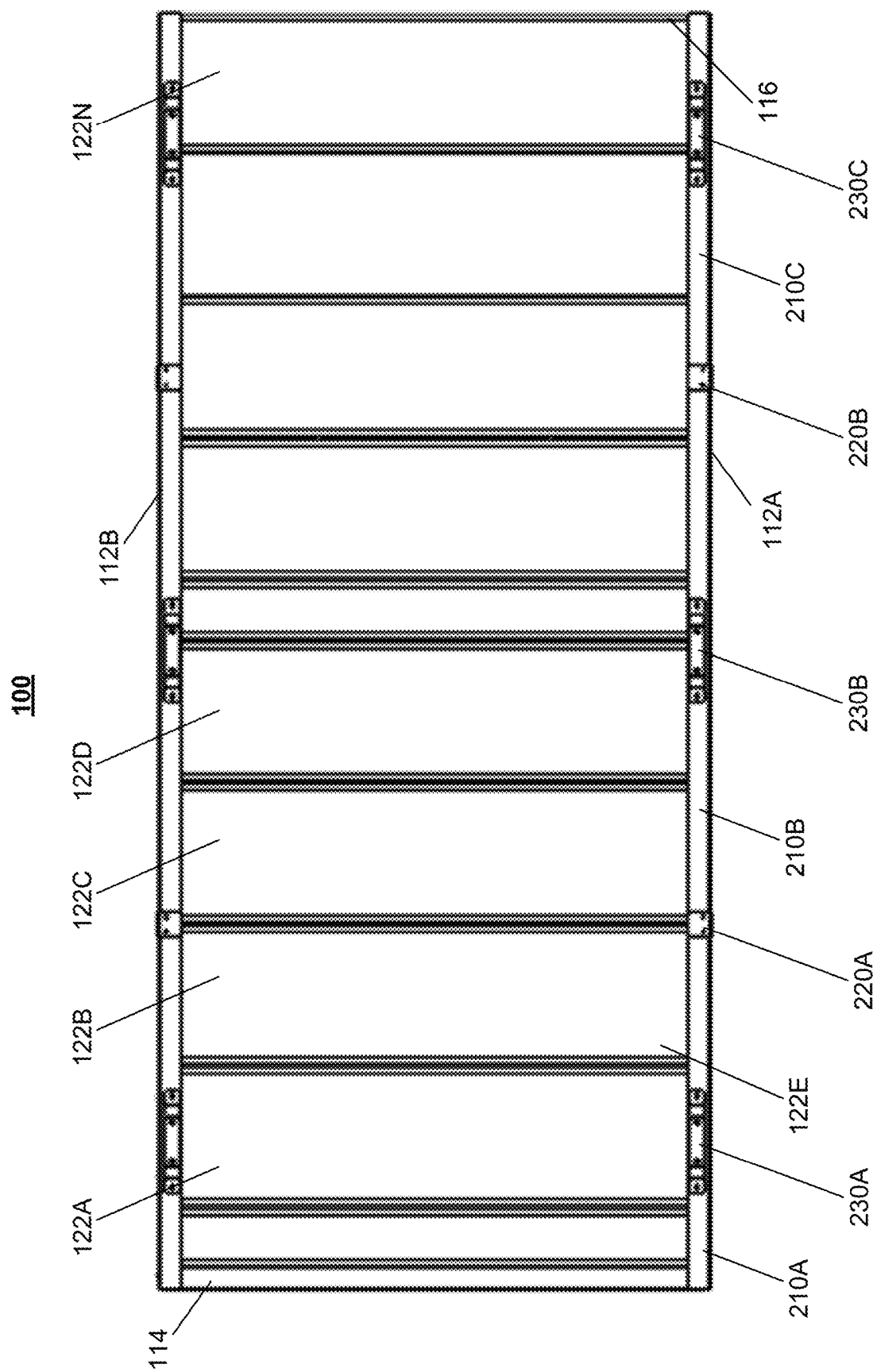
FIGS. 2A and 2B illustrate bottom views of different configurations of a modular rack system, according to an embodiment.
Figure 2B:
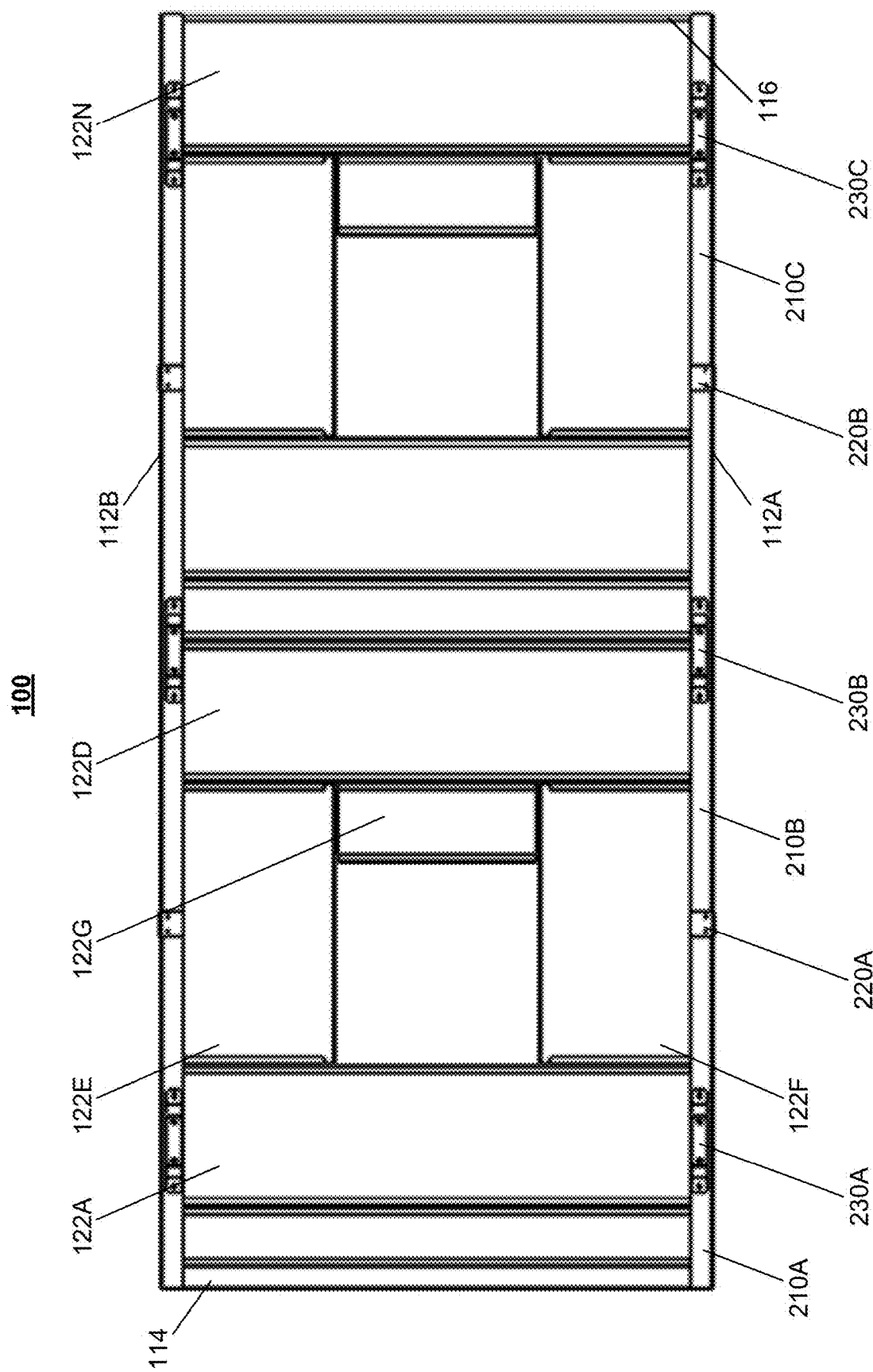

FIG. 2A illustrates a bottom view of the modular rack system 100 in FIGS. 1A and 1C, according to an embodiment, and FIG. 2B illustrates a bottom view of the modular rack system 100 in FIGS. 1B and 1D, according to an embodiment. As illustrated, each side rail 112 comprises a plurality of linearly aligned modular segments 210, while front rail 114 and rear rail 116 comprise only a single segment. Each pair of adjacent modular segments in side rails 112 are affixed to each other by a rail bracket 220. For instance, modular segment 210A is adjoined to modular segment 210B by rail bracket 220A, and modular segment 210B is adjoined to modular segment 220C by rail bracket 220B. Notably, modular end segments 210A and 210C are equal in length, and modular middle segment 210B is longer than modular end segments 210A and 210C. More generally, modular segments 210 may be provided in a plurality of different lengths. Thus, side rails 112 can be lengthened or shortened, by adding or removing modular segments 210 or replacing existing modular segments 210 with modular segments 210 of different lengths. This enables modular frame 110 to accommodate vehicles V of different wheelbases and lengths, as well as different panel configurations. Similarly, front rail 114 and rear rail 116 could comprise multiple modular segments to accommodate vehicles V of different widths.

In an embodiment, modular frame 110 can comprise a plurality of mounting brackets 230 on the bottom surface of each side rail 112. Mounting brackets 230 may be used to affix modular frame 110 to vehicle V, as described in more detail elsewhere herein. While FIGS. 2A and 2B illustrate three mounting brackets 230 on each side rail 112, it should be understood that each side rail 112 may comprise more or fewer than three mounting brackets 230. The number and/or placement of mounting brackets 230 may depend on the vehicle V to which modular frame 110 is being affixed, user preference, and/or the manufacturer's design.

One or more, including potentially all, of the components of modular rack system 100 (e.g., rails 112, 114, and 116 in modular frame 110, and panels 122 in platform 120) may comprise sheet metal. Each component may be manufactured by bending, stamping, or extruding the sheet metal. Alternatively, one or more, including potentially all of, the components may be manufactured from different material than sheet metal and/or using different processes than bending, stamping, or extrusion.

2. Panels

Figure 3:
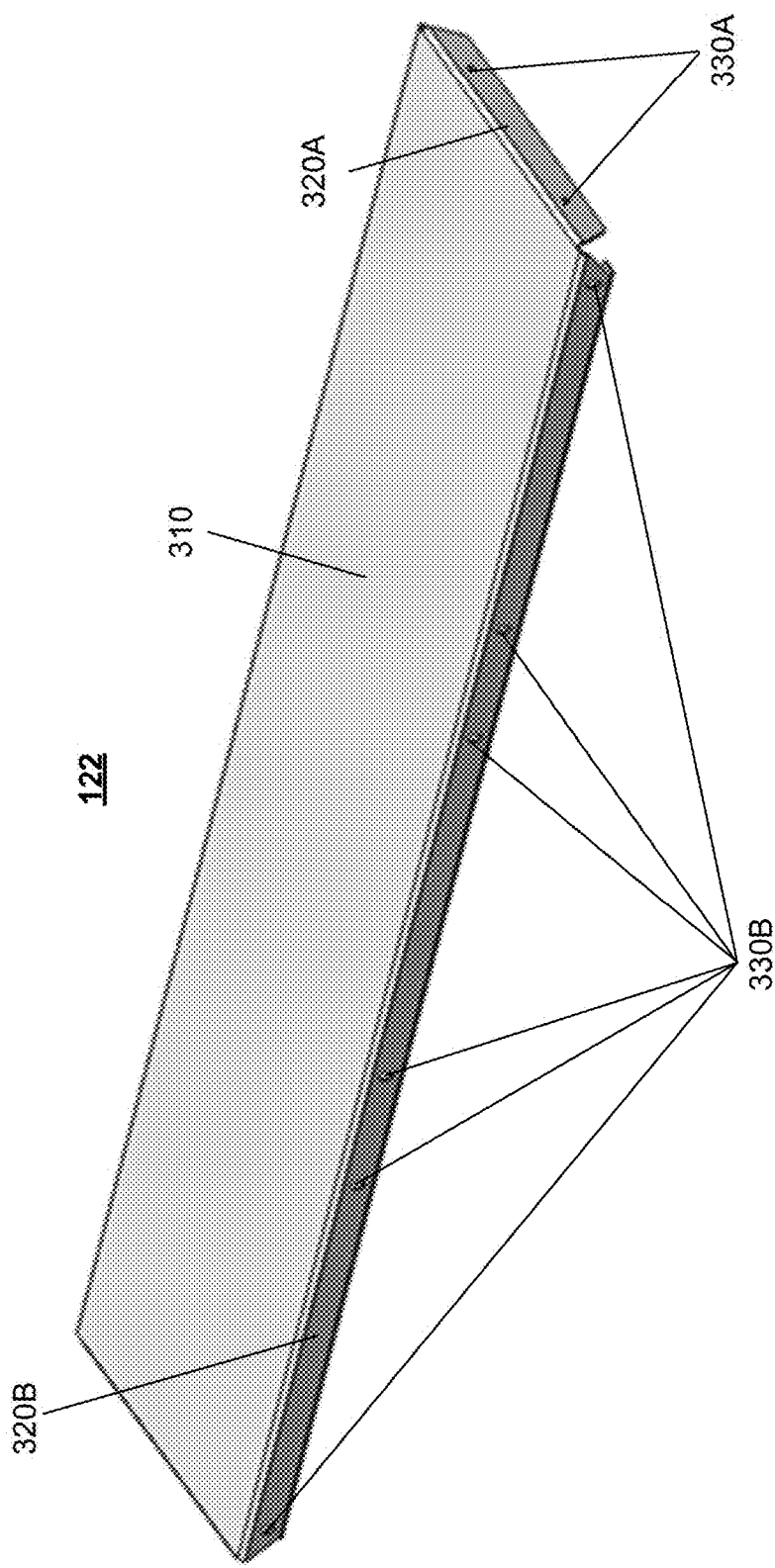
FIG. 3 illustrates a panel of a modular rack system, according to an embodiment.

FIG. 3 illustrates a panel 122 in isolation, according to an embodiment. Panel 122 in FIG. 3 may correspond to a standard panel 122, such as panel 122A in FIGS. 1A and 1B. Each panel may comprise a flat top portion 310 and side portions 320 extending at a substantially orthogonal angle downward from top portion 310. In a rectangular panel 122, the four side portions 320 may comprise short side portions 320A and long side portions 320B. On the other hand, a square panel would comprise side portions 320 of the same width. For the standard panel 122, illustrated in FIG. 3, each short side portion 320A is configured to be adjoined to side rail 112, whereas each long side portion 320B is configured to be adjoined to another panel 122, front rail 114, or rear rail 116.

Each side portion 320 of each panel 122 may have one or more, and preferably multiple, fastening apertures 330 (e.g., holes). Each fastening aperture 330 may be identical, or subsets of fastening apertures 330 may be different, depending on their intended uses. For example, in the illustrated embodiment, apertures 330A on short side portion 320A are different than apertures 330B on long side portion 320B. In this case, apertures 330A are configured to be adjoined to corresponding apertures (e.g., slots) on side rails 112, and apertures 330B are configured to be adjoined to corresponding apertures 330 on another panel 122, front rail 114, or rear rail 116. In an alternative embodiment, all of apertures 330 could be identical. In any case, all of apertures 330 are positioned to align with corresponding apertures on another panel 122 and/or a component of modular frame 110.

Panels 122 may be provided in different shapes and sizes than the panel 122 illustrated in FIG. 3. Such panels 122 may comprise all of the same characteristics as panel 122 illustrated in FIG. 3, but with different dimensions in the length and/or width of top portion 310, different widths in side portions 320, and/or different numbers and/or spacing of apertures 330. In addition, one or more dimensions of one type of panel 122 may relate to (e.g., be a multiple of) at least one dimension of another type of panel 122. For example, as illustrated in FIG. 2B, the length of panel 122E is twice the width of panel 122B.

3. Platform

FIGS. 4A-4E illustrate detailed examples of some manners in which two or more panels 122 may be fixed to each other, according to embodiments. To illustrate the various connections, one or more panels 122 may be depicted as transparent in the figures. This should not be interpreted as meaning that physical embodiments of the panel 122 are actually transparent, even though physical embodiments of one or more panels 122 may be transparent if desired.

FIG. 4A is a top perspective view of platform 120A, formed by the plurality of panels 122 illustrated in FIGS. 1A, 1C, and 2A, according to an embodiment. FIG. 4B is a bottom perspective view of a portion of a platform 120, according to an embodiment. As shown, the top surfaces of joined panels 122 form a substantially continuous and flat platform 120. When panels 122 are aligned, apertures 330 within adjacent side portions 320 of adjacent panels 122 are also aligned to form pairs of aligned apertures 330. For example, as illustrated in the close-up view in FIG. 4A, apertures 330 in the adjacent long side portions 320B of panels 122A and 122X are aligned with each other. Accordingly, fastener may be inserted through each pair of aligned apertures 330 to fix adjacent panels 122 to each other. It should be understood that the number and dimensions of panels 122 may be selected to form platforms 120 of varying dimensions.

Figure 4C:
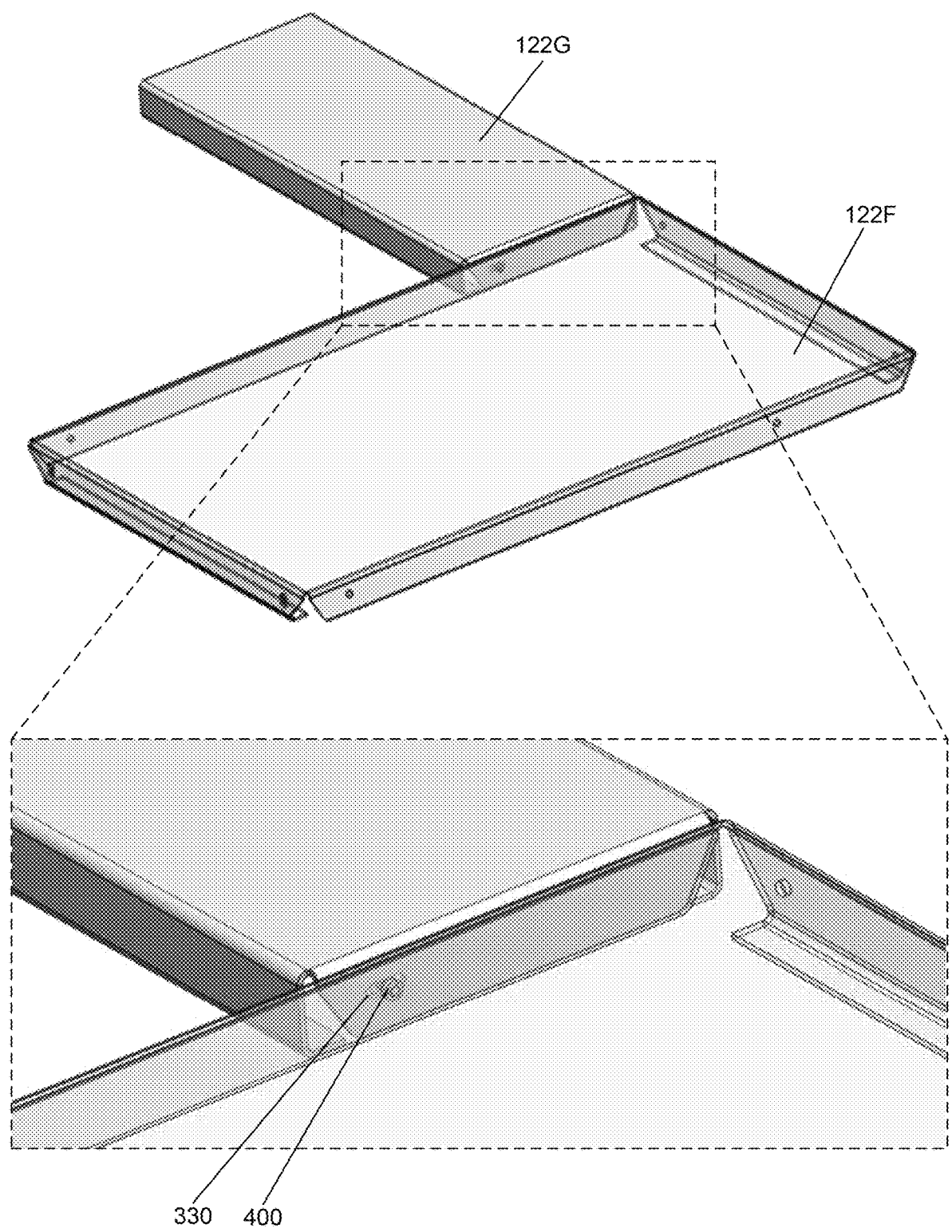
Figure 4D:
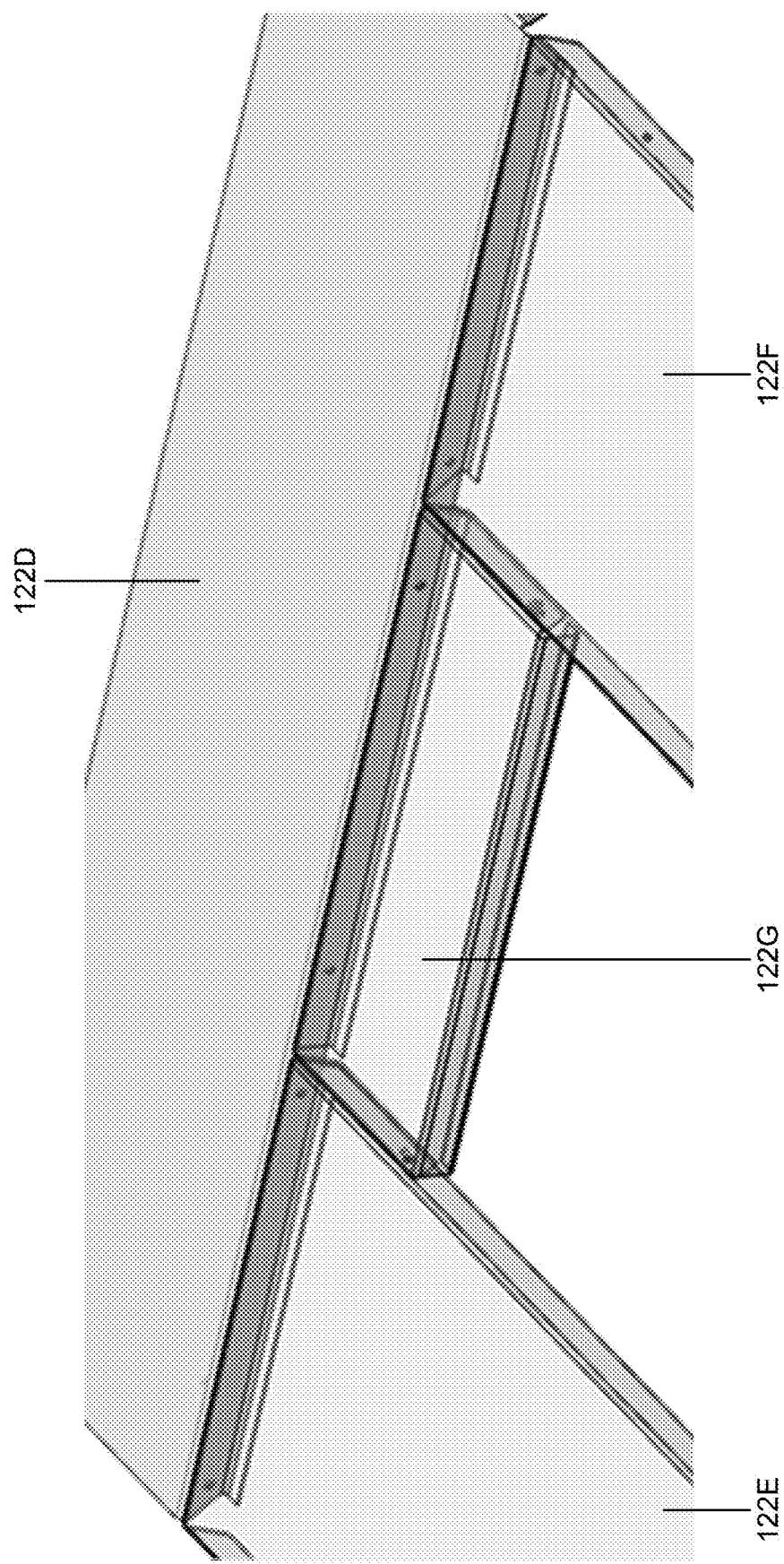

FIG. 4C is a top perspective view of adjacent and joined panels 122F and 122G in platform 120B, and FIG. 4D is a top perspective view of joined panels 122F and 122G, within a larger context in platform 120B, according to an embodiment. As illustrated, panels 122F and 122G are aligned and joined by a fastener 400, inserted through an aperture 330. In this particular example implementation, fastener 400 comprises a bolt that is inserted through one side of aperture 330 in the side portion 320 of panel 122F and tightened within a nut on the opposite side of aperture 330 in the side portion 320 of panel 122G. However, fastener 400 could alternatively comprise a screw that is inserted into a corresponding threaded screw hole.

Figure 4E:
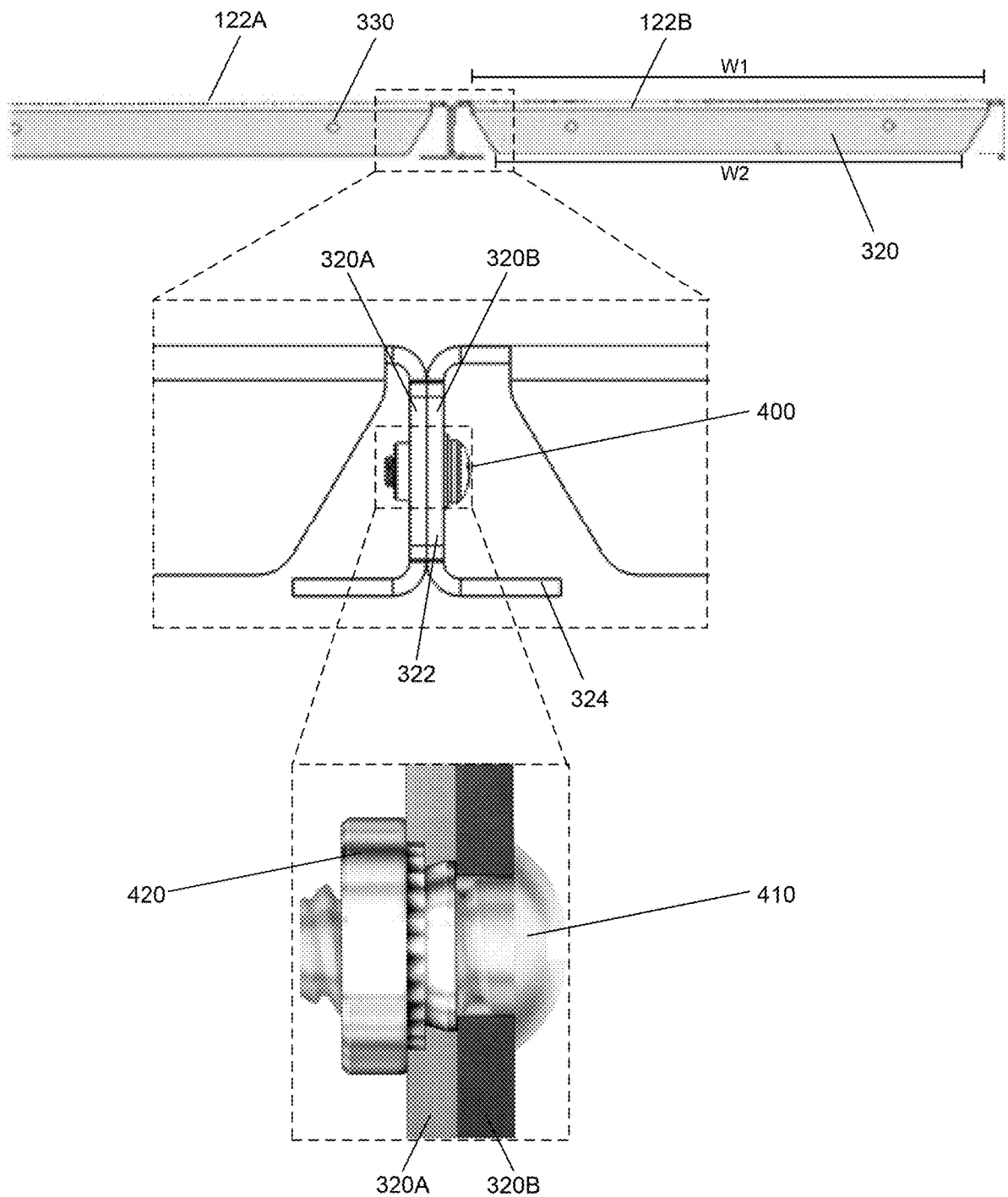

FIG. 4E illustrates an example of fastener 400 that may be used to join a panel 122 to another panel 122 or a rail 112, 114, or 116 in modular frame 110, as well as certain features of side portions 320, according to an embodiment. As illustrated, fastener 400 may comprise a bolt 410, with a threaded end, and a nut 420. In this case, the threaded end of bolt 410 is inserted, from one side, through adjacent apertures 340, into a nut 420 on the other side, and nut 420 is tightened around the threaded end of bolt 410 to press and secure adjacent side portions 320A and 320B between bolt 410 and nut 420. In an embodiment, fastener 400 comprises a PEM™ Fastener.

Notably, as illustrated in FIG. 4E, side portions 320 may taper, such that they are wider at the top (i.e., proximate to top portion 310) than at the bottom (i.e., distal from top portion 310). Specifically, width W1 at the top of side portion 320 is greater than width W2 at the bottom of side portion 320. Every side portion 320 may have this tapering, or only a subset of side portions 320 may have this tapering.

In addition, each side portion 320 may comprise a first portion 322 that curves and extends orthogonally down from the plane of top portion 310, and a second portion 324 that curves and extends orthogonally from first portion 322 and parallel to the plane of top portion 310 underneath top portion 310. Every side portion 320 may have this structure, or only a subset of side portions 320 may have this structure. For example, in an embodiment, side portions 320 which are configured to be fixed to side rails 112 only have a first portion 322 without a second portion 324, whereas side portions 320 that are configured to be fixed to other side portions 320 of other panels 122, front rail 114, and/or rear rail 116 have the structure comprising both first portion 322 and second portion 324. Advantageously, such a structure may provide greater strength and stability to platform 120. Specifically, the structure comprising first portion 322 and second portion 324 can act like supporting cross bars spanning from first side rail 112A to second side rail 112B. The positioning and geometry of this structure enables platform 120 to support heavier loads of varying weight distributions on its top surface.

Figure 5:
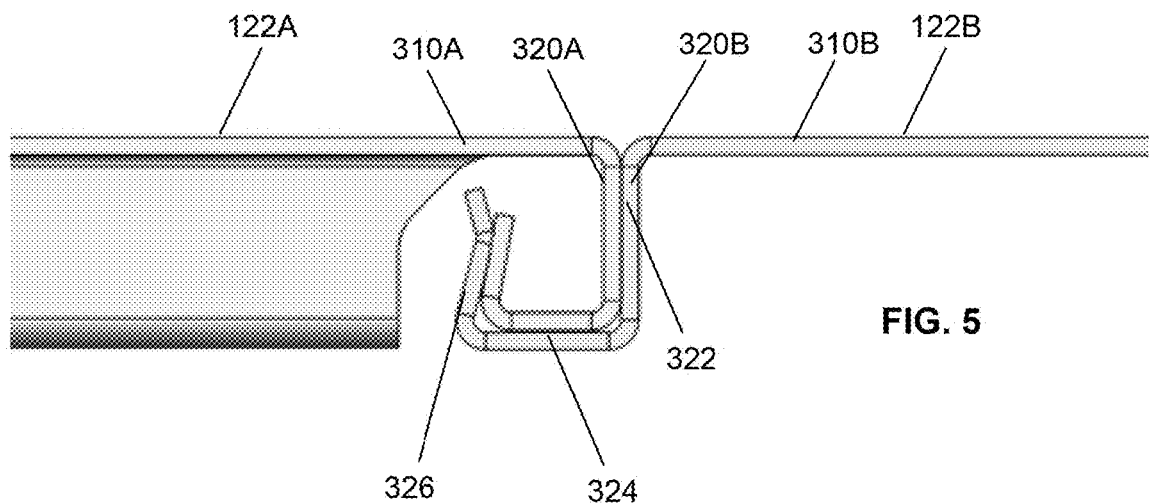
FIG. 5 illustrates a manner in which panels may be joined together, according to an alternative embodiment.

FIG. 5 illustrates an alternative example of a manner in which two or more panels 122 may be releasably fixed to each other, according to an embodiment. In this embodiment, each panel 122 may comprise a first side portion 320A and a second side portion 320B, on an opposite side of panel 122 as the first side portion 320A. Although FIG. 5 illustrates one panel 122A having first side portion 320A and another panel 122B having second side portion 320B, it should be understood that each of panels 122A and 122B have both a first side portion 320A on one side and a second side portion 320B on the opposite side. Both first side portion 320A and second side portion 320B have a first portion 322 that curves and extends orthogonally down from the plane of top portion 310, a second portion 324 that curves and extends orthogonally from first portion 322 and parallel to the plane of top portion 310, and a third portion 326 that extends orthogonally from second portion 324 up towards the plane of top portion 310. However, in first side portion 320A, the second portion 324 extends underneath top portion 310, whereas, in second side portion 320B, the second portion 324 extends in the opposite direction, outside the perimeter of top portion 310. In addition, in second side portion 320B, the lengths of first portion 322, second portion 324, and third portion 326 are all longer than the lengths of first portion 322, second portion 324, and third portion 326 in first side portion 320A, such that first side portion 320A can be inserted (e.g., slid or snapped) inside of second side portion 320B, to interlock adjacent panels 122A and 122B together. As illustrated, third portion 326 of second side portion 320B may angle towards first portion 322, as it extends from second portion 324, and angle away from first portion 322 at its distal end, so as to facilitate interlocking and de-interlocking of panels 122.

Figure 6A:
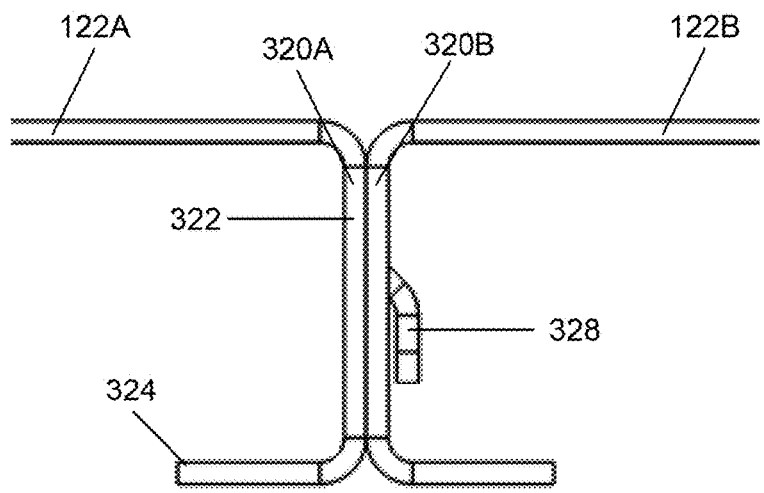
FIGS. 6A and 6B illustrate a manner in which panels may be joined together, according to an alternative embodiment.
Figure 6B:
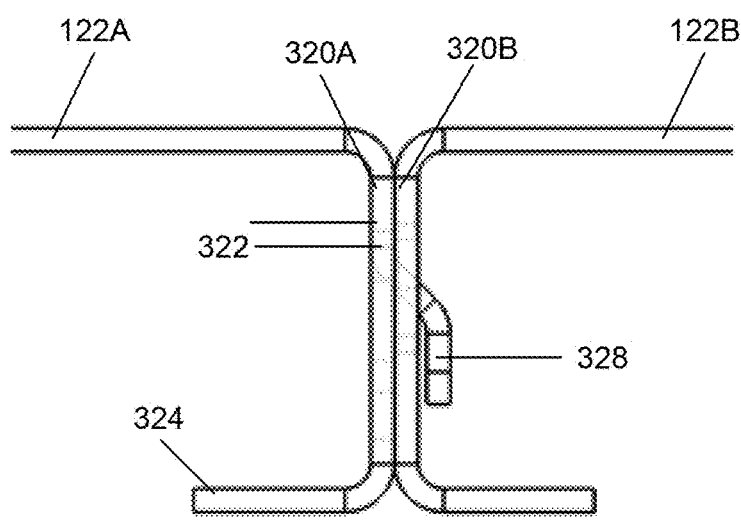

FIGS. 6A and 6B illustrate another alternative example of a manner in which two or more panels 122 may be releasably fixed to each other, according to an embodiment. In this embodiment, each panel 122 may comprise a first side portion 320A and a second side portion 320B, on an opposite side of panel 122 as the first side portion 320A. Again, although FIGS. 6A and 6B illustrate one panel 122A having first side portion 320A and another panel 122B having second side portion 320B, it should be understood that each of panels 122A and 122B have both a first side portion 320A on one side and a second side portion 320B on the opposite side. Each side portion 320 may comprise a first portion 322 that curves and extends orthogonally down from the plane of top portion 310, and a second portion 324 that curves and extends orthogonally from first portion 322 and parallel to the plane of top portion 310 underneath top portion 310. However, in first side portion 320A, the first portion 322 comprises a tab 328 and, in second side portion 320B, the first portion 322 comprises a corresponding slot configured to receive tab 328. Thus, first panel 122A may be interlocked to second panel 122B by sliding first panel 122A vertically downwards, along side portion 320B of second panel 122B, so that tab 328 slides into the corresponding slot on side portion 320B of second panel 122B. Although tab 328 is illustrated as sliding through second panel 122B from one side of side portion 320B to the other side of side portion 320B, in an alternative embodiment, tab 328 may slide into a cut-out within second panel 122B, such that tab 328 hooks within an interior cavity inside second portion 320B without passing all of the way through second portion 320B.

4. Rails

Figure 7A:
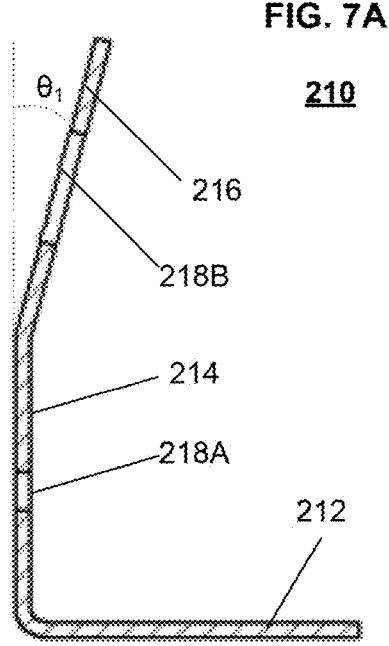
Figure 7B:
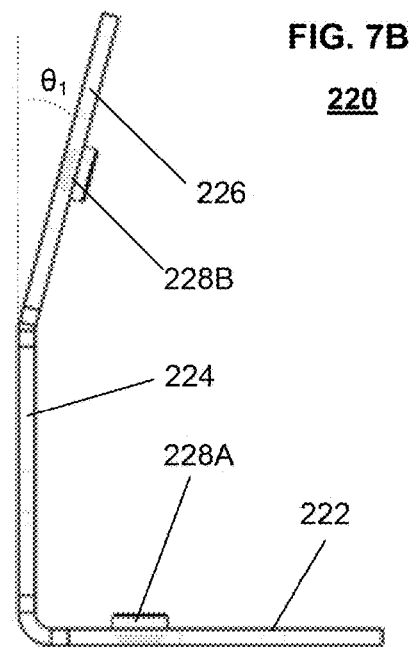
Figure 7C:
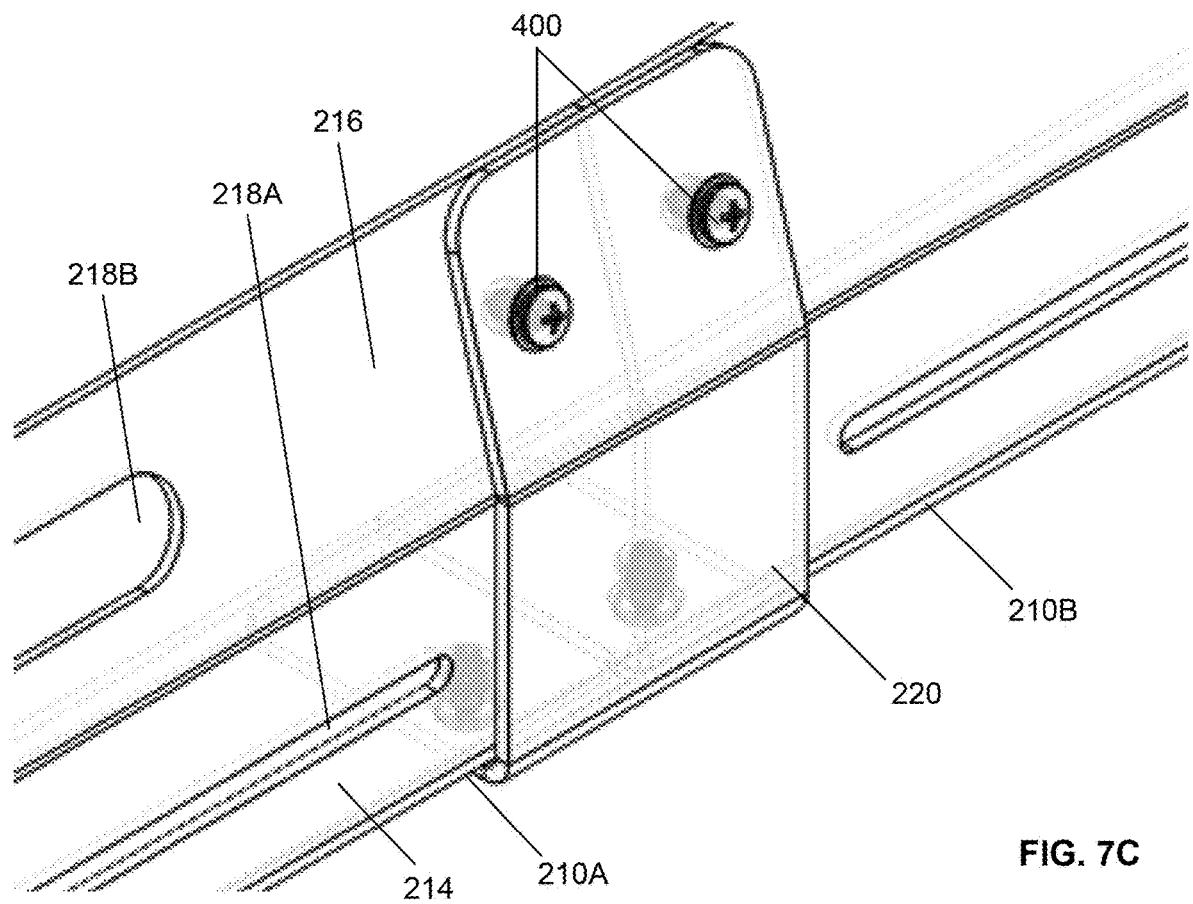

FIGS. 7A-7E illustrate detailed examples of a manner in which two or more modular segments 210 may be fixed to each other, according to an embodiment. Specifically, FIG. 7A is a cross-sectional view of a modular segment 210 of a side rail 112, FIG. 7B is a cross-sectional view of a rail bracket 220, and FIG. 7C is a top perspective view of a rail bracket 220 joining two adjacent modular segments 210 in a side rail 112, according to embodiments. FIGS. 7D and 7E are top perspective and side views, respectively, of a complete side rail comprising joined modular segments 210, according to an embodiment.

In the embodiment illustrated in FIG. 7A, modular segment 210 comprises a first portion 212 in a plane that is parallel to the roof of vehicle V, a second portion 214 that curves and extends orthogonally to the plane of first portion 212, and optionally a third portion 216 that is angled over first portion 212. In one particular implementation, the angle $\theta_1$, with respect to an axis orthogonal to the plane of first portion 212, is 15°. However, the angle $\theta_1$ of third portion 216 can be set to any appropriate angle (e.g., including 0°, such that there is no angle). Modular segments 210 may also have apertures on both ends to enable adjacent modular segments to be joined together by a rail bracket 220.

In addition, each modular segment 210 may comprise one or more longitudinal slots 218 that extend parallel to a longitudinal axis of modular segment 210. For example, in the illustrated embodiment, each modular segment 210 of each side rail 112 comprises a first slot 218A in second portion 214 and a second slot 218B in third portion 216. One or more slots 218 (e.g., 218A) may be used as apertures for attaching panels 122 (e.g., via a fastener 400), whereas one or more other slots 218 (e.g., 218B) can be used to fasten or tie down cargo. Specifically, the entirety of third portion 216 may extend above platform 120, such that a rope or strap can be run through slot 218B to tie down cargo on platform 120.

In the embodiment illustrated in FIG. 7B, rail bracket 220 has the same general cross-section and geometry as modular segment 210. Specifically, rail bracket 220 comprises a first portion 222 in a plane that is parallel to the roof of vehicle V, a second portion 223 that curves and extends orthogonally to the plane of first portion 222, and optionally a third portion 226 that is angled over first portion 222. The angle of third portion 226 can be the same as the angle $\theta_1$ of third portion 216 of modular segment 210. In addition, rail bracket 220 may comprise one or more fastening apertures 228 that may be configured to receive a fastener 400, which may be the same or different than any of the other fasteners 400 discussed herein.

As illustrated in FIG. 7C, two modular segments 210A and 210B of side rail 112 can be joined together by bringing them adjacent to each other, aligning apertures 228 in rail bracket 220 with corresponding apertures in one end of side rail 210A and the adjacent end of side rail 210B, and inserting fasteners 400 into each pair of aligned apertures. Fastener 400 may comprise a bolt and corresponding nut. In this case, the threaded portion of the bolt may be inserted through a pair of aligned apertures—and optionally, a washer—into a nut on the other side, and tightened to secure modular segment 210 between the bolt head and nut. As illustrated, fasteners 400 may be used through both the bottom surfaces (e.g., first portion 212) and side surfaces (e.g., third portion 216) of adjacent modular segments 210 to provide a stable and secure connection that prevents movement between the adjacent modular segments 210.

As illustrated in FIGS. 7D and 7E, a plurality of modular segments 210 may be joined together linearly, using a plurality of rail brackets 220, to form a complete side rail 112A. In the illustrated embodiment, three modular segments 210A-210C have been joined using two rail brackets 220A and 220B. It should be understood that the number and dimensions of modular segments 210 may be selected to form side rails 112 of varying length. Notably, a plurality of longitudinal fastening slots 218A are provided in each modular segment 210, so that different shapes and sizes of panels 122 may be fastened to modular frame 110 through slots 218A. Advantageously, the use of slots 218A, instead of distinct fastener holes, enables panels 122 with a wider variety of shapes and sizes to be attached to side rails 112, since apertures 330 in the panels 122 do not need to precisely align with a corresponding hole in side rail 112. In addition, a plurality of longitudinal fastening slots 218B are provided in each modular segment 210, so that cargo may be tied or otherwise fastened to modular frame 110 at a plurality of different points.

FIGS. 8A and 8B illustrate an alternative manner in which two or more modular segments 210 may be fixed to each other, according to an embodiment. In this embodiment, each modular segment 210 may comprise one or more tabs 810 on one end, and one or more corresponding apertures 830 on the opposite end. For example, second portion 214 may have a first tab 810A, and third portion 216 may have a second tab 810B. Each tab 810 may comprise an aperture 820 that is configured to align with an aperture 830 on the adjacent end of an adjacent modular segment 210. Thus, as illustrated in FIG. 8B, modular segments 210A and 210B may be joined by aligning aperture(s) 820 on tabs 810 of modular segment 210B with aperture(s) 830 on modular segment 210A, and then using a fastener (e.g., bolt and nut, screw, etc.) to fix the aligned apertures with respect to each other.

Figure 9A:
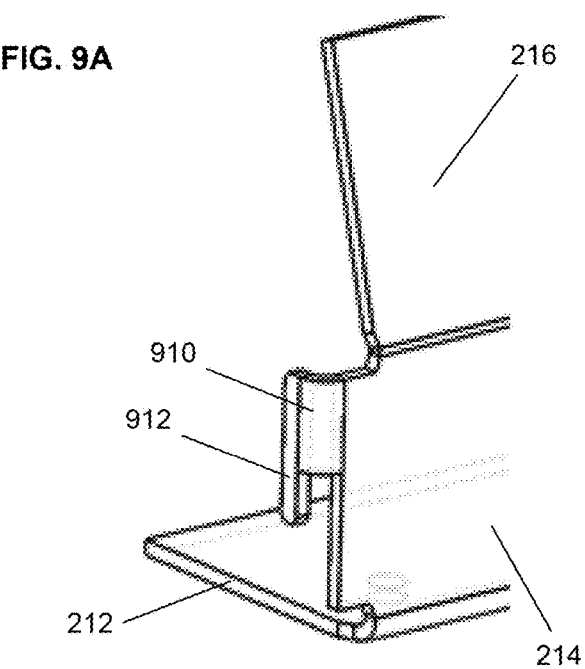
FIGS. 9A and 9B illustrate a manner in which segments of a rail may be joined together, according to an alternative embodiment.
Figure 9B:
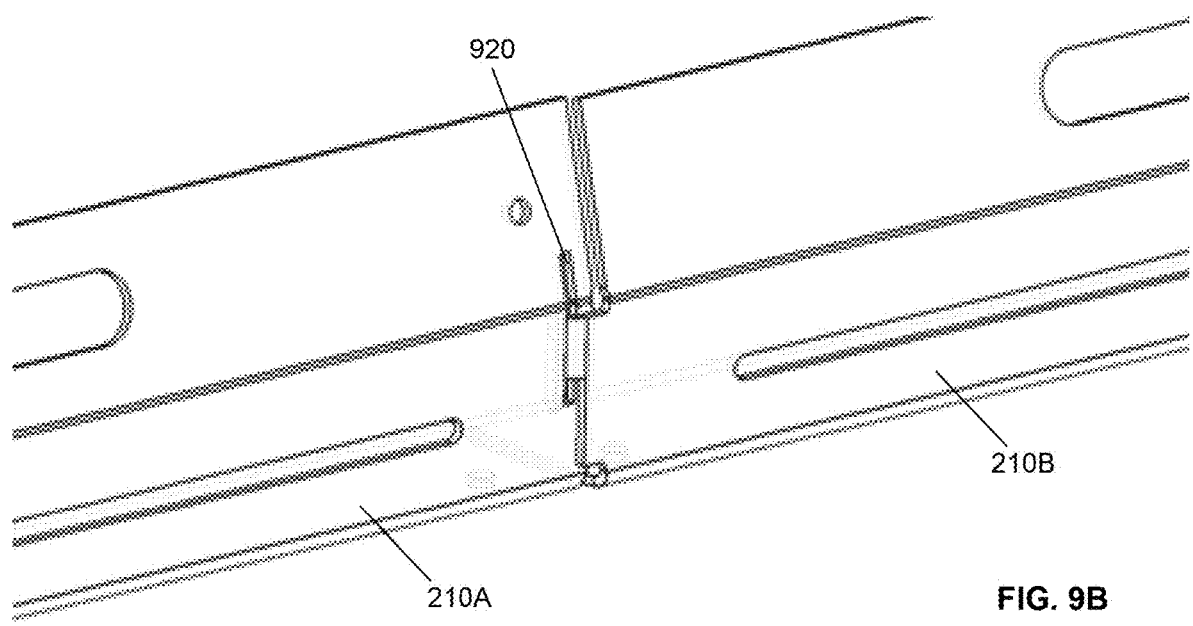

FIGS. 9A and 9B illustrate an alternative manner in which two or more modular segments 210 may be fixed to each other, according to an embodiment. In this embodiment, each modular segment 210 may comprise a tab 910 on one end, and a corresponding slot 920 on the opposite end. For example, second portion 214 of each modular segment 210 may have a tab 910 with a pin 912. Thus, as illustrated in FIG. 9B, modular segments 210A and 210B may be joined by sliding pin 912 of modular segment 210A into slot 920 in the adjacent end of modular segment 210A. Similarly, modular segments 210A and 210B may be disjoined by sliding pin 912 of modular segment 210A out of slot 920.

Figure 10A:
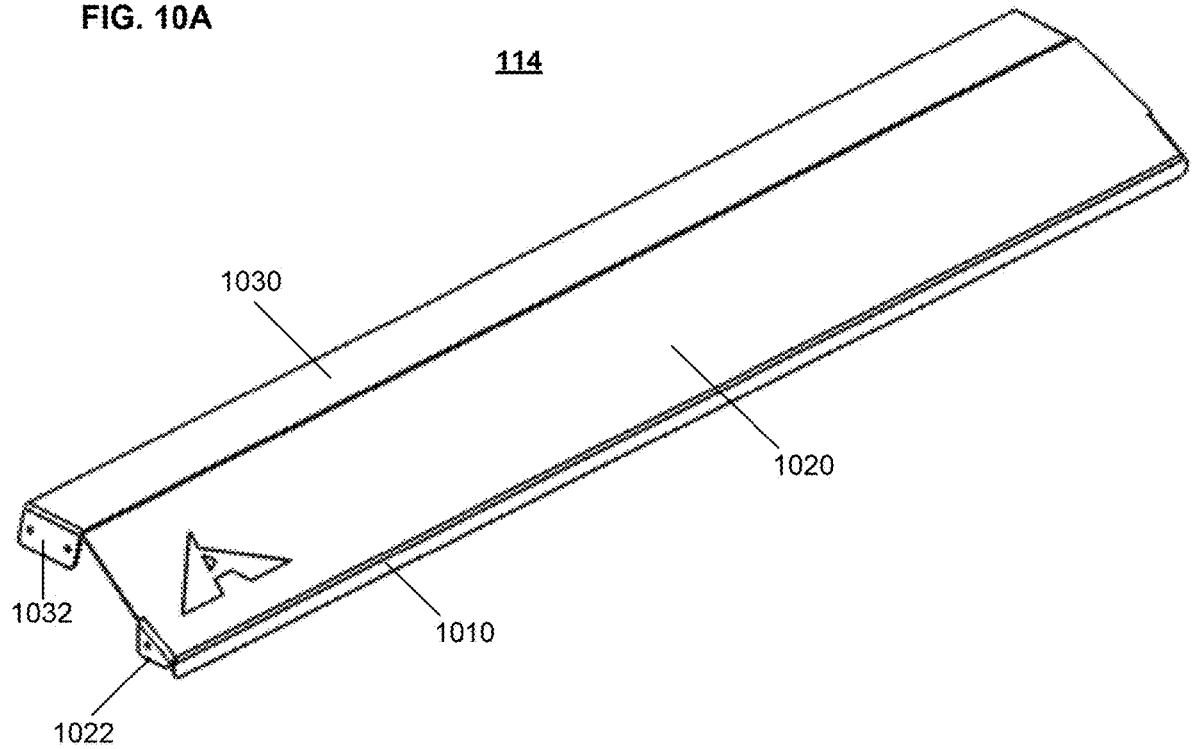
FIGS. 10A and 10B illustrate views of a front rail, according to an embodiment.
Figure 10B:
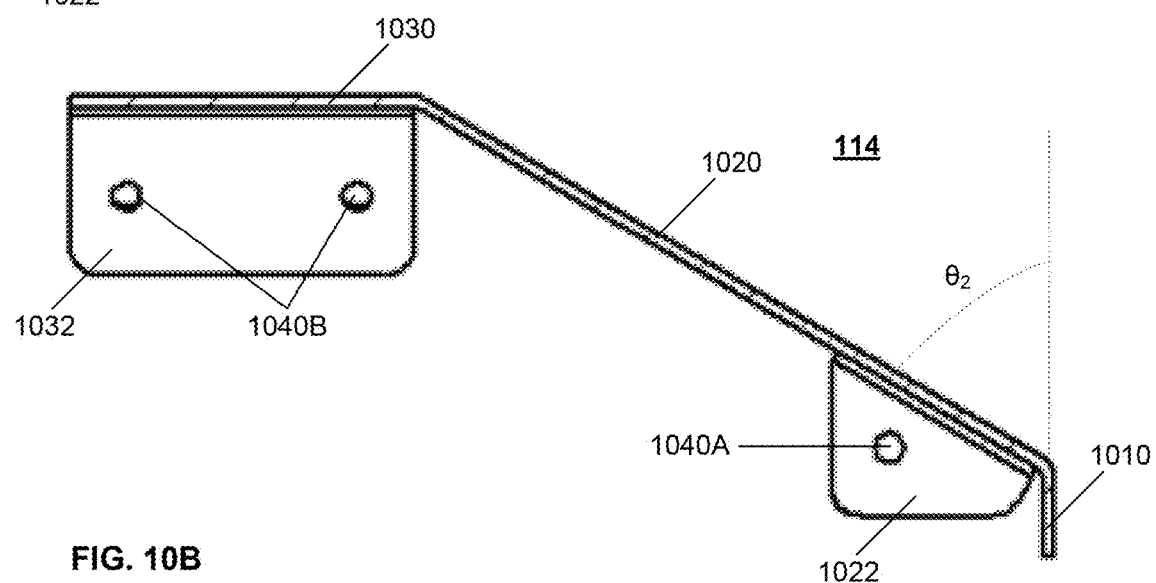

FIGS. 10A and 10B illustrate top perspective and side views, respectively, of front rail 114, according to an embodiment. Front rail 114 may comprise a first portion 1010, a second portion 1020 that extends from first portion 1010 at an angle $\theta_2$ with respect to first portion 1010, and a third portion 1030 that extends from second portion 1020 at an angle that is perpendicular to the plane of first portion 1010. In one particular implementation, the angle $\theta_2$, with respect to the plane of first portion 1010, is 60°. However, the angle $\theta_2$ of second portion 1020 can be set to any appropriate angle. In an embodiment, front rail 114 is set to an appropriate height and angle $\theta_2$ is set to an appropriate angle, such that front rail 114 acts as an air dam to redirect air over cargo on platform 120, thereby improving the aerodynamics of modular rack system 100.

One or more portions of front rail 114 may comprise extensions with fastening apertures. For example, in the illustrated embodiment, second portion 1020 comprises extensions 1022 on both sides, and third portion 1030 comprises extensions 1032 on both sides. Each extension 1022 comprises a single aperture 1040A, whereas each extension 1032 comprises two apertures 1040B. However, extensions 1022 and/or 1032 may comprise different numbers and arrangements of apertures 1040 than those illustrated. Apertures 1040 may be configured to align with corresponding apertures on side rails 112 and receive fasteners, so as to fix front rail 114 to side rails 112A and 112B.

Figure 11A:
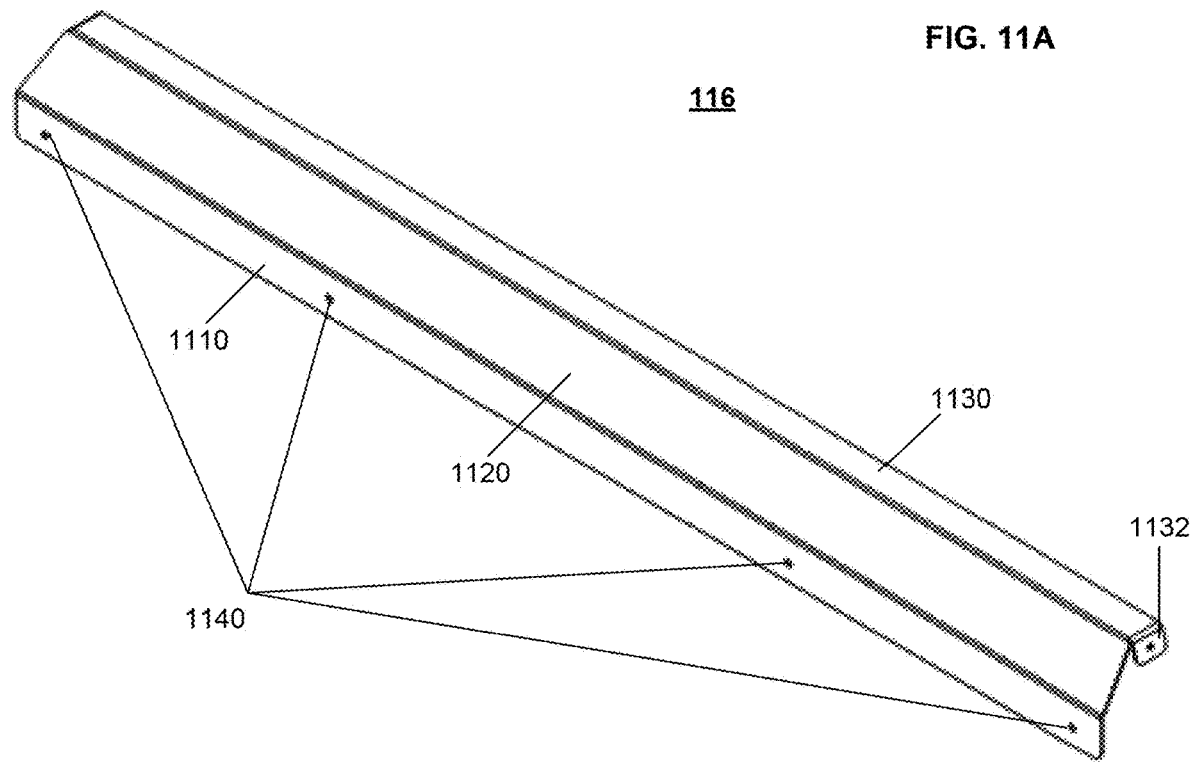
FIGS. 11A and 11B illustrate views of a rear rail, according to an embodiment.
Figure 11B:
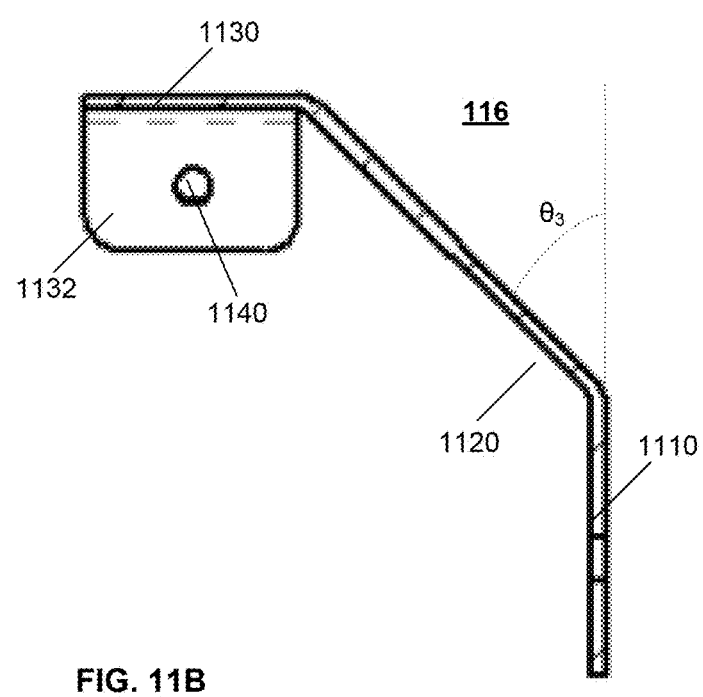

FIGS. 11A and 11B are top perspective and side views, respectively, of rear rail 116, according to an embodiment. Rear rail 116 may comprise a first portion 1110, a second portion 1120 that extends from first portion 1110 at an angle $\theta_3$ with respect to first portion 1110, and a third portion 1130 that extends from second portion 1120 at an angle that is perpendicular to the plane of first portion 1110. In one particular implementation, the angle $\theta_3$, with respect to the plane of first portion 1110, is 45°. However, the angle $\theta_3$ of second portion 1120 can be set to any appropriate angle. In an embodiment, first portion 1110 comprises one or more fastening apertures 1140 that are configured to align with corresponding apertures (e.g., apertures 330) on one or more panels 122, such as panel 122N, so as to fix panel 122N to rear rail 116.

One or more portions of rear rail 116 may comprise extensions with fastening apertures. For example, in the illustrated embodiment, third portion 1130 comprises extensions 1132 on both sides. Each extension 1132 comprises a single aperture 1140, but extension 1132 may comprise a different number and arrangement of apertures 1140 than those illustrated. Apertures 1140 may be configured to align with corresponding apertures on side rails 112 and receive fasteners, so as to fix rear rail 116 to side rails 112A and 112B. Aperture 1140 on extension 1132 may be the same or different than aperture 1140 on front portion 1110.

Figure 12A:
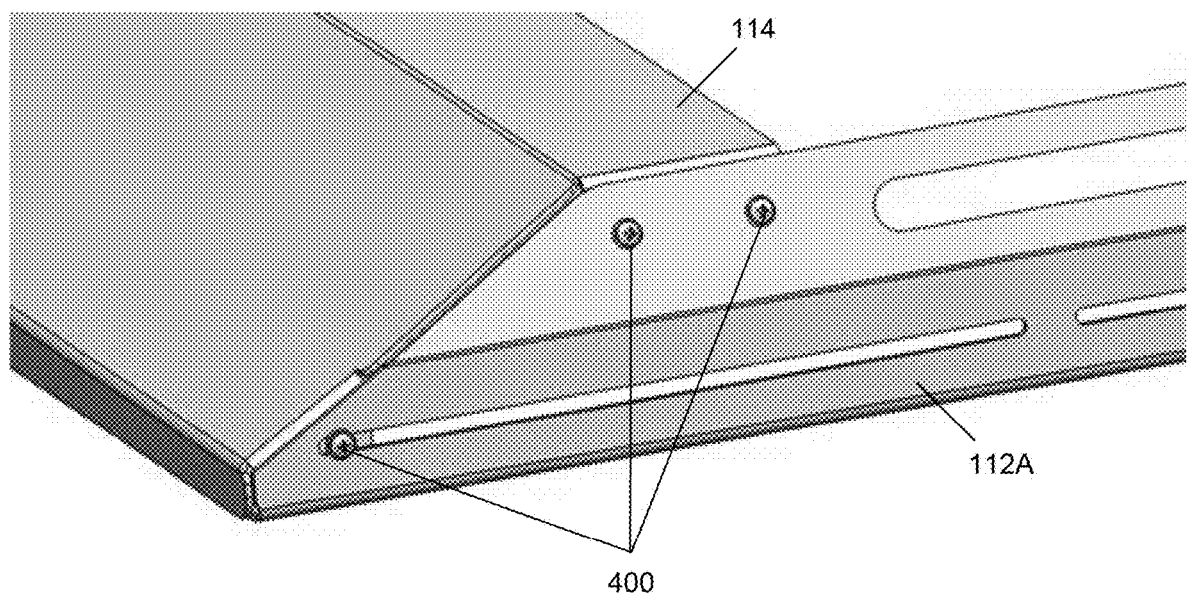
FIGS. 12A and 12B illustrate a manner in which side and front rails may be joined, according to an embodiment.
Figure 12B:
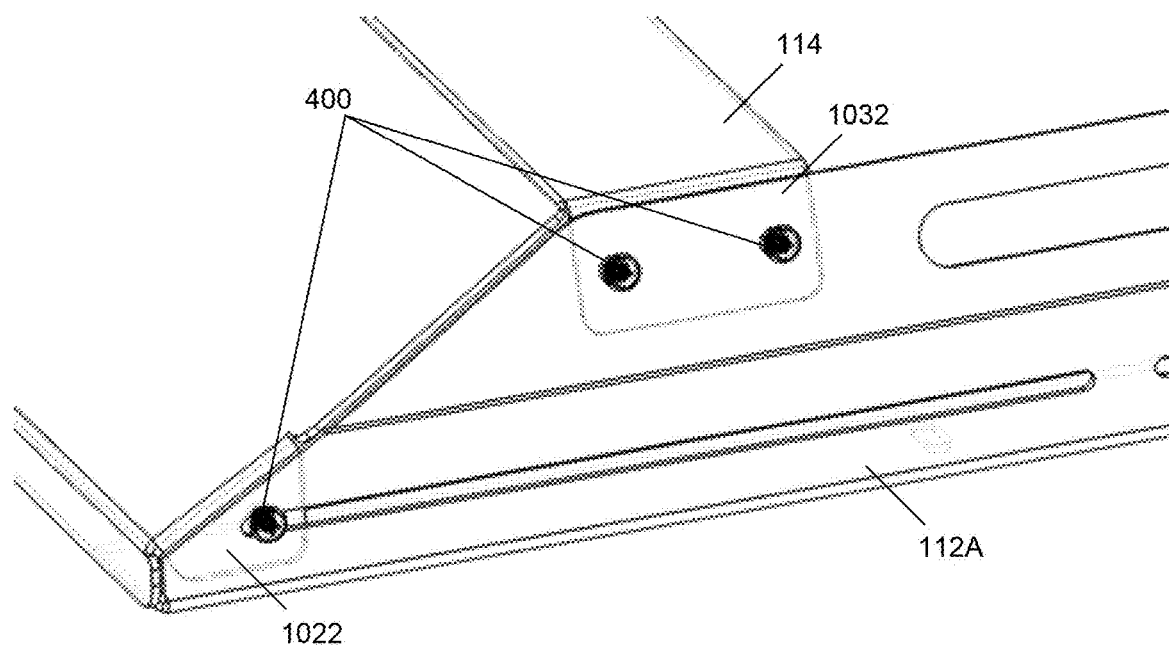

FIGS. 12A and 12B illustrate a detailed example of a manner in which side rail 112 may be joined to front rail 114, according to an embodiment. FIGS. 12A and 12B are both top perspective views, but FIG. 12B is a transparent view that illustrates underlying features. In the illustrated embodiment, apertures on side rail 112 are aligned with corresponding apertures on front rail 114. For example, aperture 1040A on extension 1022 of front rail 114 is aligned with fastener slot 218A on side rail 112A, and apertures 1040B on extension 1032 of front rail 114 are aligned with corresponding apertures on side rail 112A. Then, fasteners 400 (e.g., bolt and nut, screw and threaded hole, etc.) are fastened through the pairs of aligned apertures to fix side rail 112 to front rail 114.

Figure 13A:
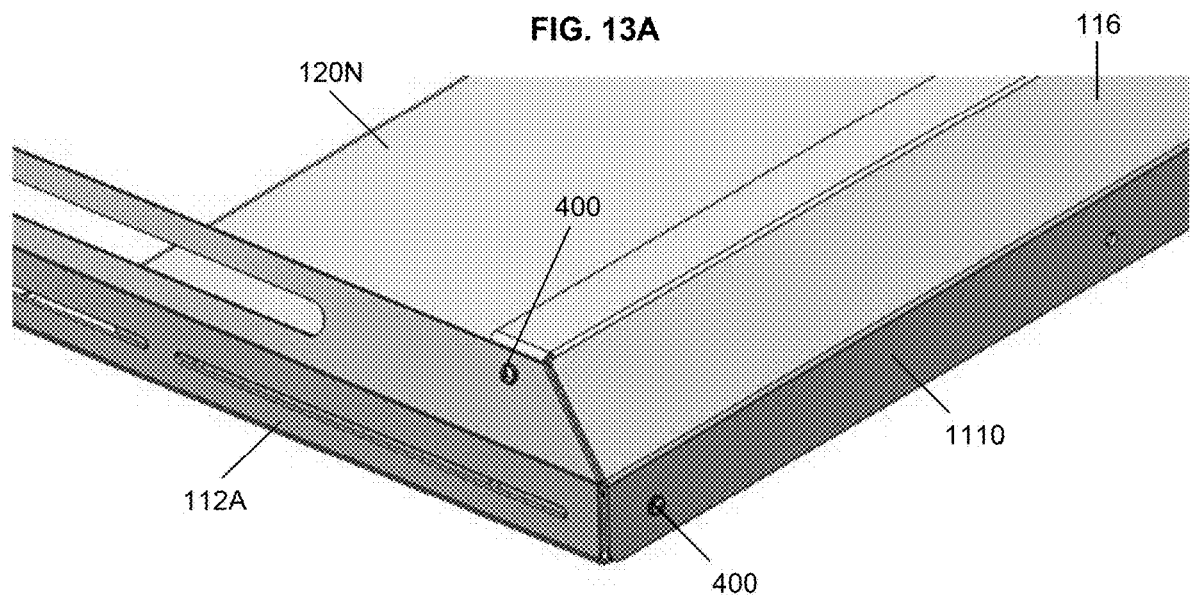
FIGS. 13A-13C illustrate a manner in which side and rear rails may be joined, according to an embodiment.
Figure 13B:
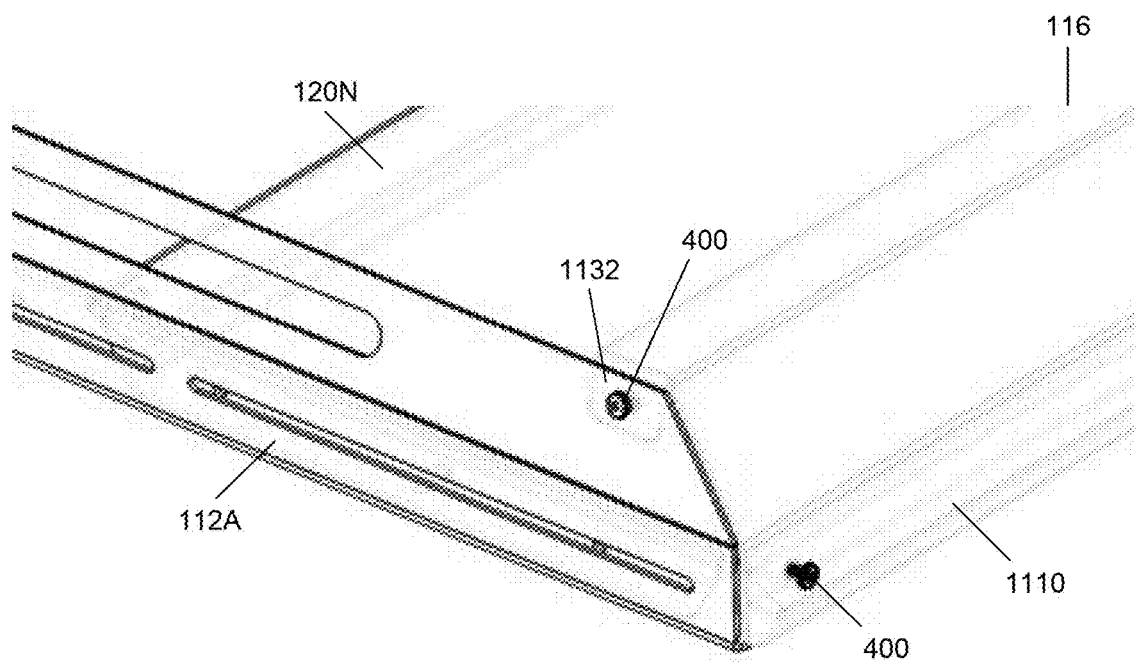
Figure 13C:
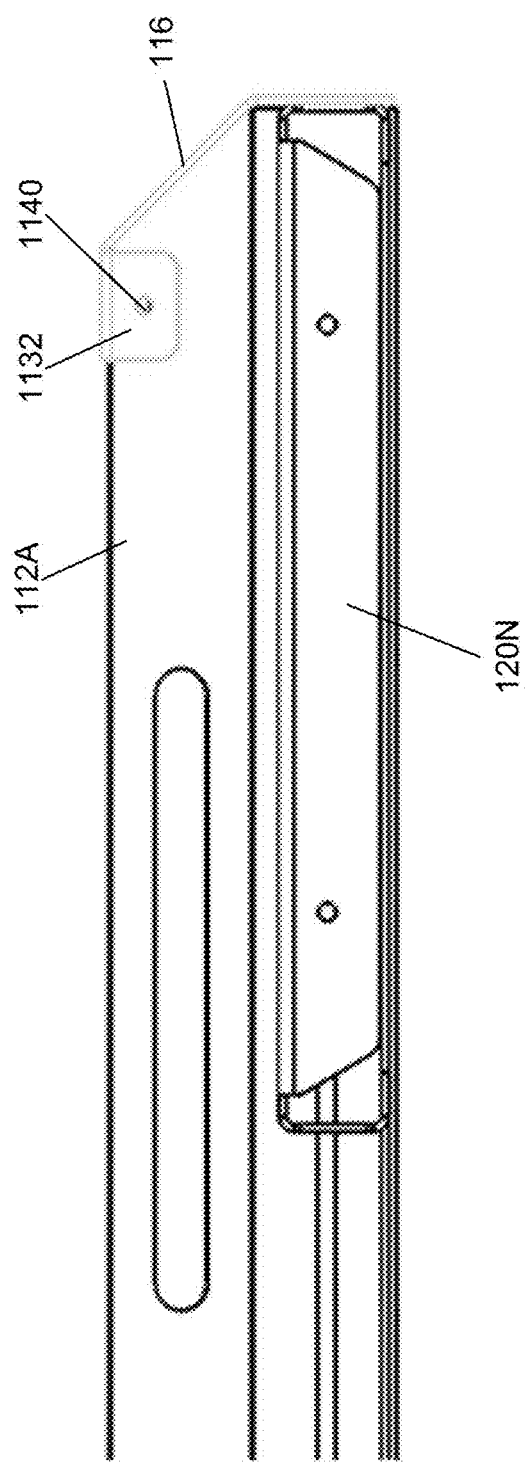

FIGS. 13A-13C illustrate a detailed example of a manner in which side rail 112 may be joined to rear rail 116, according to an embodiment. FIGS. 13A and 13B are both top perspective views, but FIG. 13B is a transparent view that illustrates underlying features. FIG. 13C is a transparent side view. In the illustrated embodiment, an aperture on side rail 112 is aligned with a corresponding aperture on rear rail 116. For example, aperture 1140 on extension 1132 of rear rail 116 is aligned with a corresponding aperture on side rail 112A. Then, fastener 400 (e.g., bolt and nut, screw and threaded hole, etc.) is fastened through the pairs of aligned apertures to fix side rail 112A to front rail 114. In addition, panel 120N may be fastened to rear rail 116 by aligning apertures 330 on side portion 320 of panel 120N with apertures 1140 on first portion 1110 of rear rail 116, and using fasteners through the aligned apertures 330/1140.

Figure 14A:
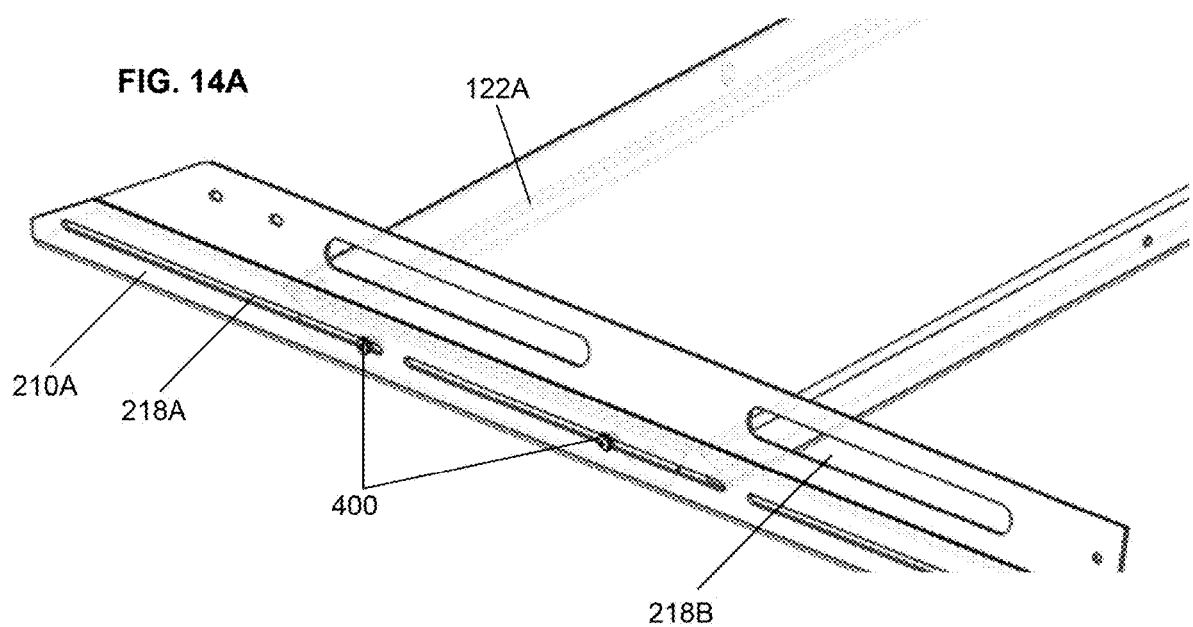
FIGS. 14A-14C illustrate a manner in which panels and side rails may be joined, according to an embodiment.
Figure 14B:
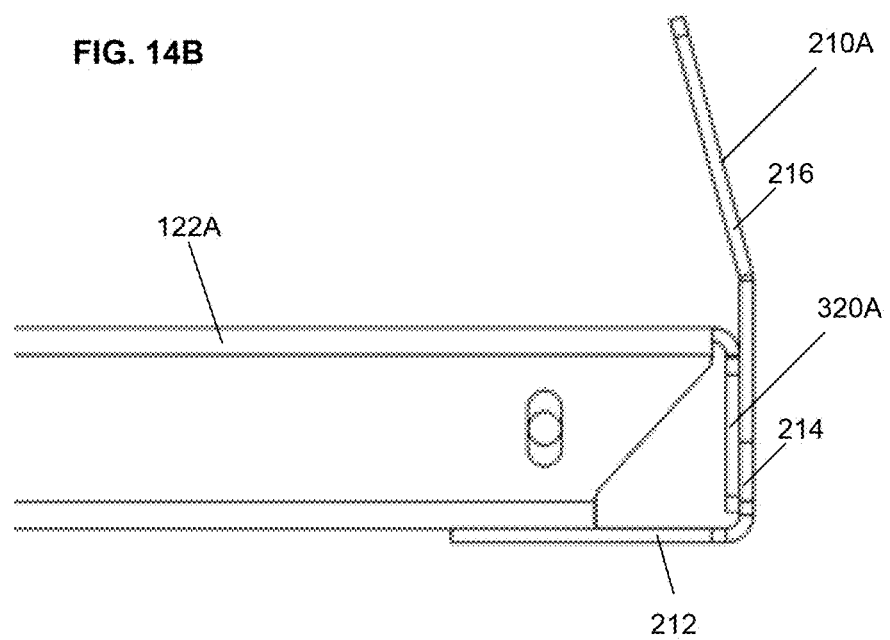
Figure 14C:
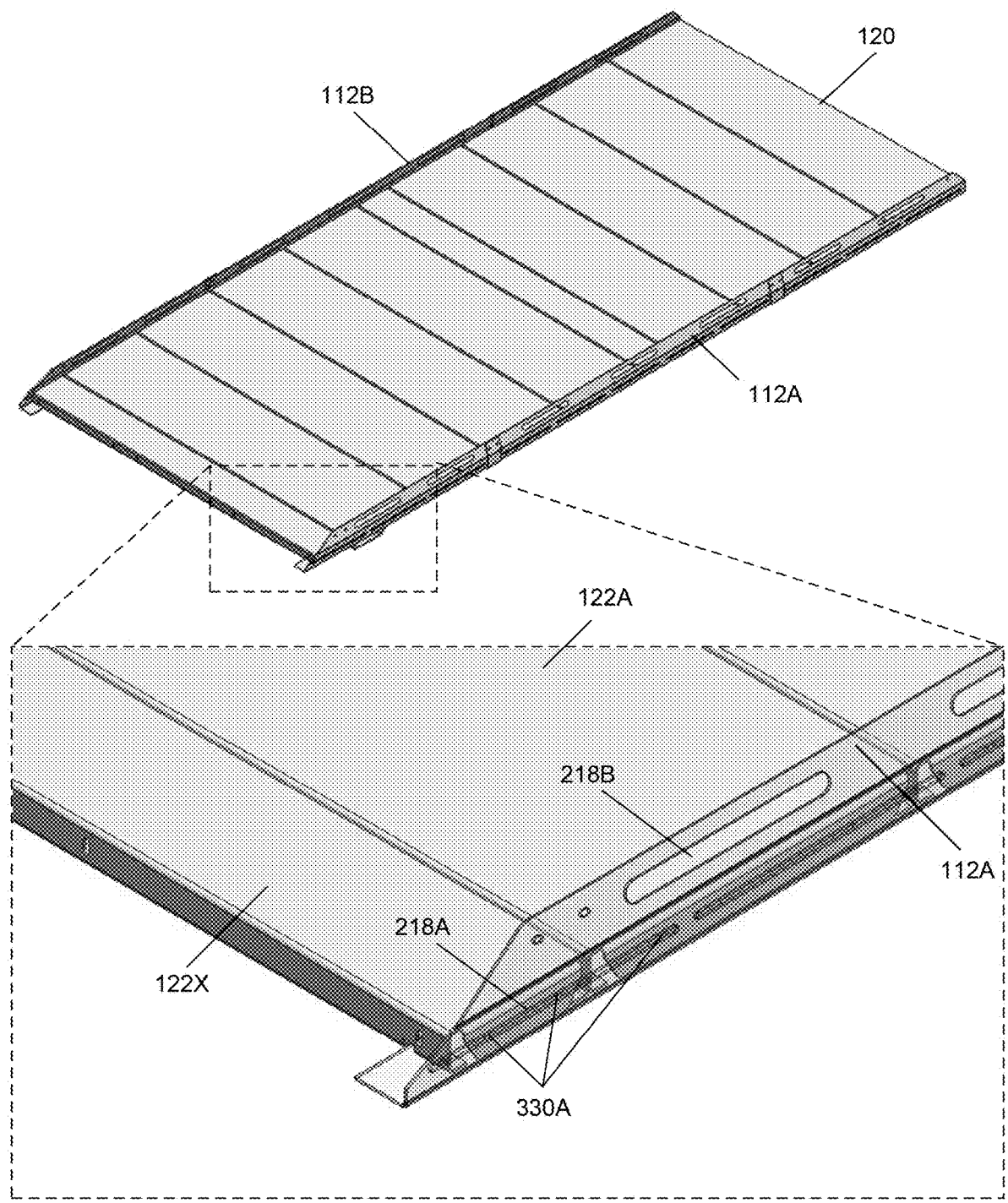

FIGS. 14A-14C illustrate a detailed example of a manner in which side rail 112 may be joined to panels 122, according to an embodiment. FIG. 14A is a top perspective view of panel 122A connected to modular segment 210A of side rail 112A, and FIG. 14B is a front side view of panel 122A connected to modular segment 210A of side rail 112A, according to an embodiment. As illustrated, the external surface of side portion 320A of panel 122A abuts the internal surface of second portion 214 of modular segment 210A, so as to align fastener slots 218A in modular segment 210A with holes 330A in side portion 320A of panel 122A. Panel 122A is then joined to modular segment 210A by securing fasteners 400 (e.g., bolts and nuts, screws, etc.) through the aligned fastener slots 218A and holes 330A. Notably, when joined, a portion of panel 122A rests on first portion 212 of modular segment 210A, to provide stability and support. In addition, slots 218B in third portion 216 of modular segment 210A are above panel 122A, so as to be open and available to ropes or straps that can be used to secure cargo.

FIG. 14C is a top perspective view of a portion of platform 120 attached to side rails 112, according to an embodiment. Front rail 114 and rear rail 116 of modular frame 110 are absent from these figures. As illustrated, apertures 330 in side portions 320A of each panel 122 align with slots 218A in side rails 112, such that a fastener may be fastened through each alignment of a slot 218A with an aperture 330 to fix platform 120 to side rails 112. In addition, slots 218B extend above the plane of platform 120.

Figure 15A:
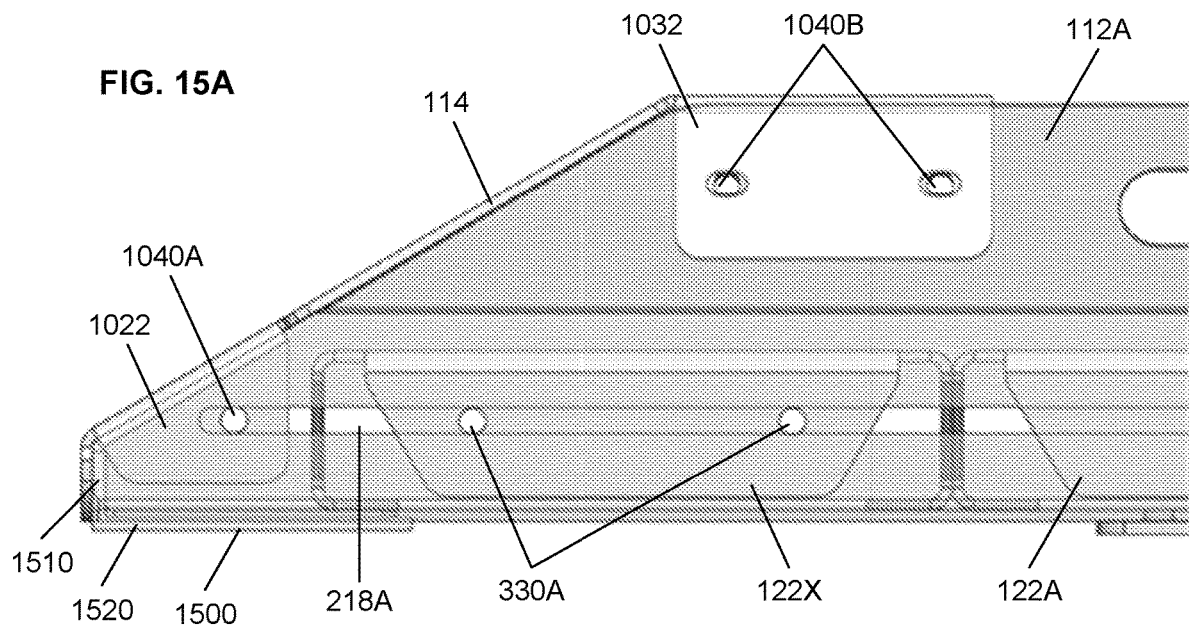
FIGS. 15A-15D illustrate a manner in which a front rail, side rails, and a platform may be joined, according to an embodiment.
Figure 15B:
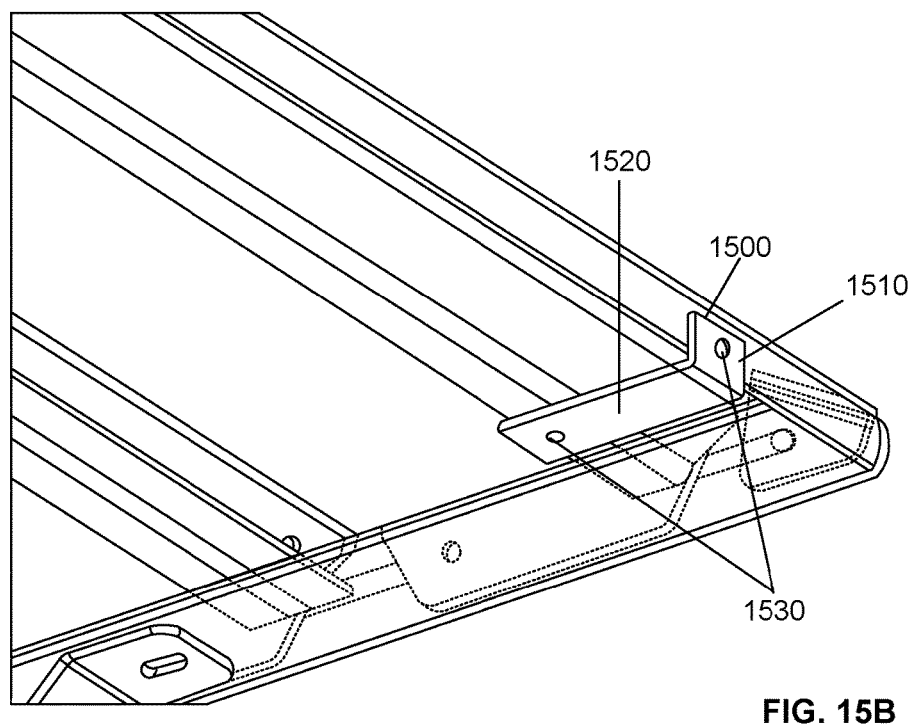

FIGS. 15A-15D illustrate a detailed example of a manner in which front rail 114 may be joined to side rails 112 and platform 120. FIG. 15A is a transparent side view of the alignment of front rail 114 with side rail 112A and panels 122X and 122A of platform 120. As illustrated, apertures in the front end of side rail 112A are aligned with apertures 1040B in extension 1032 of front rail 114. In addition, slot 218A in side rail 112A is aligned with aperture 1040A in extension 1022 of front rail 114 and holes 330A in panels 122. Thus, fasteners may be inserted through the aligned apertures to join all of front rail 114, side rail 112B, and platform 120 together.

In an embodiment, to reinforce the air dam, formed by front rail 114 to reduce drag, reinforcement brackets 1500 are used to fix front rail 114 directly to platform 120. Each reinforcement bracket 1500 may be L-shaped, with a first portion 1510 and a second portion 1520 that extends orthogonally from first portion 1510. Each of first portion 1510 and second portion 1520 comprises at least one aperture 1530. Aperture 1530 in first portion 1510 aligns with an aperture in the front surface of first portion 1010 of front rail 114, and aperture 1530 in second portion 1520 aligns with an aperture in the bottom surface of second portion 324 of side portion 320 of panel 122X.

Figure 15C:
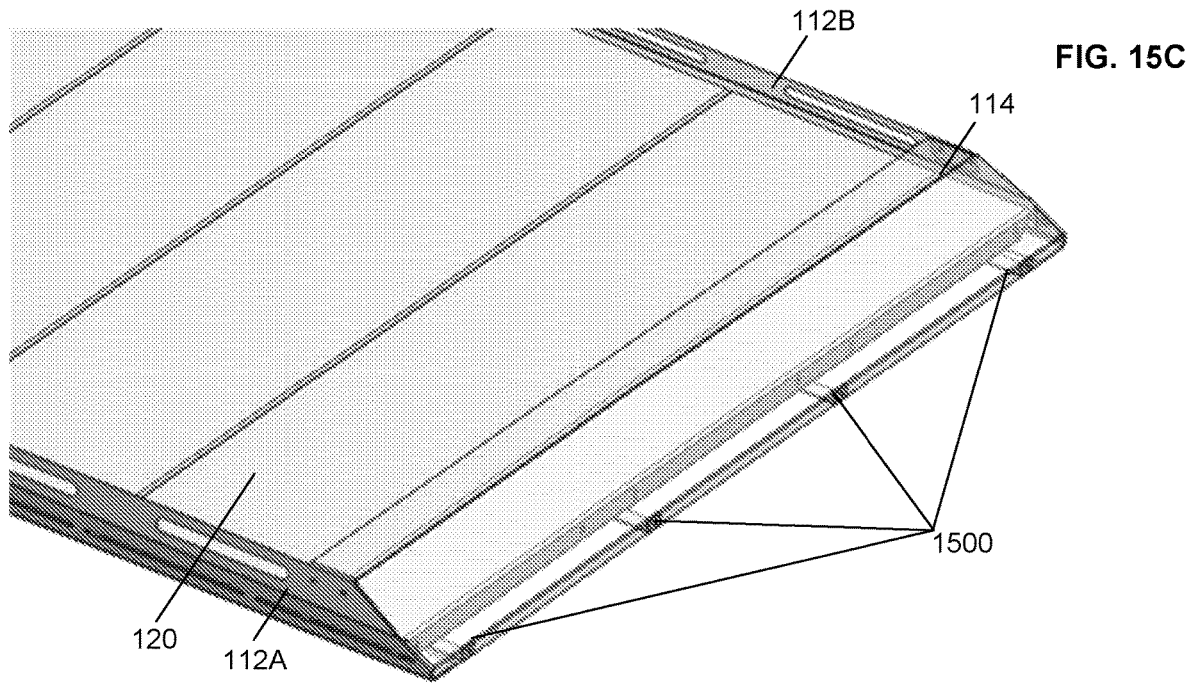
Figure 15D:
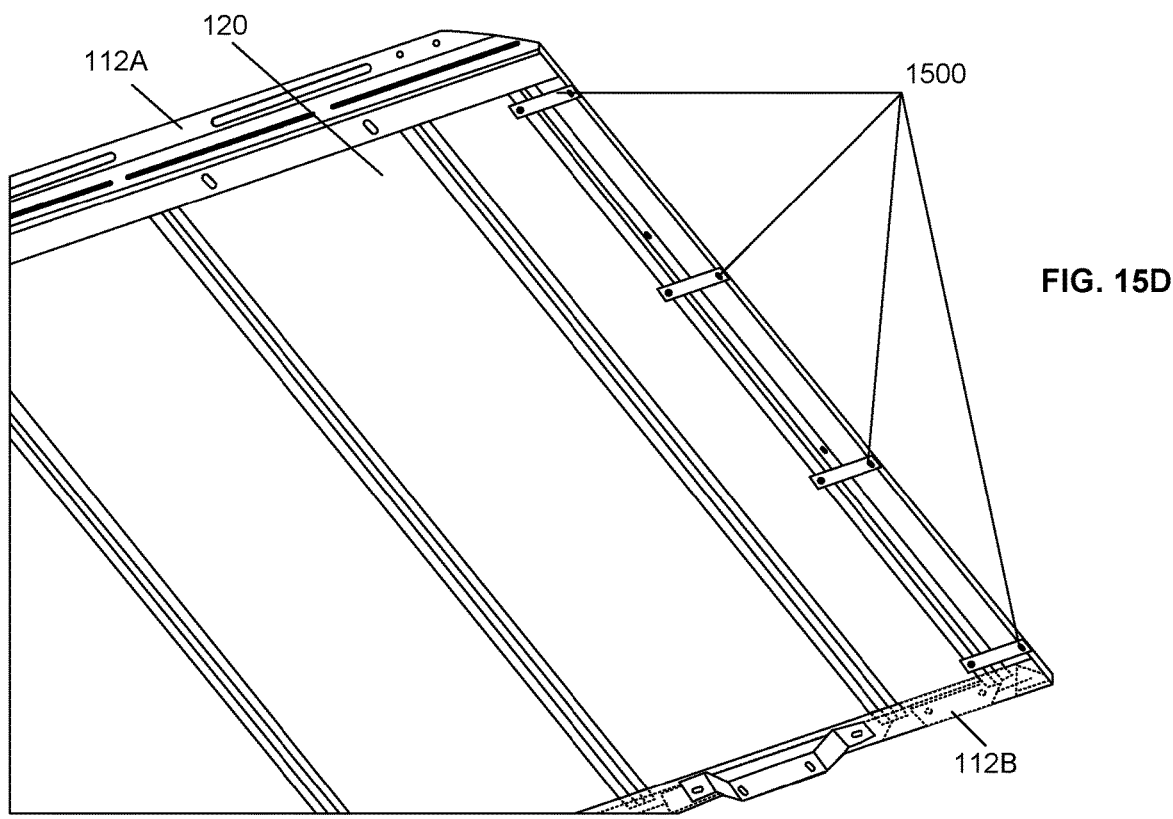

FIGS. 15C and 15D are top and bottom perspective views, respectively, of modular rack system 100 with a plurality of brackets 1500, according to an embodiment. As illustrated, at least two, and preferably at least four, reinforcement brackets 1500 may be equidistantly spaced apart, along the front and bottom of modular rack system 100, to fix front rail 114 to platform 120. Advantageously, reinforcement brackets 1500 provide structural support to the air dam formed by front rail 114.

5. Mounting

FIGS. 16A-16E illustrate a studded insert to be installed within rails R on the roof of vehicle V, according to an embodiment. Specifically, FIG. 16A illustrates a substrate 1610 (e.g., rectangular in shape) with apertures 1612 that penetrate substrate 1610, and FIG. 16B illustrates a bolt 1620 with a threaded end that is inserted through apertures 1612 in substrate 1610, as shown in FIG. 16C, to form studded insert 1600. The threaded end of bolt 1620 is configured to receive a nut. In the illustrated example, studded insert 1600 comprises two bolts 1620. However, in an alternative embodiment, studded insert 1600 could comprise one bolt 1620 or three or more bolts 1620. In either case, each bolt 1620 may be welded to substrate 1610 to prevent it from rotating when a nut or other fastening component is tightened around the threaded end. Alternatively, bolts 1620 may be self-cinching studs that secure themselves to substrate 1610 to prevent rotation.

FIGS. 16D and 16E illustrate how studded insert 1600 is inserted into a rail R on the roof of vehicle V. Specifically, studded insert 1600 is slid into rail R through an open end of rail R. It should be understood that at least one studded insert 1600 may be inserted, in this manner, into each of two parallel rails R on the roof of vehicle V. In a preferred implementation, a plurality of studded inserts 1600 (e.g., three) are inserted into each rail R. Rails R may be pre-existing (e.g., manufacturer-installed or dealer-installed) features of vehicle V, or an after-market product that is bolted to the roof of vehicle V.

Figure 17A:
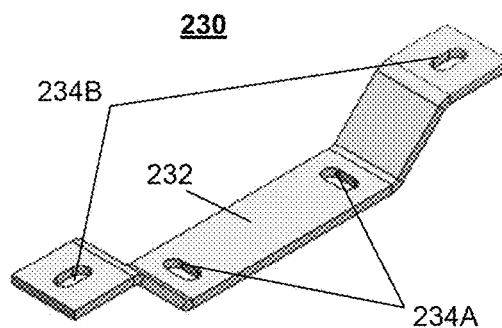
FIGS. 17A-17C illustrate a mounting bracket, according to an embodiment.
Figure 17B:
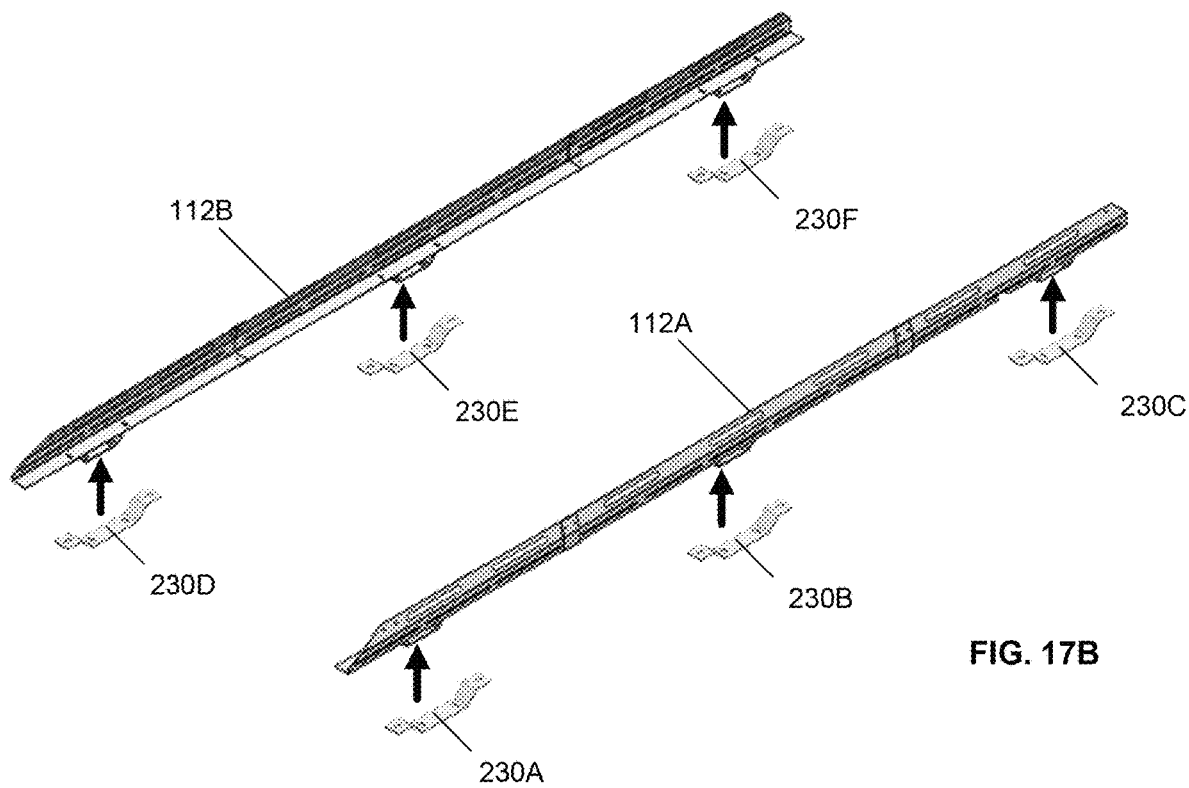

FIGS. 17A and 17B illustrate a mounting bracket 230, according to an embodiment. Specifically, FIG. 17A illustrates mounting bracket 230 in isolation. Mounting bracket 230 may comprise a generally U-shaped strip 232 with apertures 234 penetrating through strip 232. In the illustrated embodiment, mounting bracket 230 comprises four apertures 234, with two apertures 234A in the middle, lower portion of U-shaped strip 232, and an aperture 234B in each upper portion on the end of U-shaped strip 232. However, in an alternative embodiment, mounting bracket 230 could comprise a different number and/or arrangement of apertures 234.

FIG. 17B is a top perspective view illustrating how mounting brackets 230 are attached to the bottoms of side rails 112. In the illustrated embodiment, three mounting brackets 230 are attached to each side rail 112, near both ends and in the middle of each side rail 112. At least one mounting bracket 230 may be attached to each modular segment 210 in each side rail 112. Each mounting bracket 230 may be joined to its respective side rail by aligning apertures 234B in mounting bracket 230 with corresponding apertures in the bottom surface of first portion 212 of a modular segment 210 in the side rail 112, and inserting and securing a fastener (e.g., bolt and nut, screw, etc.) through the aligned apertures.

Figure 17C:
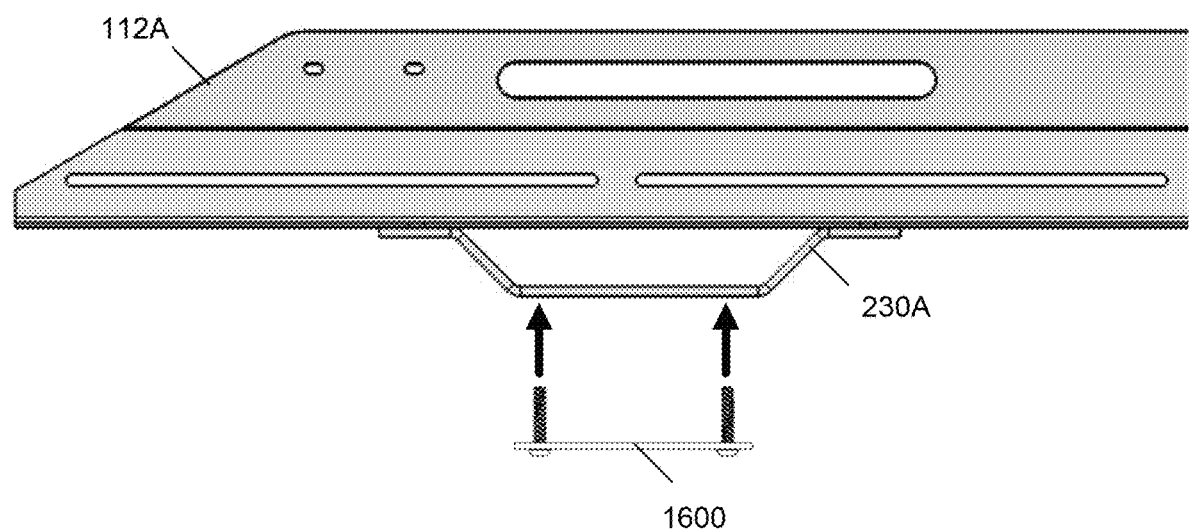

Modular frame 110 may be secured to the roof of vehicle V, by aligning each studded insert 1600 in rail R on the roof of vehicle V with a mounting bracket 230. Studded inserts 1600 may slide within their respective rails R, so that studded inserts 1600 can be precisely aligned with one of mounting brackets 230, which have each been securely fixed to the bottom surface of side rails 112. When aligned, the threaded end of bolts 1620 in a studded insert 1600 slide through apertures 234A in a corresponding mounting bracket 230, as illustrated in FIG. 17C, according to an embodiment. In other words, the distance between apertures 1612 and the distance between apertures 234A are identical. Once all of studded inserts 1600 have been aligned with a corresponding mounting bracket 230, modular frame 110 may be fixed to studded inserts 1600 by tightening nuts or other fastening components around the threaded ends of all bolts 1620 to tightly fix the lower portion of each U-shaped strip 232 between a substrate 1610 and a nut. Modular frame 110 is thereby secured to the roof of vehicle V. It should be understood that studded inserts 1600 may be held in place within their respective rails R by friction, as well as their indirect attachment to each other via their respective attachments to modular frame 110.

Figure 18C:
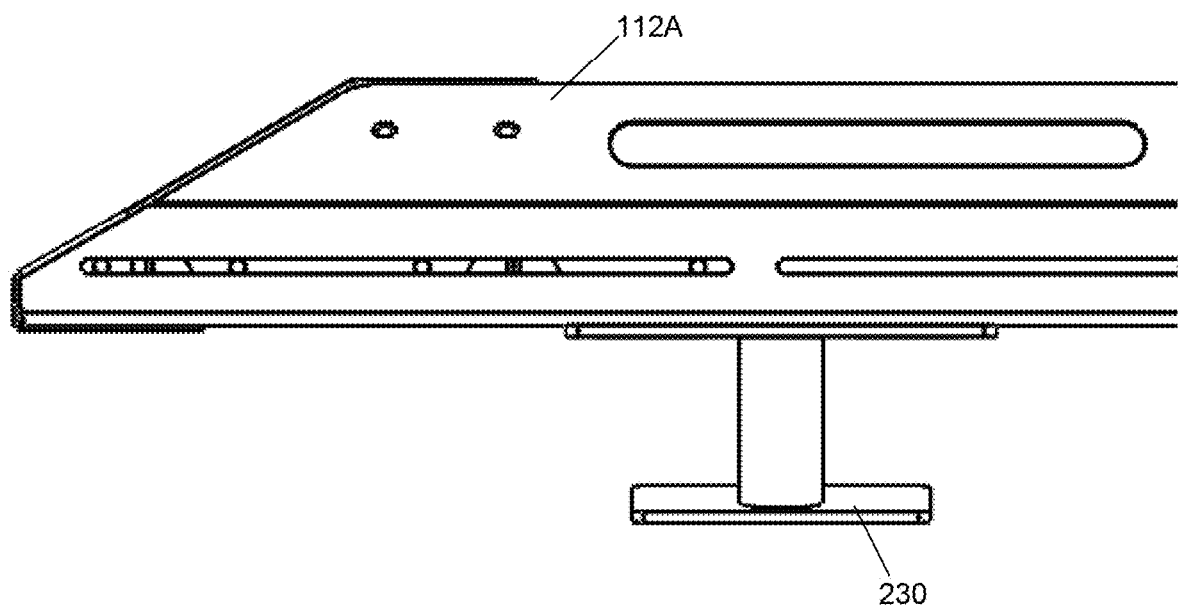
Figure 18D:
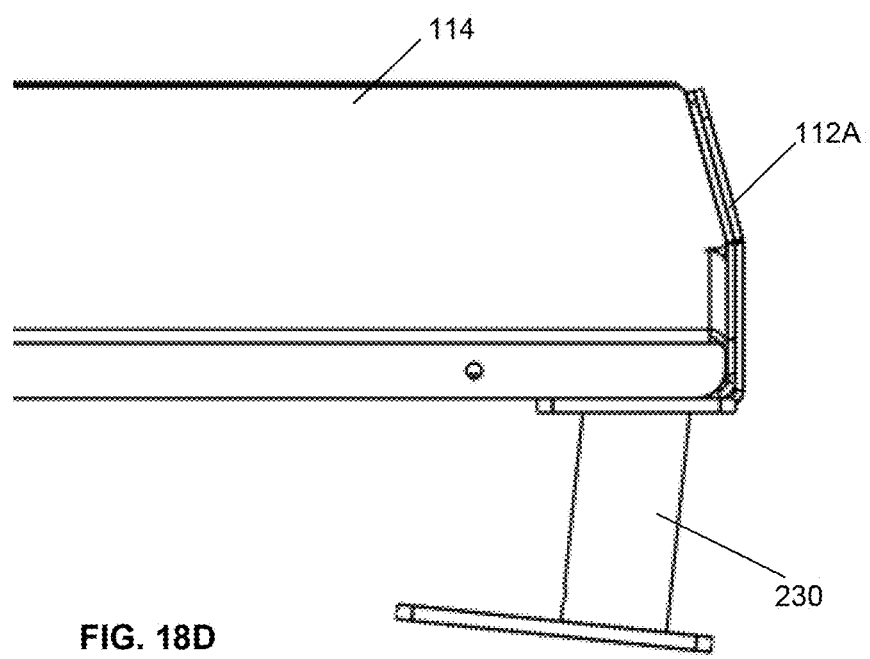

FIGS. 18A-18D illustrate an alternative embodiment of a mounting bracket 230. Specifically, FIG. 18A is a top perspective view of mounting bracket 230, FIG. 18B is a bottom perspective view of mounting bracket 230 attached to a bottom surface of side rail 112A, FIG. 18C is a side view of mounting bracket 230 attached to a bottom surface of side rail 112A, and FIG. 18D is a front view of mounting bracket 230 attached to a bottom surface of side rail 112A, according to an embodiment. As illustrated, mounting bracket 230 comprises a first portion 1810, a second portion 1820, and a third portion 1830. Second portion 1820 comprises a leg that joins substantially flat first portion 1810 to substantially flat third portion 1830. First portion 1810 comprises apertures 1812 which are configured to align with corresponding apertures in the bottom surface of side rails 112, such that first portion 1810 may be fixed to the bottom surface of side rail 112 through the aligned apertures (e.g., via bolts and nuts, screws, etc.). In addition, third portion 1830 comprises at least one aperture 1832 which is configured to align with a corresponding aperture on the top surface of the roof of vehicle V, such that third portion 1830 may be fixed to the top surface of the roof through the aligned apertures. For example, the roof of vehicle V may have a threaded recess, into which a bolt or screw may be inserted and tightened (e.g., along with a washer and waterproofing), to fasten mounting bracket 230 to the roof of vehicle V. Notably, as illustrated in FIG. 18D, second portion 1820 and/or third portion 1830 of mounting bracket 230 may be angled with respect to an axis that is orthogonal to the plane of first portion 1810. The resulting angle of third portion 1830 may conform to an angle of the side of the roof of vehicle V, such that third portion 1830 is configured to attach flush to the top surface of the roof of vehicle V.

FIGS. 19A-19G illustrate another alternative embodiment of a mounting bracket 230. Specifically, FIG. 19A is a top perspective view of mounting bracket 230, FIG. 19B is a view of a portion of mounting bracket 230 in isolation, FIG. 19C is a bottom perspective view of mounting bracket 230 attached to a bottom surface of side rail 112A, FIG. 19D is a side view of mounting bracket 230 attached to a bottom surface of side rail 112A, and FIG. 19E is a front view of mounting bracket 230 attached to a bottom surface of side rail 112A, according to an embodiment. As illustrated, mounting bracket 230 comprises a U-shaped first portion 1910 and a narrow, substantially flat second portion 1920 that fits within the channel of U-shaped first portion 1910. First portion 1910 comprises apertures 1912 which are configured to align with corresponding apertures in the bottom surface of side rails 112 and are aligned with apertures 1922 in second portion 1920. A fastener, such as a carriage bolt, may be inserted through each aligned pair of apertures 1912 and 1922, with the head of the bolt on the bottom side of second portion 1920, and the threaded end of the bolt extending above the top side of first portion 1910. Second portion 1920 comprises a slot 1924 which is configured to receive a roof stud on the roof of vehicle V. Thus, second portion 1920 may be slid laterally, such that slot 1924 slides around the roof stud, and, together with first portion 1910, forms a studded attachment, similar to studded insert 1600, on the roof of vehicle V. Modular frame 110 can then be attached to the roof of vehicle V by aligning the threaded portions of the bolts, extending above the top surface of mounting bracket 230, with corresponding apertures in the bottom surface of side rails 112 (e.g., bottom surface of first portion 212), and tightening a nut or other fastening mechanism around the threaded portion of the bolts (e.g., to seal the bottom surface of first portion 212 to the top surface of first portion 1910), to thereby fix modular frame 110 to the roof of vehicle V.

6. Flexible Configuration

Figure 20A:
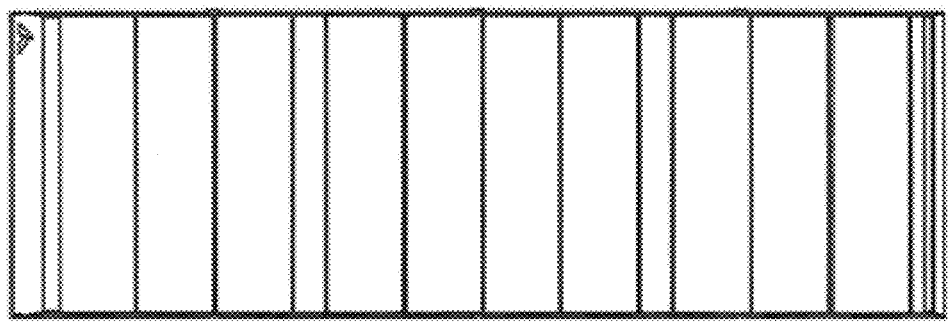
FIGS. 20A-20G illustrate top views of a plurality of different possible configurations of a modular rack system, according to embodiments.
Figure 20B:
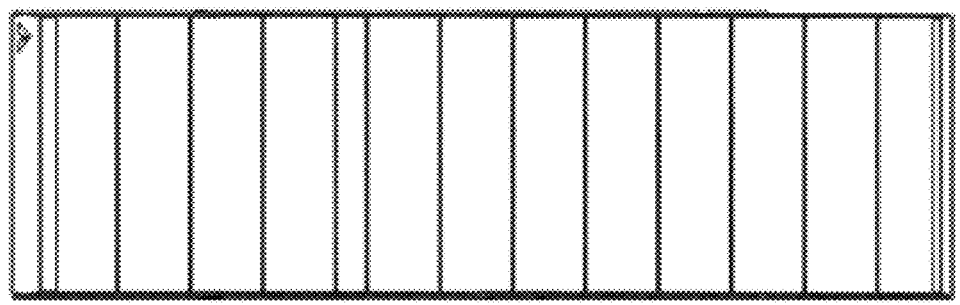
Figure 20C:
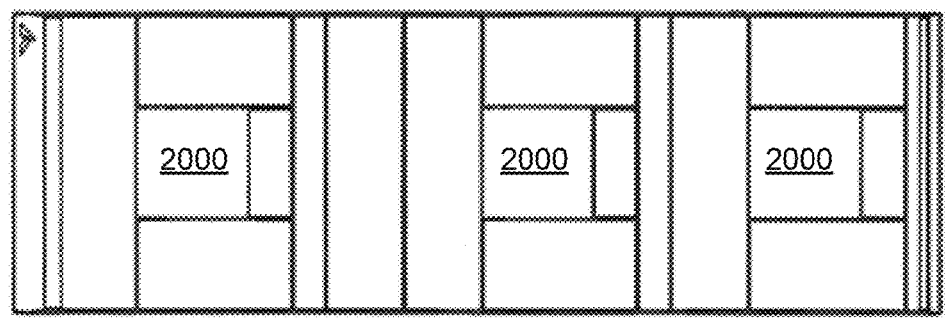
Figure 20D:
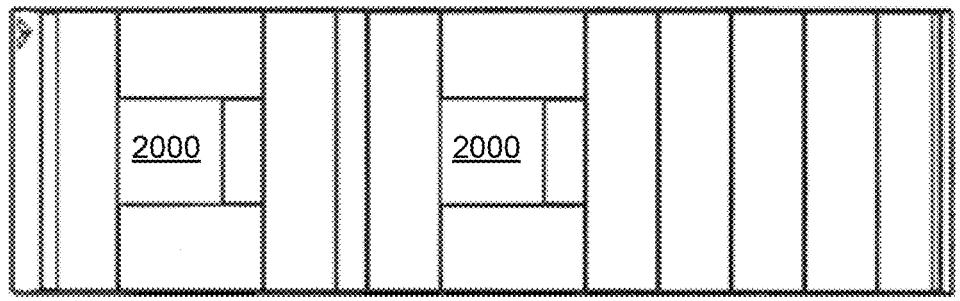
Figure 20E:
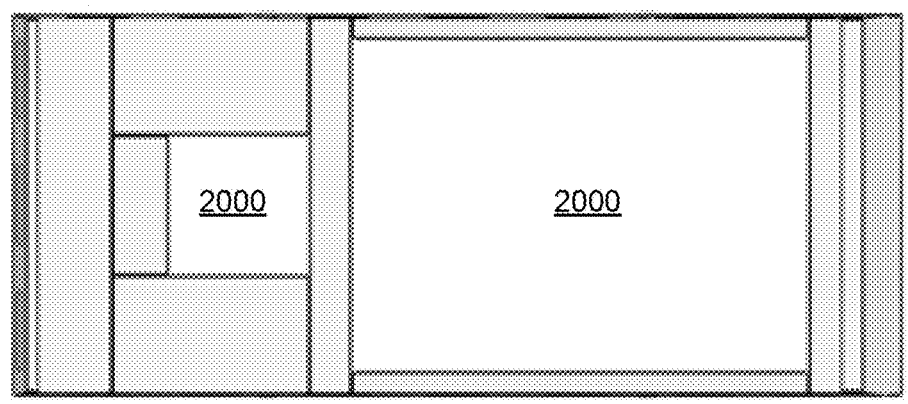
Figure 20F:
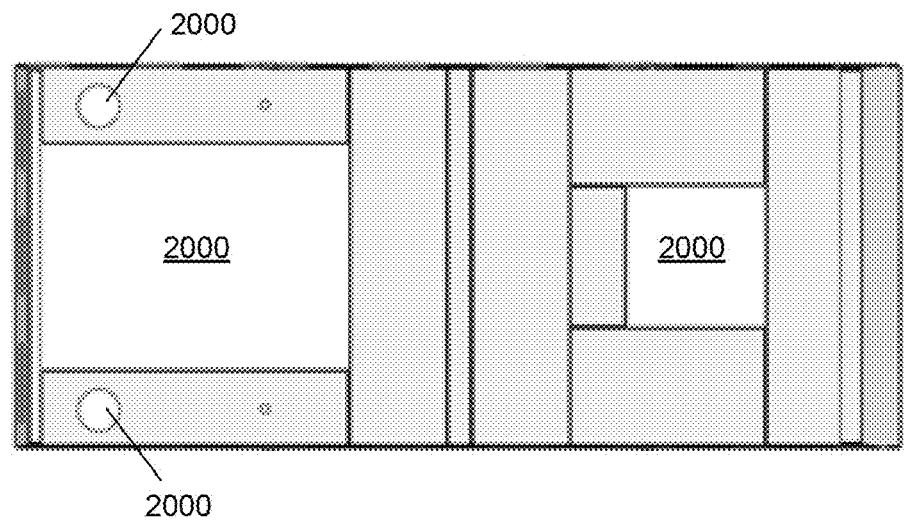
Figure 20G:
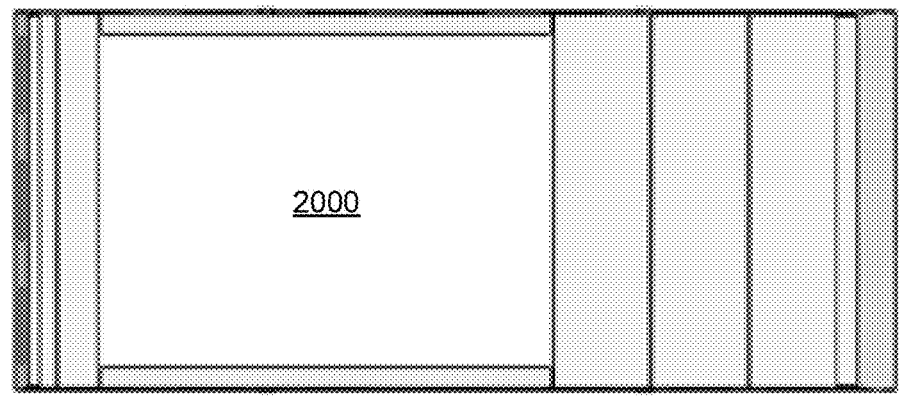

Advantageously, the modularity of modular frame 110 and platform 120 enable modular rack system 100 to be assembled in a wide variety of different configurations. This enables a user to configure modular rack system 100 to fit virtually any vehicle V of any width, length, or wheelbase. FIGS. 20A-20G illustrate top views of a plurality of different possible configurations of modular rack system 100, according to embodiments. However, it should be understood that the illustrated examples are not exhaustive or limiting, and that a virtually infinite number of configurations are possible, with the only constraint being the practical dimensions of a vehicle V. FIGS. 20A-20D illustrate example modular rack systems 100 for vehicles with a high roof and a wheelbase of 170", whereas FIGS. 20E-20G illustrate modular rack systems 100 for vehicles with a high roof and a wheelbase of 144".

As illustrated, some configurations of platform 120 may comprise openings 2000 in platform 120. Any opening 2000 may be configured to accommodate a protrusive feature on the roof of vehicle V. For example, platform 120 may be configured so as to leave an opening around a vent (e.g., air-conditioning vent, shower fan, etc.) on the roof of vehicle V. As another example, platform 120 may be configured so as to leave an opening over a sunroof (e.g., moon roof, panoramic roof, etc.) in the roof of vehicle V. Thus, sunlight can still pass through the sunroof via opening 2000. As further examples, platform 120 may be configured so as to leave an opening 2000 for exhaust pipes (e.g., a circular opening), satellite dishes or antennas, radio antennas, roof lamps, and/or any other features that protrude from the roof of vehicle V. In some cases, special or custom panels 122, with cutouts (e.g., circular cutouts) for such features, may be provided.

7. Accessories

In an embodiment, a variety of accessories can be integrated into modular rack system 100. Accessories may include, without limitation, solar panels, ladder mounts, boat rollers, logistic tracks, awning mounts, crossbars, and/or the like. Some accessories (e.g., solar panels, etc.) may be integrated into platform 120, for example, within the same plane as panels 122, so that the top surface of platform 120 is substantially continuous and flat. In this case, the accessory may be joined to panels 122 as if the accessory was itself a panel. Other accessories (e.g., solar panels, ladder mounts, boat rollers, awnings, etc.) may be connected to the top of platform 120 or to the top or sides of modular frame 110 (e.g., modular segments 210 of side rails 112). In either case, one or more accessories may be fixed to modular rack system 100 via fasteners (e.g., bolt and nut, screw, etc.) through aligned apertures, in a similar manner as described elsewhere herein.

7.1. Awning Mount

Figure 21A:
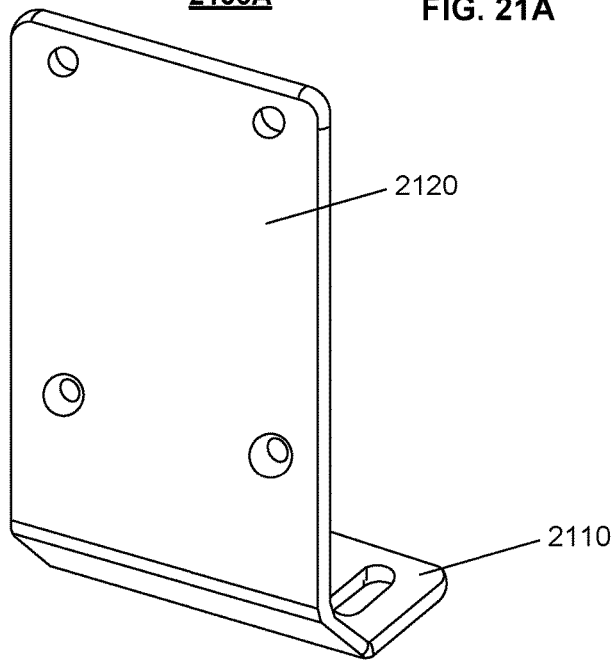
Figure 21B:
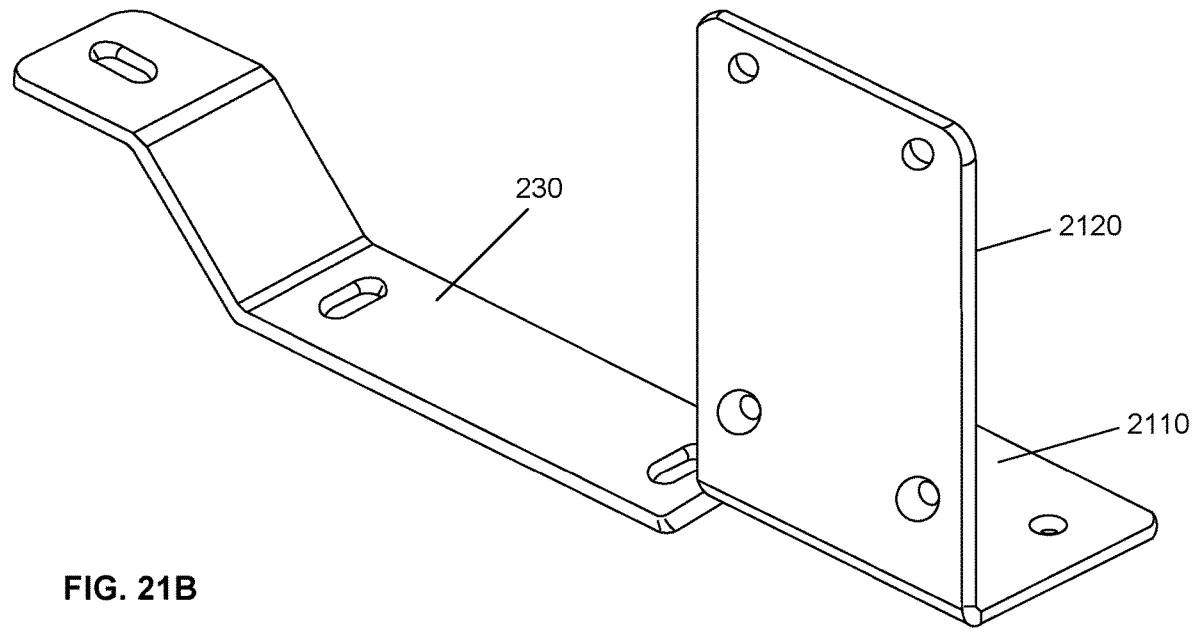

FIGS. 21A and 21B illustrate two variations of an awning bracket 2100 that may be used to mount an awning on modular rack system 100, according to an embodiment. Both variations of awning bracket 2100 comprise a first portion 2110 and a second portion 2120 extending substantially orthogonally from one end of first portion 2110. However, awning bracket 2100B also comprises an integrated mounting bracket 230 extending from first portion 2110. First portion 2110 comprises one or more, and preferably at least two, apertures that are configured to align with corresponding apertures through the bottom surface of first portion 212 of side rail 112, so as to be fastened to the bottom of side rail 112 via fasteners through the aligned apertures. In addition, second portion 2120 comprises one or more apertures that are configured to align with fastening slot 218A, so as to be fastened to the side of side rail 112 via fasteners (e.g., bolts and nuts, screws, etc.) through the aligned apertures. In addition, second portion 2120 may comprise one or more apertures for fastening to an awning system.

FIGS. 21C and 21D illustrate a plurality of awning brackets 2100 attached to a side rail 112 of modular rack system 100. As illustrated, a combination of the different awning brackets 2100A and 2100B may be used. For example, awning bracket 2100B may be used at a front position on side rail 112, near front rail 114, whereas awning bracket 2100A may be used at a middle and rear position on side rail 112. Advantageously, awning bracket 2100B acts as both an awning bracket and mounting bracket (e.g., to be mounted on a studded insert 1600).

The plurality of awning brackets 2100 collectively act as an awning mount. Specifically, an awning system (not shown) may be installed by fixing the awning system to each of awning brackets 2100. The awning system may comprise a rollable, fold-up, or otherwise extendable awning, for example, for use on a recreational vehicle. It should be understood that the number and placement of awning brackets 2100 on side rail 112 may depend on the size (e.g., length) of and positioning of fastening mechanisms (e.g., apertures) on the awning system to be installed.

7.2. Boat Roller

Figure 22A:
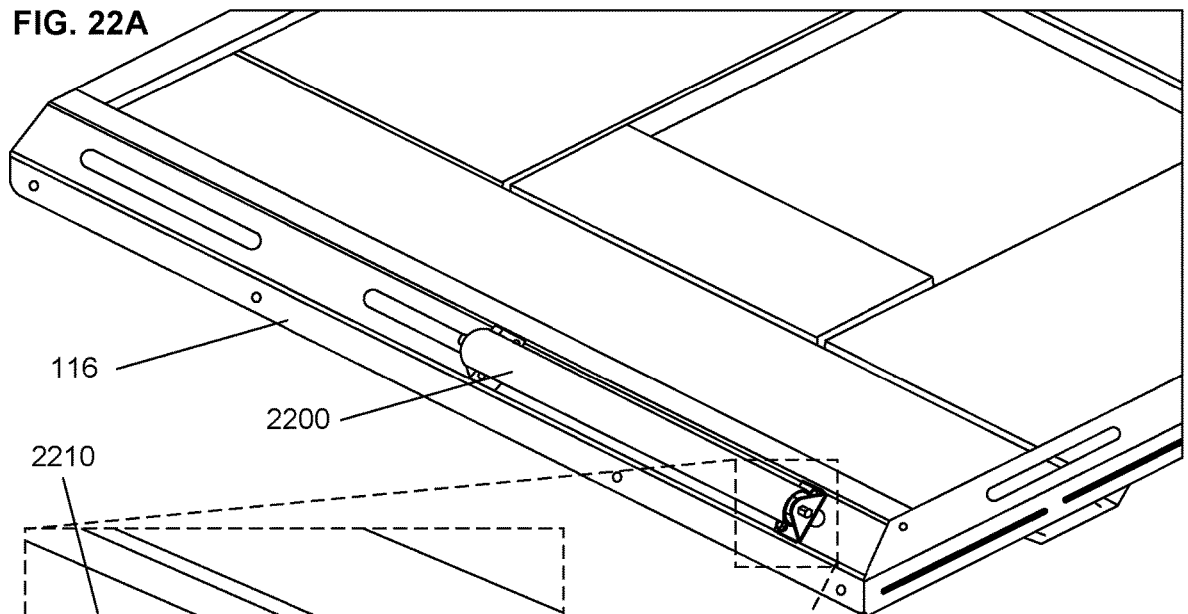
FIGS. 22A-22C illustrate a boat roller that may be mounted to a modular rack system, according to an embodiment.
Figure 22B:
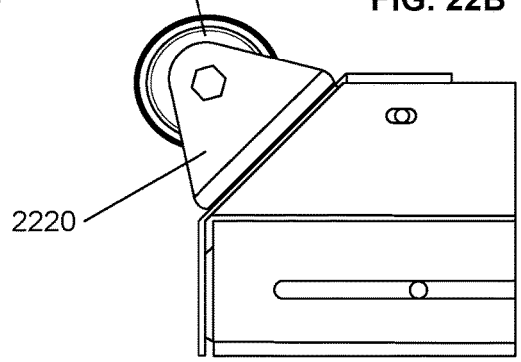
Figure 22C:
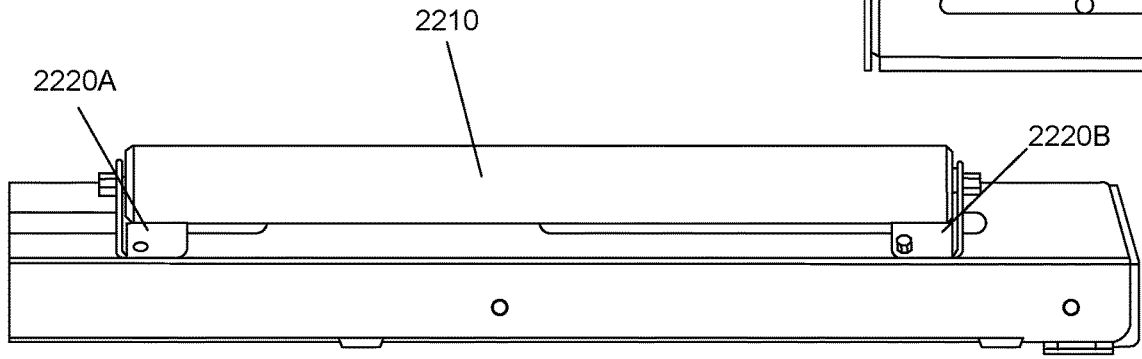
Figure 25A:
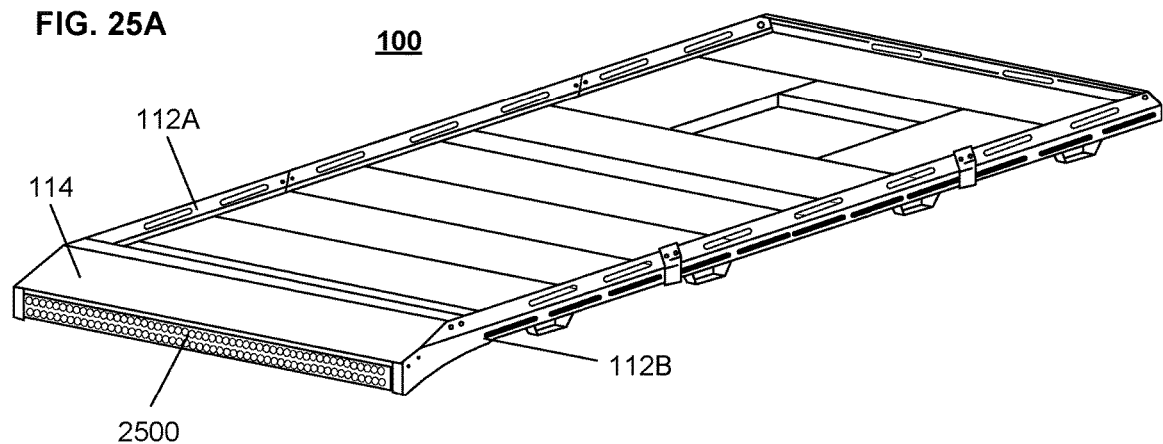
FIGS. 25A-25D illustrate a light bar, integrated into a modular rack system, according to an embodiment.
Figure 25B:
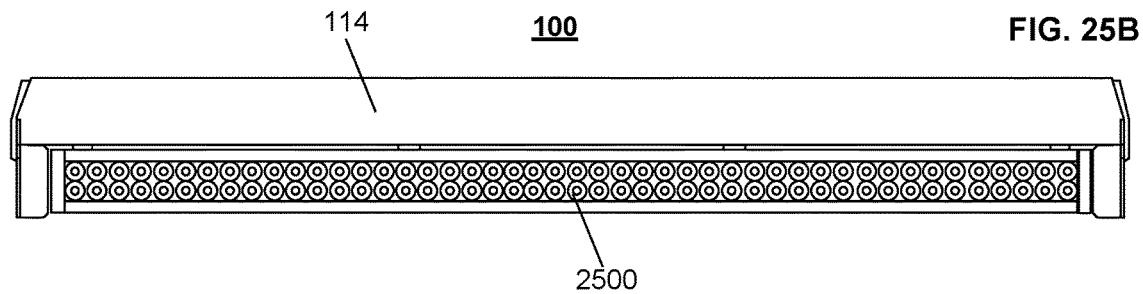
Figure 25C:
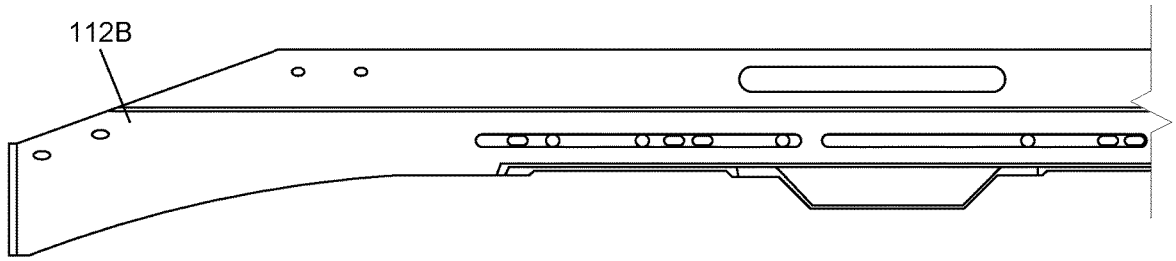
Figure 25D:
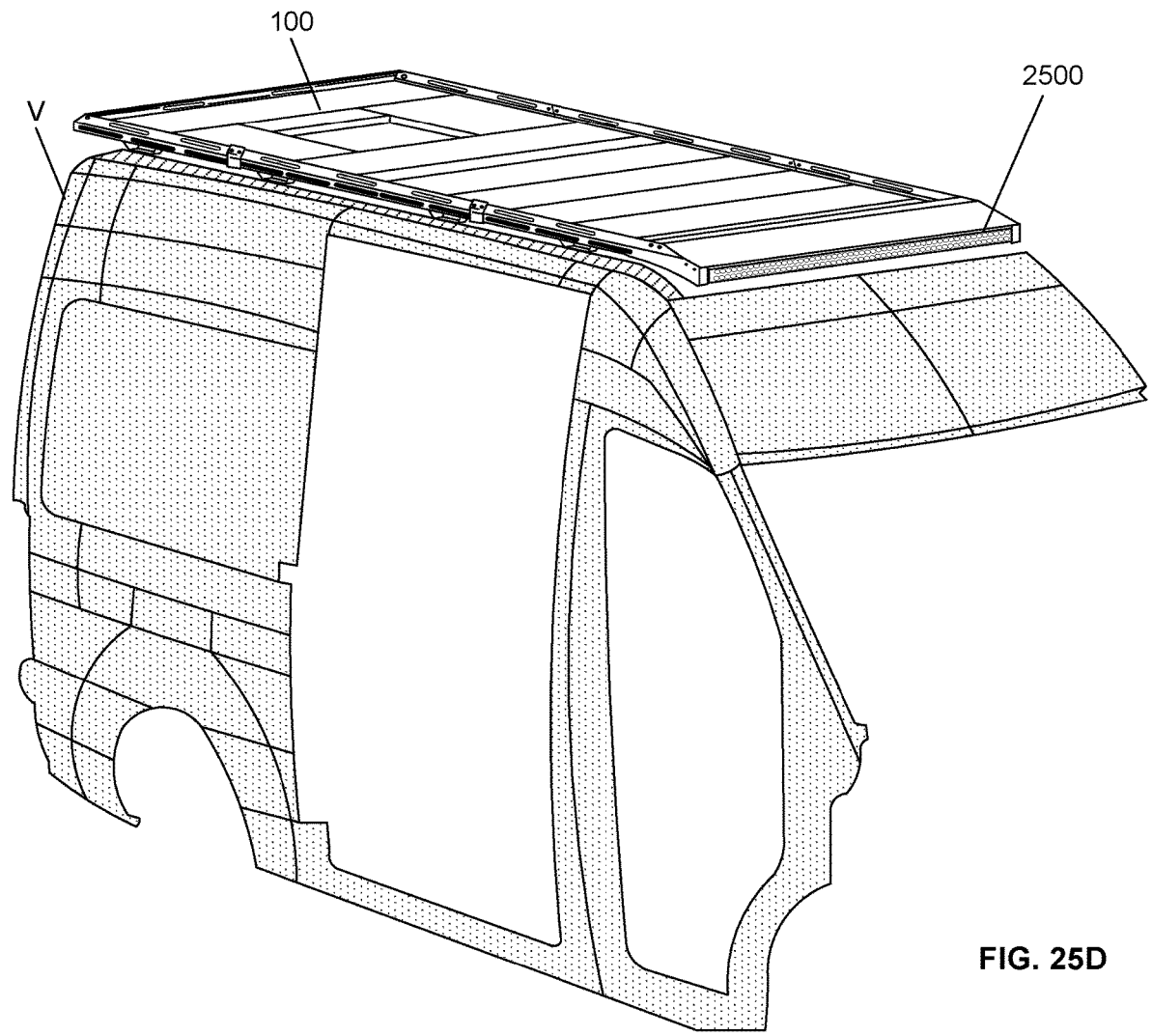

FIGS. 22A-22C illustrate a boat roller that may be mounted to modular rack system 100, according to an embodiment. For example, boat roller 2200 may be mounted on rear rail 116. In the illustrated example, boat roller 2200 is mounted on second portion 1120 of rear rail 116. In an embodiment, second portion 1120 is angled at 45° with respect to the plane of platform 120, so that the bottom surface of an object on platform 120 can easily slide over boat roller 2200, as it transitions from parallel to the plane of platform 120 to orthogonal to the plane of platform, or vice versa. This may aid a user in safely moving cargo on and off platform 120.

In an embodiment, boat roller 2200 comprises a roller 2210 held between two brackets 2220. While roller 2210 is held between the two brackets 2220 (e.g., by fasteners), roller 2210 is able to rotate in either direction. Brackets 2220 may be fixed to second portion 1120 of rear rail 116 by aligning apertures in the base of brackets 2220 with apertures in second portion 1120 of rear rail 116, so as to be fastened via fasteners (e.g., bolts and nuts, screws, etc.) through the aligned apertures.

7.3. Crossbar

FIGS. 23A and 23B illustrate a first embodiment of a crossbar assembly. Specifically, crossbar assembly 2300 comprises a bar 2310 and a bracket 2320 on both ends of bar 2310. Bar 2310 may be hollow or partially hollow with open ends. Each bracket 2320 comprises a first portion 2322 that fits within an open end of bar 2310 and a second portion 2324 that extends at an angle from first portion 2322 and away from bar 2310. In an embodiment, the angle matches the angle $\theta_1$ of third portion 216 of modular segments 210 in side rail 112. Thus, apertures 2326B in second portion 2324 are configured to align with apertures in third portion 216 of modular segments 210, so as to be fastened via fasteners (e.g., bolts and nuts, screws, etc.) through the aligned apertures. In addition, apertures 2326A in first portion 2322 of bracket 2320 align with apertures in the end of bar 2310, so as to be fastened via fasteners (e.g., bolts and nuts, screws, etc.) through the aligned apertures. Accordingly, crossbar 2300 may be fixed to modular frame 110 via brackets 2320.

FIGS. 24A-24C illustrate a second embodiment of a crossbar assembly. Specifically, crossbar assembly 2400 comprises a bar 2410 and a bracket 2420 on both ends of bar 2410. Bar 2410 may be, but does not have to be, hollow. Each bracket 2420 comprises a first portion 2422 that may be U-shaped so as to wrap around the top and sides of bar 2410, and a second portion 2424 which fits against and supports the bottom of bar 2410. First portion 2422 and second portion 2424 are fixed to each other (e.g., via apertures and fasteners), so as to tightly enclose bar 2410. Bracket 2420 may hold bar 2410 via friction between the enclosure and bar 2410, or may be fixed to bar 2410 (e.g., via apertures and fasteners).

In addition, bracket 2420 of crossbar assembly 2400 comprises a substantially L-shaped extension 2430. As illustrated in FIG. 24C, the cross-sectional shape of extension 2430 may substantially match the cross-sectional shape of modular segment 210 of side rail 112, as illustrated in FIG. 7A. However, extension 2430 comprises a hooked portion 2434 at its bottom end. Accordingly, extension 2430 can be slid onto a modular segment 210 of side rail 112, such that it extends down the side surface (third portion 216 and second portion 214 of modular segment 210), across the bottom surface (first portion 212 of modular segment 210) of side rail 112, and hooks around the end of first portion 212.

In addition, extension 2430 may comprise one or more apertures that align with apertures on side rail 112, so as to be fastened via fasteners (e.g., bolts and nuts, screws, etc.) through the aligned apertures. Accordingly, bracket 2420 is fixed to modular frame 110 and holds bar 2410.

Notably, crossbar assemblies 2300 and 2400 cross over platform 120 at a set height from platform 120. Thus, crossbar assemblies 2300 and 2400 can be used to support cargo (e.g., surfboards, kayaks, etc.) above the surface of platform 120, prevent cargo on platform 120 from sliding, and/or can be used as additional fastening points for ropes or straps.

7.4. Light Bar

FIGS. 25A-25D illustrate a light bar 2500, integrated into the air dam of front rail 114, according to an embodiment. Light bar 2500 may comprise a plurality of light-emitting elements. In an embodiment, light bar 2500 comprises a two-dimensional N×M (e.g., 2×50) array of tightly-packed light-emitting diodes (LEDs). However, other light sources may be used. Light bar 2500 may be wired to be turned on or off from inside and/or outside vehicle V, so as to direct light in front of vehicle V.

As illustrated, the shape of front rail 114 and side rails 112 may be altered, with respect to previously described embodiments, to accommodate light bar 2500. For instance, light bar 2500 may extend below the bottom surface of platform 120 and below the maximum height of the roof of vehicle V. Thus, first portion 1010 of front rail 114 may be extended farther downward, with light bar 2500 attached to the front surface of first portion 1010 of front rail 114. In addition, the bottom edge of the front end of side rails 112 may curve downward to match the extended height of first portion 1010 and fully cover the sides of light bar 2500. As shown in FIG. 24D, the curve of side rails 112 may substantially follow the curve between the roof and front end of vehicle V.

8. Example Usage

Notably, in all of the illustrated configurations, the top surface of platform 120 is below the top edges of modular frame 110. For example, side rails 112, front rail 114, and rear rail 116 all extend above the top surface of platform 120. This extension of modular frame 110 above the top surface of platform 120 prevents cargo, resting on platform 120, from sliding off of platform 120.

In addition, in an embodiment, longitudinal slots 218B are provided in at least side rails 112. Thus, ropes or straps may be looped through slots 218B, at any of a variety of positions, and over and/or around cargo on platform 120, to thereby secure the cargo to platform 120, so as to prevent sliding and toppling of the cargo. Slots 218B could similarly be provided on the portions of front rail 114 and/or rear rail 116 that extend above platform 120, to provide additional cargo tie-down points or improved air flow. However, if slots 218B are provided through the front of front rail 114, they may affect the aerodynamics of modular rack system 100.

Fasteners (e.g., fasteners 400) are described through the present disclosure. In each instance that a fastener is described, the fastener may comprise a combination of a bolt with a threaded end and a nut configured to tighten around the threaded end, a combination of a screw with a threaded end and a threaded screw hole configured to receive the screw, a rivet, or any other type of fastener that can secure two components together. Some of the fasteners described herein may be implemented as different in type, shape, or size than other fasteners described herein. Alternatively, all of the fasteners described herein may be implemented as identical, so as to simplify construction of modular rack system 100. In either case, it should be understood that the apertures described herein should conform to the fasteners used for those particular apertures. Accordingly, disclosed embodiments are not limited to any particular fasteners and apertures, and may include fastening means not explicitly disclosed herein.

In addition, it should be understood that when the features of disclosed embodiments are described in terms of a directionality, such as "down," "below," "up," "above," "top," "bottom," "side", and/or the like, these terms refer to a position that is relative to a modular rack system 100 that has been installed on the roof of an upright vehicle V. This orientation of modular rack system 100 is illustrated, for example, in FIG. 25D.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

References throughout this specification to "one embodiment" or "an embodiment" means that a particular feature described in connection with the embodiment may be included in one or more embodiments and/or may be omitted from other embodiments. Thus, appearances of the phrases "in one embodiment" or "in an embodiment" throughout this specification are not necessarily referring to the same embodiment. Furthermore, any subset of features may be combined in any suitable manner in one or more embodiments, and any subset of features may be omitted from one or more embodiments.

The invention claimed is:

1. A modular rack system for mounting on a roof of a vehicle, the modular rack system comprising: a plurality of panels configured to be joined together in a same plane to form a platform with a flat top surface; and a plurality of rails configured to be joined together to form a modular frame surrounding the platform and extending above the top surface of the platform, wherein the platform is configured to be joined to the modular frame and not to the roof of the vehicle, so as to only be fixed to the roof of the vehicle indirectly via attachment to the modular frame.

2. The modular rack system of claim 1, wherein the platform comprises at least one opening through the platform and configured to accommodate a feature extending up from the roof of the vehicle.

3. The modular rack system of claim 2, wherein the platform comprises a panel having the at least one opening in it.

4. The modular rack system of claim 2, wherein the at least one opening is formed as a space between two separate ones of the plurality of panels.

5. The modular rack system of claim 4, wherein the at least one opening is formed as a space in a middle of four separate ones of the plurality of panels.

6. The modular rack system of claim 1, wherein at least a portion of the platform is continuous from a first side of the platform to a second side of the platform that is opposite the first side, and wherein at least a portion of the platform is continuous from a third side of the platform to a fourth side of the platform that is opposite the third side.

7. The modular rack system of claim 1, wherein the plurality of panels comprise a first panel having a first shape, and a second panel having a second shape that is different than the first shape.

8. The modular rack system of claim 1, wherein the plurality of rails comprise a front rail, a rear rail, and two side rails extending between the front rail and the rear rail.

9. The modular rack system of claim 8, wherein each of the two side rails comprises a plurality of modular segments configured to be joined together linearly to form the respective side rail.

10. The modular rack system of claim 8, wherein the front rail comprises an angled air dam.

11. The modular rack system of claim 8, wherein a portion of each of the two side rails that extends above the top surface of the platform is angled inwards towards a center of the modular frame.

12. The modular rack system of claim 8, wherein each portion of each of the two side rails that extends above the top surface of the platform comprises a plurality of longitudinal slots.

13. The modular rack system of claim 8, further comprising a light bar configured to be attached to a front surface of the front rail, wherein, when the modular rack system is mounted on the roof of the vehicle, the light bar extends below the plane of the platform.

14. The modular rack system of claim 8, further comprising:
a plurality of studded inserts, wherein each of the plurality of studded inserts is configured to slide into a rail on the roof of the vehicle; and
a plurality of mounting brackets, wherein each of the plurality of mounting brackets is configured to be attached to a bottom surface of either of the two side rails, such that the mounting bracket extends downward from the side rail to which it is attached, and wherein each of the plurality of mounting brackets is configured to attach to one of the plurality of studded inserts.

15. The modular rack system of claim 1, wherein each of the plurality of panels comprises a top portion and four side portions extending orthogonally downward from the top portion.

16. The modular rack system of claim 15, wherein each of the four side portions of each of the plurality of panels comprises one or more apertures configured to align with one or more corresponding apertures in either another one of the plurality of panels or one of the plurality of rails.

17. The modular rack system of claim 15, wherein each of at least two of the four side portions are tapered, such that a width of the side portion closer to the top portion is greater than a width of the side portion farther from the top portion.

18. The modular rack system of claim 1, wherein the modular frame comprises a plurality of apertures configured to align with a plurality of apertures in one or more accessories configured to be attached to the modular frame.

19. The modular rack system of claim 18, further comprising the one or more accessories, wherein the one or more accessories comprise one or more of an awning mount, a boat roller, or a crossbar.

\* \* \* \* \*